(12) United States Patent
Bennett et al.

(10) Patent No.: US 9,143,770 B2
(45) Date of Patent: Sep. 22, 2015

(54) APPLICATION PROGRAMMING INTERFACE SUPPORTING MIXED TWO AND THREE DIMENSIONAL DISPLAYS

(75) Inventors: James D. Bennett, Hroznetin (CZ); Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 966 days.

(21) Appl. No.: 12/982,173

(22) Filed: Dec. 30, 2010

(65) Prior Publication Data

US 2011/0164034 A1 Jul. 7, 2011

Related U.S. Application Data

(60) Provisional application No. 61/291,818, filed on Dec. 31, 2009, provisional application No. 61/303,119, filed on Feb. 10, 2010.

(51) Int. Cl.
*G06T 15/00* (2011.01)
*H04N 13/04* (2006.01)
(Continued)

(52) U.S. Cl.
CPC ............ *H04N 13/0497* (2013.01); *G03B 35/24* (2013.01); *G06F 3/14* (2013.01); *G09G 3/003* (2013.01); *G09G 3/20* (2013.01); *H04N 13/00* (2013.01); *H04N 13/0029* (2013.01); *H04N 13/0048* (2013.01); *H04N 13/0055* (2013.01); *H04N 13/0059* (2013.01);
(Continued)

(58) Field of Classification Search
CPC .................................. H04N 13/00; G02B 6/00
USPC ............ 345/102, 419, 6; 348/51, 55, 59, 564, 348/42, 49, 14.7; 349/15
See application file for complete search history.

(56) References Cited

U.S. PATENT DOCUMENTS

| 4,829,365 A | 5/1989 | Eichenlaub |
| 5,493,427 A | 2/1996 | Nomura et al. |

(Continued)

FOREIGN PATENT DOCUMENTS

| EP | 0833183 A1 | 4/1998 |
| EP | 1662808 A1 | 5/2006 |

(Continued)

OTHER PUBLICATIONS

Liao et al, The Design and Application of High-Resolution 3D Stereoscopic graphics Display on PC, Perdue University School of Science, pp. 1-7, 2000.*

(Continued)

*Primary Examiner* — Phu K Nguyen
(74) *Attorney, Agent, or Firm* — Fiala & Weaver P.L.L.C.

(57) ABSTRACT

Application programming interfaces (APIs) are provided that enable applications to display two-dimensional and three-dimensional content in regions of a display screen. A first command is received from an application directing at least in part a first configuration of a first region of the screen to support the three-dimensional content. The first command is responded to by sending a first configuration request to place the screen in a three-dimensional mode within the first region. A second command is received directing at least in part a second configuration of a second region of the screen to support the two-dimensional content. The second command is responded to by sending a second configuration request to place the screen in mode corresponding to a two-dimensional mode within the second region.

21 Claims, 23 Drawing Sheets

US 9,143,770 B2
Page 2

(51) Int. Cl.
*H04N 13/00* (2006.01)
*G06F 3/14* (2006.01)
*G09G 3/00* (2006.01)
*G09G 3/20* (2006.01)
*H04N 21/235* (2011.01)
*H04N 21/41* (2011.01)
*H04N 21/435* (2011.01)
*G03B 35/24* (2006.01)
*H04S 7/00* (2006.01)
*G06F 3/0346* (2013.01)
*G02B 6/00* (2006.01)
*G09G 5/00* (2006.01)
*G09G 5/14* (2006.01)

(52) U.S. Cl.
CPC ...... *H04N 13/0404* (2013.01); *H04N 13/0409* (2013.01); *H04N 13/0411* (2013.01); *H04N 13/0413* (2013.01); *H04N 13/0429* (2013.01); *H04N 13/0447* (2013.01); *H04N 13/0454* (2013.01); *H04N 13/0456* (2013.01); *H04N 13/0468* (2013.01); *H04N 13/0484* (2013.01); *H04N 21/235* (2013.01); *H04N 21/4122* (2013.01); *H04N 21/435* (2013.01); *H04S 7/303* (2013.01); *G02B 6/00* (2013.01); *G06F 3/0346* (2013.01); *G09G 5/003* (2013.01); *G09G 5/14* (2013.01); *G09G 2300/023* (2013.01); *G09G 2320/028* (2013.01); *G09G 2370/04* (2013.01); *H04N 2013/0463* (2013.01); *H04N 2013/0465* (2013.01)

(56) References Cited

U.S. PATENT DOCUMENTS

| | | |
|---|---|---|
| 5,615,046 A | 3/1997 | Gilchrist |
| 5,855,425 A | 1/1999 | Hamagishi |
| 5,945,965 A * | 8/1999 | Inoguchi et al. ............ 345/6 |
| 5,959,597 A | 9/1999 | Yamada et al. |
| 5,969,850 A | 10/1999 | Harrold et al. |
| 5,990,975 A | 11/1999 | Nan et al. |
| 6,023,277 A | 2/2000 | Osaka et al. |
| 6,049,424 A | 4/2000 | Hamagishi |
| 6,094,216 A | 7/2000 | Taniguchi et al. |
| 6,144,375 A | 11/2000 | Jain et al. |
| 6,188,442 B1 | 2/2001 | Narayanaswami |
| 6,285,368 B1 | 9/2001 | Sudo |
| 6,697,687 B1 | 2/2004 | Kasahara et al. |
| 6,710,920 B1 | 3/2004 | Mashitani et al. |
| 6,909,555 B2 | 6/2005 | Wohlstadter |
| 7,030,903 B2 | 4/2006 | Sudo |
| 7,038,698 B1 | 5/2006 | Palm et al. |
| 7,091,471 B2 | 8/2006 | Wenstrand et al. |
| 7,123,213 B2 | 10/2006 | Yamazaki et al. |
| 7,190,518 B1 | 3/2007 | Kleinberger et al. |
| 7,359,105 B2 | 4/2008 | Jacobs et al. |
| 7,389,214 B1 | 6/2008 | Yelich et al. |
| 7,440,193 B2 | 10/2008 | Gunasekaran et al. |
| 7,511,774 B2 | 3/2009 | Lee et al. |
| 7,626,644 B2 | 12/2009 | Shestak et al. |
| 7,646,451 B2 | 1/2010 | Vogel et al. |
| 7,692,859 B2 | 4/2010 | Redert et al. |
| 7,885,079 B2 | 2/2011 | Chen et al. |
| 7,911,442 B2 | 3/2011 | Wang et al. |
| 7,924,456 B1 | 4/2011 | Kahn et al. |
| 7,954,967 B2 | 6/2011 | Kashiwagi et al. |
| 7,997,783 B2 | 8/2011 | Song et al. |
| 8,040,952 B2 | 10/2011 | Park et al. |
| 8,044,983 B2 | 10/2011 | Nonaka et al. |
| 8,049,710 B2 * | 11/2011 | Shestak et al. ............ 345/102 |
| 8,072,411 B2 | 12/2011 | Chen et al. |
| 8,139,024 B2 * | 3/2012 | Daiku ............ 345/102 |
| 8,154,686 B2 | 4/2012 | Mather et al. |
| 8,154,799 B2 | 4/2012 | Kim et al. |
| 8,174,564 B2 | 5/2012 | Kim et al. |
| 8,183,788 B2 | 5/2012 | Ma |
| 8,209,396 B1 | 6/2012 | Raman et al. |
| 8,233,034 B2 | 7/2012 | Sharp et al. |
| 8,284,119 B2 | 10/2012 | Kim et al. |
| 8,310,527 B2 | 11/2012 | Ko et al. |
| 8,334,933 B2 | 12/2012 | Tsukada et al. |
| 8,363,928 B1 | 1/2013 | Sharp |
| 8,368,745 B2 | 2/2013 | Nam et al. |
| 8,384,774 B2 | 2/2013 | Gallagher |
| 8,400,392 B2 | 3/2013 | Kimura et al. |
| 8,411,746 B2 | 4/2013 | Chen et al. |
| 8,438,601 B2 | 5/2013 | Putterman et al. |
| 8,441,430 B2 | 5/2013 | Lee |
| 8,466,869 B2 | 6/2013 | Kobayashi et al. |
| 8,482,512 B2 | 7/2013 | Adachi et al. |
| 8,487,863 B2 | 7/2013 | Park et al. |
| 8,525,942 B2 | 9/2013 | Robinson et al. |
| 8,587,642 B2 | 11/2013 | Shestak et al. |
| 8,587,736 B2 | 11/2013 | Kang |
| 8,605,136 B2 | 12/2013 | Yu et al. |
| 8,687,042 B2 * | 4/2014 | Karaoguz et al. ............ 348/42 |
| 8,736,659 B2 * | 5/2014 | Liu ............ 348/14.07 |
| 8,766,905 B2 | 7/2014 | Adachi |
| 8,788,676 B2 | 7/2014 | Alameh et al. |
| 8,823,782 B2 | 9/2014 | Karaoguz et al. |
| 8,854,531 B2 | 10/2014 | Karaoguz et al. |
| 8,885,026 B2 * | 11/2014 | Endo ............ 348/49 |
| 8,922,545 B2 | 12/2014 | Bennett et al. |
| 8,964,013 B2 | 2/2015 | Bennett et al. |
| 2002/0010798 A1 | 1/2002 | Ben-Shaul et al. |
| 2002/0037037 A1 | 3/2002 | Van Der Schaar |
| 2002/0167862 A1 | 11/2002 | Tomasi et al. |
| 2002/0171666 A1 | 11/2002 | Endo et al. |
| 2002/0194604 A1 | 12/2002 | Sanchez et al. |
| 2003/0012425 A1 | 1/2003 | Suzuki et al. |
| 2003/0103165 A1 | 6/2003 | Bullinger et al. |
| 2003/0137506 A1 | 7/2003 | Efran et al. |
| 2003/0154261 A1 | 8/2003 | Doyle et al. |
| 2003/0223499 A1 | 12/2003 | Routhier et al. |
| 2004/0027452 A1 | 2/2004 | Yun et al. |
| 2004/0036763 A1 | 2/2004 | Swift et al. |
| 2004/0041747 A1 | 3/2004 | Uehara et al. |
| 2004/0081302 A1 | 4/2004 | Kim et al. |
| 2004/0109093 A1 | 6/2004 | Small-Stryker |
| 2004/0141237 A1 | 7/2004 | Wohlstadter |
| 2004/0164292 A1 | 8/2004 | Tung et al. |
| 2004/0239231 A1 | 12/2004 | Miyagawa et al. |
| 2004/0252187 A1 | 12/2004 | Alden |
| 2004/0255337 A1 | 12/2004 | Doyle et al. |
| 2005/0044489 A1 | 2/2005 | Yamagami et al. |
| 2005/0073472 A1 | 4/2005 | Kim et al. |
| 2005/0128353 A1 | 6/2005 | Young et al. |
| 2005/0185515 A1 | 8/2005 | Berstis et al. |
| 2005/0237487 A1 | 10/2005 | Chang |
| 2005/0248561 A1 | 11/2005 | Ito et al. |
| 2005/0259147 A1 | 11/2005 | Nam et al. |
| 2006/0050785 A1 | 3/2006 | Watanabe et al. |
| 2006/0087556 A1 | 4/2006 | Era |
| 2006/0109242 A1 | 5/2006 | Simpkins |
| 2006/0139448 A1 | 6/2006 | Ha et al. |
| 2006/0139490 A1 | 6/2006 | Fekkes et al. |
| 2006/0244918 A1 | 11/2006 | Cossairt et al. |
| 2006/0256136 A1 | 11/2006 | O'Donnell et al. |
| 2006/0256302 A1 | 11/2006 | Hsu |
| 2006/0271791 A1 | 11/2006 | Novack et al. |
| 2007/0002041 A1 | 1/2007 | Kim et al. |
| 2007/0008406 A1 | 1/2007 | Shestak et al. |
| 2007/0008620 A1 | 1/2007 | Shestak et al. |
| 2007/0052807 A1 | 3/2007 | Zhou et al. |
| 2007/0072674 A1 | 3/2007 | Ohta et al. |
| 2007/0085874 A1 | 4/2007 | Ijzerman et al. |
| 2007/0096125 A1 | 5/2007 | Vogel et al. |
| 2007/0097103 A1 | 5/2007 | Yoshioka et al. |
| 2007/0097208 A1 | 5/2007 | Takemoto et al. |
| 2007/0110035 A1 | 5/2007 | Bennett |
| 2007/0139371 A1 | 6/2007 | Harsham et al. |
| 2007/0146267 A1 | 6/2007 | Jang et al. |
| 2007/0147827 A1 | 6/2007 | Sheynman et al. |

(56) References Cited

U.S. PATENT DOCUMENTS

| | | |
|---|---|---|
| 2007/0153122 A1 | 7/2007 | Ayite et al. |
| 2007/0153916 A1 | 7/2007 | Demircin et al. |
| 2007/0162392 A1 | 7/2007 | McEnroe et al. |
| 2007/0225994 A1 | 9/2007 | Moore |
| 2007/0258140 A1 | 11/2007 | Shestak et al. |
| 2007/0270218 A1 | 11/2007 | Yoshida et al. |
| 2007/0296874 A1 | 12/2007 | Yoshimoto et al. |
| 2008/0025390 A1 | 1/2008 | Shi et al. |
| 2008/0037120 A1 | 2/2008 | Koo et al. |
| 2008/0043096 A1 | 2/2008 | Vetro et al. |
| 2008/0043644 A1 | 2/2008 | Barkley et al. |
| 2008/0068329 A1 | 3/2008 | Shestak et al. |
| 2008/0086321 A1 | 4/2008 | Walton |
| 2008/0086391 A1 | 4/2008 | Maynard et al. |
| 2008/0126557 A1 | 5/2008 | Motoyama et al. |
| 2008/0133122 A1 | 6/2008 | Mashitani et al. |
| 2008/0150853 A1 | 6/2008 | Peng et al. |
| 2008/0165176 A1 | 7/2008 | Archer et al. |
| 2008/0168129 A1 | 7/2008 | Robbin et al. |
| 2008/0184301 A1 | 7/2008 | Boylan et al. |
| 2008/0191964 A1 | 8/2008 | Spengler |
| 2008/0192112 A1 | 8/2008 | Hiramatsu et al. |
| 2008/0204550 A1 | 8/2008 | De Zwart et al. |
| 2008/0246757 A1 | 10/2008 | Ito |
| 2008/0259233 A1 | 10/2008 | Krijn et al. |
| 2008/0273242 A1 | 11/2008 | Woodgate et al. |
| 2008/0284844 A1 | 11/2008 | Woodgate et al. |
| 2008/0303832 A1 | 12/2008 | Kim et al. |
| 2009/0002178 A1 | 1/2009 | Guday et al. |
| 2009/0010264 A1 | 1/2009 | Zhang |
| 2009/0051759 A1 | 2/2009 | Adkins et al. |
| 2009/0052164 A1 | 2/2009 | Kashiwagi et al. |
| 2009/0058845 A1 | 3/2009 | Fukuda et al. |
| 2009/0102915 A1 | 4/2009 | Arsenich |
| 2009/0115783 A1 | 5/2009 | Eichenlaub |
| 2009/0115800 A1 | 5/2009 | Berretty et al. |
| 2009/0133051 A1 | 5/2009 | Hildreth |
| 2009/0138280 A1 | 5/2009 | Morita et al. |
| 2009/0138805 A1 | 5/2009 | Hildreth |
| 2009/0141182 A1 | 6/2009 | Miyashita et al. |
| 2009/0167639 A1 | 7/2009 | Casner et al. |
| 2009/0174700 A1 | 7/2009 | Daiku |
| 2009/0232202 A1 | 9/2009 | Chen et al. |
| 2009/0238378 A1 | 9/2009 | Kikinis et al. |
| 2009/0244262 A1 | 10/2009 | Masuda et al. |
| 2009/0244266 A1 | 10/2009 | Brigham |
| 2009/0268816 A1 | 10/2009 | Pandit et al. |
| 2009/0319625 A1 | 12/2009 | Kouhi |
| 2010/0007582 A1 | 1/2010 | Zalewski |
| 2010/0066850 A1 | 3/2010 | Wilson et al. |
| 2010/0070987 A1 | 3/2010 | Amento et al. |
| 2010/0071015 A1 | 3/2010 | Tomioka et al. |
| 2010/0079374 A1 | 4/2010 | Cortenraad et al. |
| 2010/0097525 A1 | 4/2010 | Mino |
| 2010/0107184 A1 | 4/2010 | Shintani |
| 2010/0128112 A1 | 5/2010 | Marti et al. |
| 2010/0135640 A1 | 6/2010 | Zucker et al. |
| 2010/0182407 A1 | 7/2010 | Ko et al. |
| 2010/0208042 A1 | 8/2010 | Ikeda et al. |
| 2010/0215343 A1 | 8/2010 | Ikeda et al. |
| 2010/0218231 A1 | 8/2010 | Frink et al. |
| 2010/0225576 A1 | 9/2010 | Morad et al. |
| 2010/0231511 A1 | 9/2010 | Henty et al. |
| 2010/0238274 A1 | 9/2010 | Kim et al. |
| 2010/0238367 A1 | 9/2010 | Montgomery et al. |
| 2010/0245548 A1 | 9/2010 | Sasaki et al. |
| 2010/0272174 A1 | 10/2010 | Toma et al. |
| 2010/0299390 A1 | 11/2010 | Alameh et al. |
| 2010/0302461 A1 | 12/2010 | Lim et al. |
| 2010/0306800 A1 | 12/2010 | Jung et al. |
| 2010/0309290 A1 | 12/2010 | Myers |
| 2011/0016004 A1 | 1/2011 | Loyall et al. |
| 2011/0043475 A1 | 2/2011 | Rigazio et al. |
| 2011/0050687 A1 | 3/2011 | Alyshev et al. |
| 2011/0063289 A1 | 3/2011 | Gantz |
| 2011/0090233 A1 | 4/2011 | Shahraray et al. |
| 2011/0090413 A1 | 4/2011 | Liou |
| 2011/0093882 A1 | 4/2011 | Candelore et al. |
| 2011/0109964 A1 | 5/2011 | Kim et al. |
| 2011/0113343 A1 | 5/2011 | Trauth |
| 2011/0122944 A1 | 5/2011 | Gupta et al. |
| 2011/0137894 A1 | 6/2011 | Narayanan et al. |
| 2011/0149026 A1 | 6/2011 | Luthra |
| 2011/0157167 A1 | 6/2011 | Bennett et al. |
| 2011/0157168 A1 | 6/2011 | Bennett et al. |
| 2011/0157169 A1 | 6/2011 | Bennett et al. |
| 2011/0157170 A1 | 6/2011 | Bennett et al. |
| 2011/0157172 A1 | 6/2011 | Bennett et al. |
| 2011/0157257 A1 | 6/2011 | Bennett et al. |
| 2011/0157264 A1 | 6/2011 | Seshadri et al. |
| 2011/0157309 A1 | 6/2011 | Bennett et al. |
| 2011/0157315 A1 | 6/2011 | Bennett et al. |
| 2011/0157322 A1 | 6/2011 | Bennett et al. |
| 2011/0157326 A1 | 6/2011 | Karaoguz et al. |
| 2011/0157327 A1 | 6/2011 | Seshadri et al. |
| 2011/0157330 A1 | 6/2011 | Bennett et al. |
| 2011/0157336 A1 | 6/2011 | Bennett et al. |
| 2011/0157339 A1 | 6/2011 | Bennett et al. |
| 2011/0157471 A1 | 6/2011 | Seshadri et al. |
| 2011/0157696 A1 | 6/2011 | Bennett et al. |
| 2011/0157697 A1 | 6/2011 | Bennett et al. |
| 2011/0159929 A1 | 6/2011 | Karaoguz et al. |
| 2011/0161843 A1 | 6/2011 | Bennett et al. |
| 2011/0164111 A1 | 7/2011 | Karaoguz et al. |
| 2011/0164115 A1 | 7/2011 | Bennett et al. |
| 2011/0164188 A1 | 7/2011 | Karaoguz et al. |
| 2011/0169913 A1 | 7/2011 | Karaoguz et al. |
| 2011/0169919 A1 | 7/2011 | Karaoguz et al. |
| 2011/0169930 A1 | 7/2011 | Bennett et al. |
| 2011/0199469 A1 | 8/2011 | Gallagher |
| 2011/0234754 A1 | 9/2011 | Newton et al. |
| 2011/0254698 A1 | 10/2011 | Eberl et al. |
| 2011/0268177 A1 | 11/2011 | Tian et al. |
| 2011/0282631 A1 | 11/2011 | Poling et al. |
| 2012/0016917 A1 | 1/2012 | Priddle et al. |
| 2012/0081515 A1 | 4/2012 | Jang |
| 2012/0212414 A1 | 8/2012 | Osterhout et al. |
| 2012/0235900 A1 | 9/2012 | Border et al. |
| 2012/0308208 A1 | 12/2012 | Karaoguz et al. |
| 2013/0127980 A1 | 5/2013 | Haddick et al. |
| 2015/0015668 A1 | 1/2015 | Bennett et al. |

FOREIGN PATENT DOCUMENTS

| | | |
|---|---|---|
| EP | 1816510 A1 | 8/2007 |
| EP | 1993294 A2 | 11/2008 |
| GB | 2454771 A | 5/2009 |
| TW | 200938878 A | 9/2009 |
| WO | 2005/045488 A1 | 5/2005 |
| WO | 2007/024118 A1 | 3/2007 |
| WO | 2008126557 A1 | 10/2008 |
| WO | 2009031872 A2 | 3/2009 |
| WO | 2009/098622 A2 | 8/2009 |

OTHER PUBLICATIONS

Intel, Displaying Stereoscopic 3D (S3D) with Intel HD Graphics Processors for Software Developers, Aug. 2011, pp. 1-10.*

European Search Report received for European Patent application No. 10015984.7, mailed on May 3, 2011, 3 pages.

European search Report received for European Patent application No. 10016055.5, mailed on Apr. 12, 2011, 3 pages.

Office Action received for European Patent Application No. 10016055.5, mailed on Apr. 5, 2013, 6 pages.

"How Browsers Work", retrieved from <http://taligarsiel.com/Projects/howbrowserswork1.htm> on Oct. 21, 2010, 54 pages.

IEEE 100 The Authoritative Dictionary of IEEE Standards Terms Seventh Edition, entry for "engine", IEEE 100-2000, 2000, pp. 349-411.

IEEE 100 The Authoritative Dictionary of IEEE Standards Terms Seventh Edition, entry for "Web page", IEEE 100-2000, 2000, pp. 1269-1287.

(56) References Cited

OTHER PUBLICATIONS

Wikipedia entry on "Scripting language", retrieved on Aug. 16, 2012, 4 pages.
Peterka, Thomas, "Dynallax: Dynamic Parallax Barrier Autostereoscopic Display", PH.D. Dissertation, University of Illinois at Chicago, 2007, 134 pages.
Shan et al., "Principles and Evaluation of Autostereoscopic Photogrammetric Measurement", Photogrammetric Engineering and Remote Sensing, vol. 72, No. 4, Apr. 2006, pp. 365-372.
Yanagisawa et al., "A Focus Distance Controlled 3DTV", SPIE, vol. 3012, Stereoscopic Displays and Virtual Reality Systems IV, May 15, 1997, pp. 256-261.
Yanaka, Kazuhisa "Stereoscopic Display Technique for Web3D Images", SIGGRAPH 2009, New Orleans, Louisiana, Aug. 3-7, 2009, 1 page.
Fono, et al., "EyeWindows: Evaluation of Eye-Controlled Zooming Windows for Focus Selection", Apr. 2-7, 2005, pp. 151-160.
Kumar, et al., "Eye Point: Practical Pointing and Selection Using Gaze and Keyboard", Apr. 28-May 3, 2007, 10 pages.
Ko et al., "Facial Feature Tracking and Head Orientation-based Gaze Tracking", Electronics and Telecommunications Research Institute (ETRI), 2000, 4 pages.
Ruddarraju et al., "Perceptual User Interfaces using Vision-based Eye Tracking", ICMI, Vancouver, British Columbia, Canada, Nov. 5-7, 2003, 7 pages.
Office Action Received for Chinese Patent Application No. 201010619646.X, mailed on Mar. 5, 2014, 7 pages of Chinese Office action only.
Office Action Received for Chinese Patent Application No. 201010619649.3, mailed on Mar. 31, 2014, 4 pages of Chinese Office action only.
Office Action Received for Taiwan Patent Application No. 099147124, mailed on Mar. 31, 2014, 8 pages of official copy.
Office Action received for Chinese Patent Application No. 201010619649.3, mailed on Oct. 11, 2014, 5 pages (Official Copy only).

\* cited by examiner

500

502 — receive a first command from an application directing at least in part a first configuration of a first region of the screen to support first content, the first configuration being a first three-dimensional configuration 504 — respond to the first command by sending a first configuration request to place the screen in a three-dimensional mode within the first region 506 — receive a second command directing at least in part a second configuration of a second region of the screen to support second content 508 — respond to the second command by sending a second configuration request to place the screen in mode corresponding to the second configuration within the second region

2502
receive light from an array of pixels that includes a plurality of pairs of sets of pixels 2504
select a plurality of strips of barrier elements of a barrier element array to be transparent to form a plurality of parallel transparent slits 2506
filter the light at the barrier element array to form a plurality of pairs of images in a viewing space corresponding to the plurality of pairs of sets of pixels, each pair of images of the plurality of pairs of images being configured to be perceived as a corresponding three-dimensional image of a plurality of three-dimensional images

FIG. 25

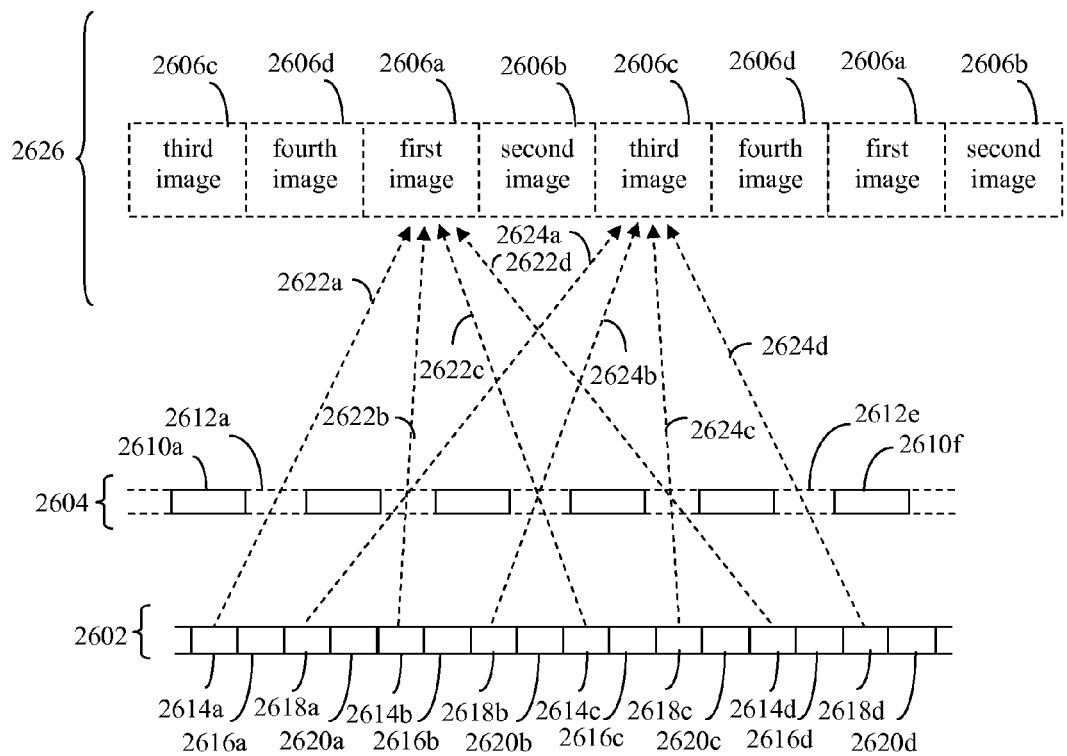

FIG. 26

APPLICATION PROGRAMMING INTERFACE SUPPORTING MIXED TWO AND THREE DIMENSIONAL DISPLAYS

CROSS REFERENCE TO RELATED APPLICATIONS

This application claims the benefit of U.S. Provisional Application No. 61/291,818, filed on Dec. 31, 2009, which is incorporated by reference herein in its entirety; and This application claims the benefit of U.S. Provisional Application No. 61/303,119, filed on Feb. 10, 2010, which is incorporated by reference herein in its entirety.

This application is also related to the following U.S. Patent Applications, each of which also claims the benefit of U.S. Provisional Patent Application Nos. 61/291,818 and 61/303,119 and each of which is incorporated by reference herein:

U.S. patent application Ser. No. 12/845,409, titled "Display With Adaptable Parallax Barrier," filed Jul. 28, 2010;

U.S. patent application Ser. No. 12/845,440, titled "Adaptable Parallax Barrier Supporting Mixed 2D And Stereoscopic 3D Display Regions," filed Jul. 28, 2010;

U.S. patent application Ser. No. 12/845,461, titled "Display Supporting Multiple Simultaneous 3D Views," filed Jul. 28, 2010;

U.S. patent application Ser. No. 12/774,307, titled "Display with Elastic Light Manipulator," filed May 5, 2010;

U.S. patent application Ser. No. 12/982,020, titled "Backlighting Array Supporting Adaptable Parallax Barrier," filed on same date herewith;

U.S. patent application Ser. No. 12/982,124, titled "Operating System Supporting Mixed 2D, Stereoscopic 3D And Multi-View 3D Displays," filed on same date herewith;

U.S. patent application Ser. No. 12/982,140, titled "Internet Browser And Associated Content Definition Supporting Mixed Two And Three Dimensional Displays," filed on same date herewith; and U.S. patent application Ser. No. 12/982,156, titled "Programming Architecture Supporting Mixed Two And Three Dimensional Displays," filed on same date herewith.

BACKGROUND OF THE INVENTION

1. Field of the Invention

The present invention relates to application programming interfaces associated with applications that provide three-dimensional content.

2. Background Art

Images may be generated for display in various forms. For instance, television (TV) is a widely used telecommunication medium for transmitting and displaying images in monochromatic ("black and white") or color form. Conventionally, images are provided in analog form and are displayed by display devices in two-dimensions. More recently, images are being provided in digital form for display in two-dimensions on display devices having improved resolution (e.g., "high definition" or "HD"). Even more recently, images capable of being displayed in three-dimensions are being generated.

Conventional displays may use a variety of techniques to achieve three-dimensional image viewing functionality. For example, various types of glasses have been developed that may be worn by users to view three-dimensional images displayed by a conventional display. Examples of such glasses include glasses that utilize color filters or polarized filters. In each case, the lenses of the glasses pass two-dimensional images of differing perspective to the user's left and right eyes. The images are combined in the visual center of the brain of the user to be perceived as a three-dimensional image. In another example, synchronized left eye, right eye LCD (liquid crystal display) shutter glasses may be used with conventional two-dimensional displays to create a three-dimensional viewing illusion. In still another example, LCD display glasses are being used to display three-dimensional images to a user. The lenses of the LCD display glasses include corresponding displays that provide images of differing perspective to the user's eyes, to be perceived by the user as three-dimensional.

Some displays are configured for viewing three-dimensional without the user having to wear special glasses, such as by using techniques of autostereoscopy. For example, a display may include a parallax barrier that has a layer of material with a series of precision slits. The parallax barrier is placed proximal to a display so that a user's eyes each see a different set of pixels to create a sense of depth through parallax. Another type of display for viewing three-dimensional images is one that includes a lenticular lens. A lenticular lens includes an array of magnifying lenses configured so that when viewed from slightly different angles, different images are magnified. Displays are being developed that use lenticular lenses to enable autostereoscopic images to be generated.

As such, many types of display devices exist that are capable of displaying three-dimensional images, and further types are being developed. Different types of displays that enable three-dimensional image viewing may have different capabilities and attributes, including having different depth resolutions, being configured for three-dimensional image viewing only, being switchable between two-dimensional image viewing and three-dimensional image viewing, and further capabilities and attributes. Furthermore, different types of applications may be configured to provide and/or interact with the displays to provide either two-dimensional or three-dimensional image content. However, each application may not be directly compatible with each type of display device.

BRIEF SUMMARY OF THE INVENTION

Methods, systems, and apparatuses are described for application programming interfaces that interface applications with display devices that have three-dimensional image display capability, substantially as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 5 shows a flowchart providing a process for an API to configure a display screen for display of mixed 2D and 3D content, according to exemplary embodiments.

Figure 9:
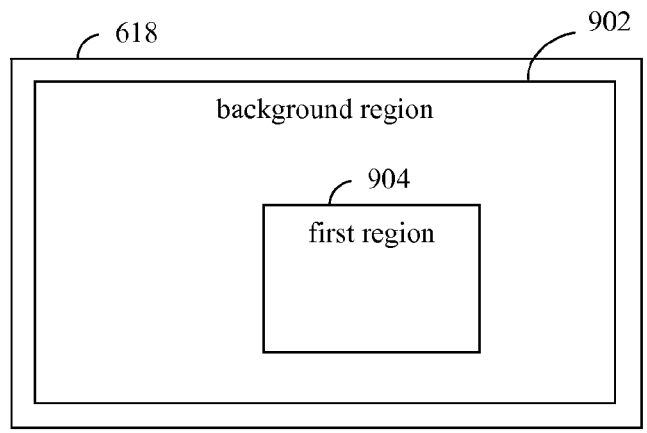
Figure 10A:
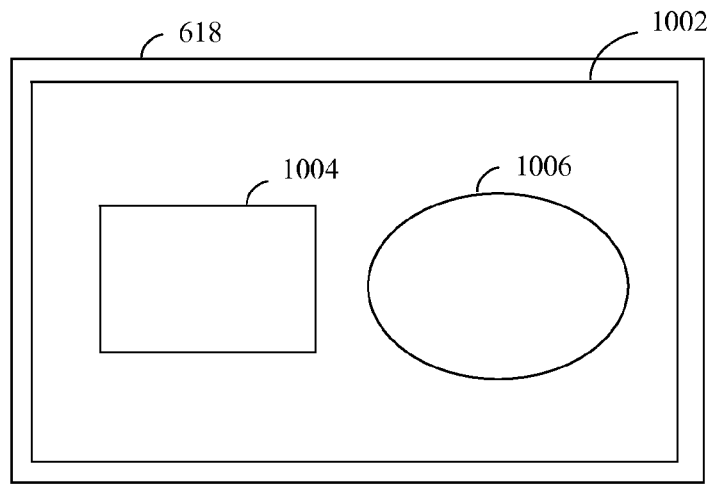
Figure 10B:
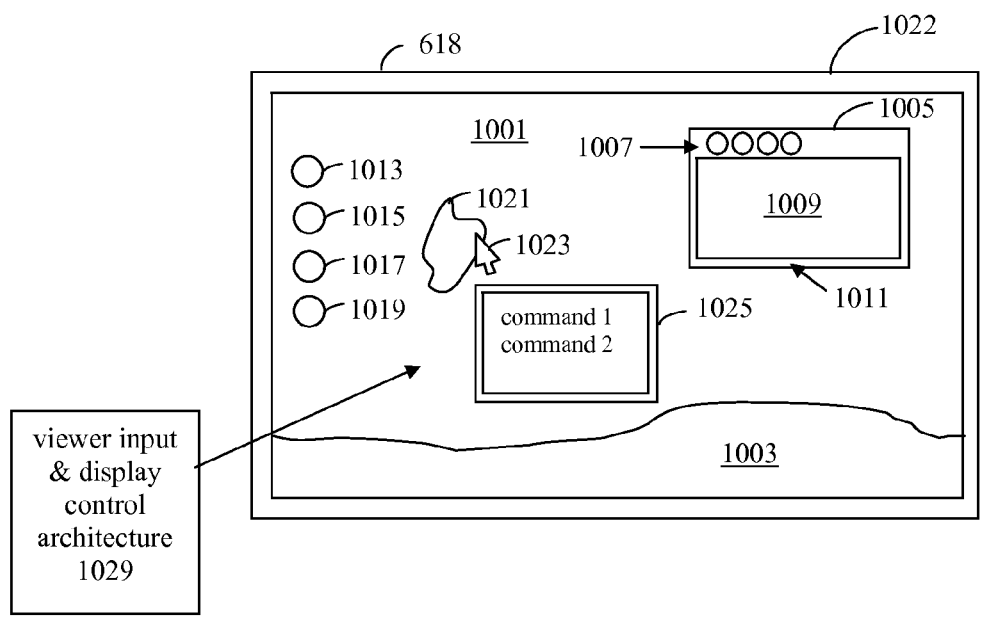
Figure 11:
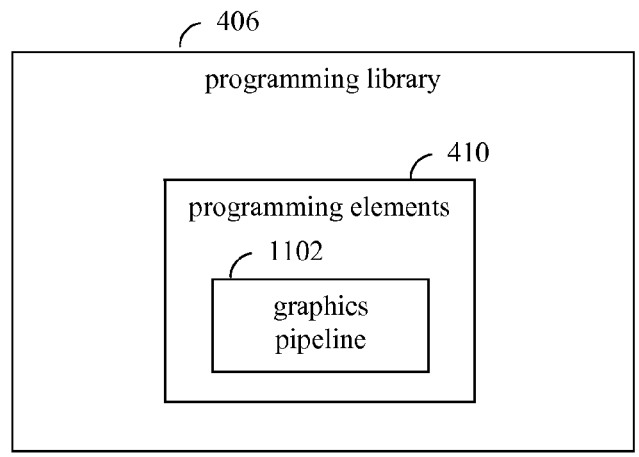
Figure 12:
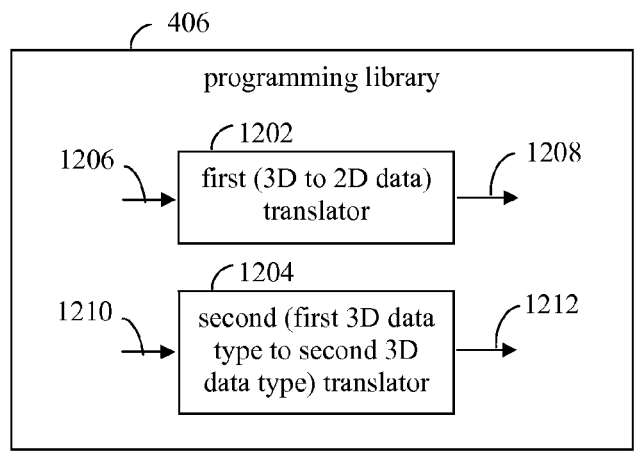

FIGS. 8, 9, 10A, and 10B show examples of display screens displaying content in various screen regions, according to embodiments FIG. 11 shows a block diagram of an API programming library that includes a graphics pipeline for regional rendering of 2D and 3D content, according to an exemplary embodiment FIG. 12 shows a block diagram of an API programming library that includes content translators, according to an exemplary embodiment.

Figure 13:
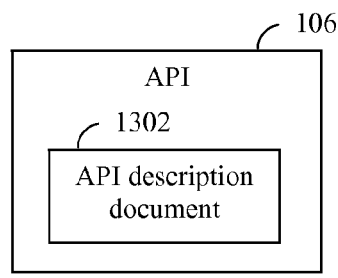

FIG. 13 shows a block diagram of an API that includes a description document that describes calling conventions for applications to configure displays for the regional display of 2D and 3D content, according to an exemplary embodiment.

Figure 14:
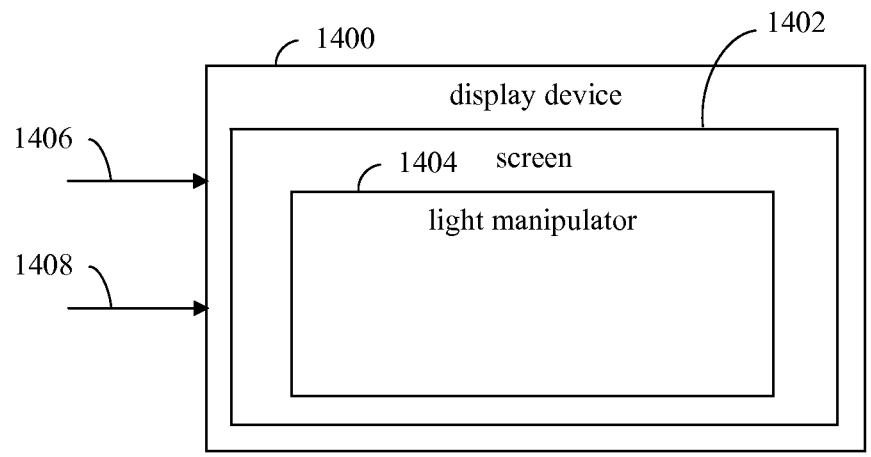

FIG. 14 shows a block diagram of a display device having a light manipulator that enables display of 3D content by a screen, according to an exemplary embodiment.

Figure 15:
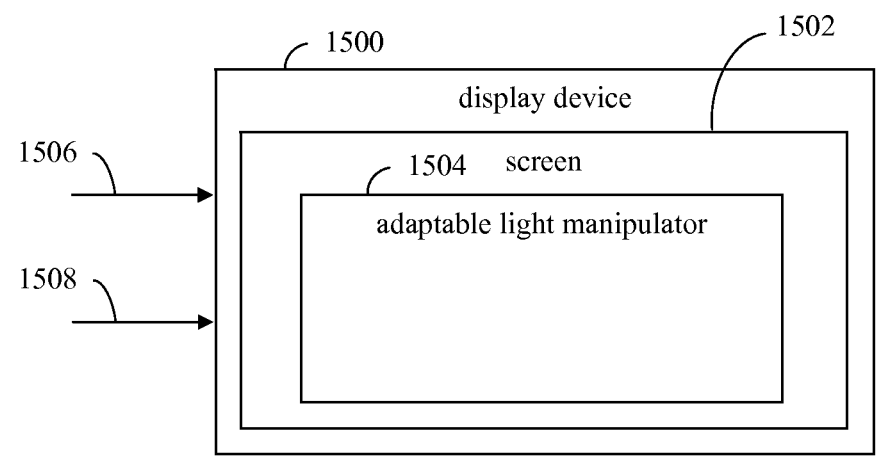

FIG. 15 shows a block diagram of a display device having an adaptable light manipulator that enables the adaptable display of 3D content by a screen, according to an exemplary embodiment.

Figure 16:
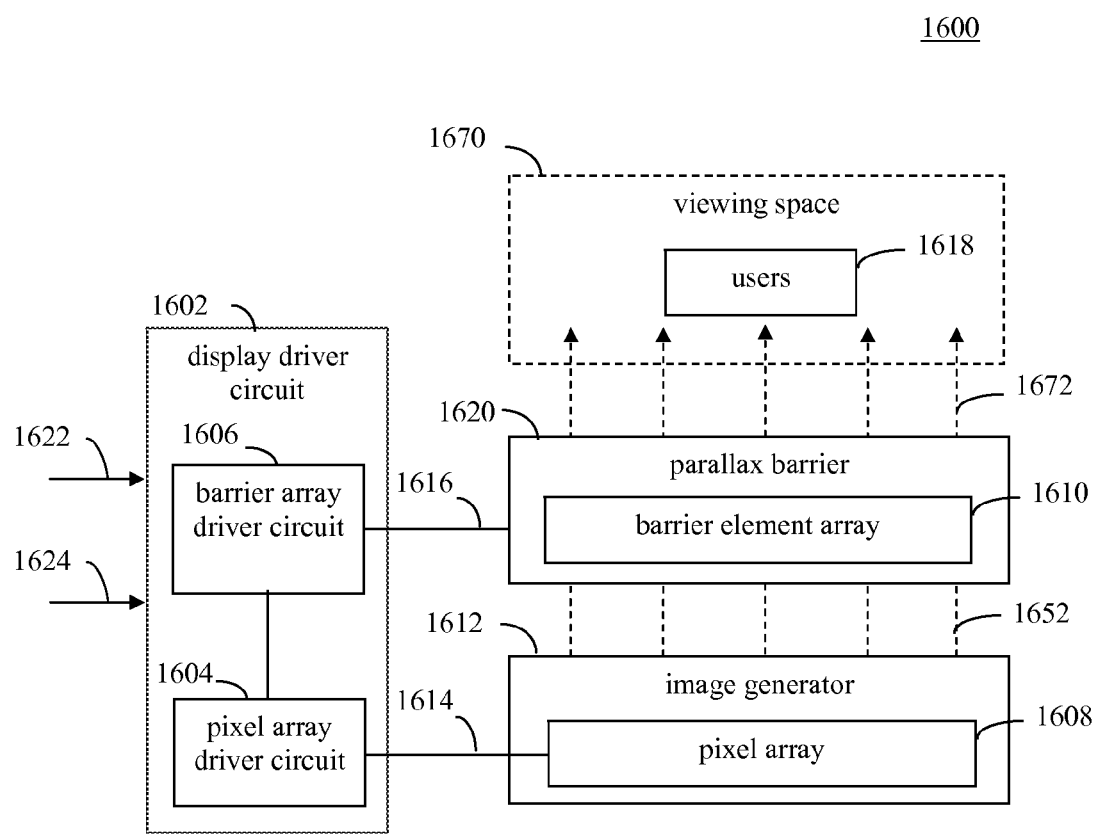
Figure 17:
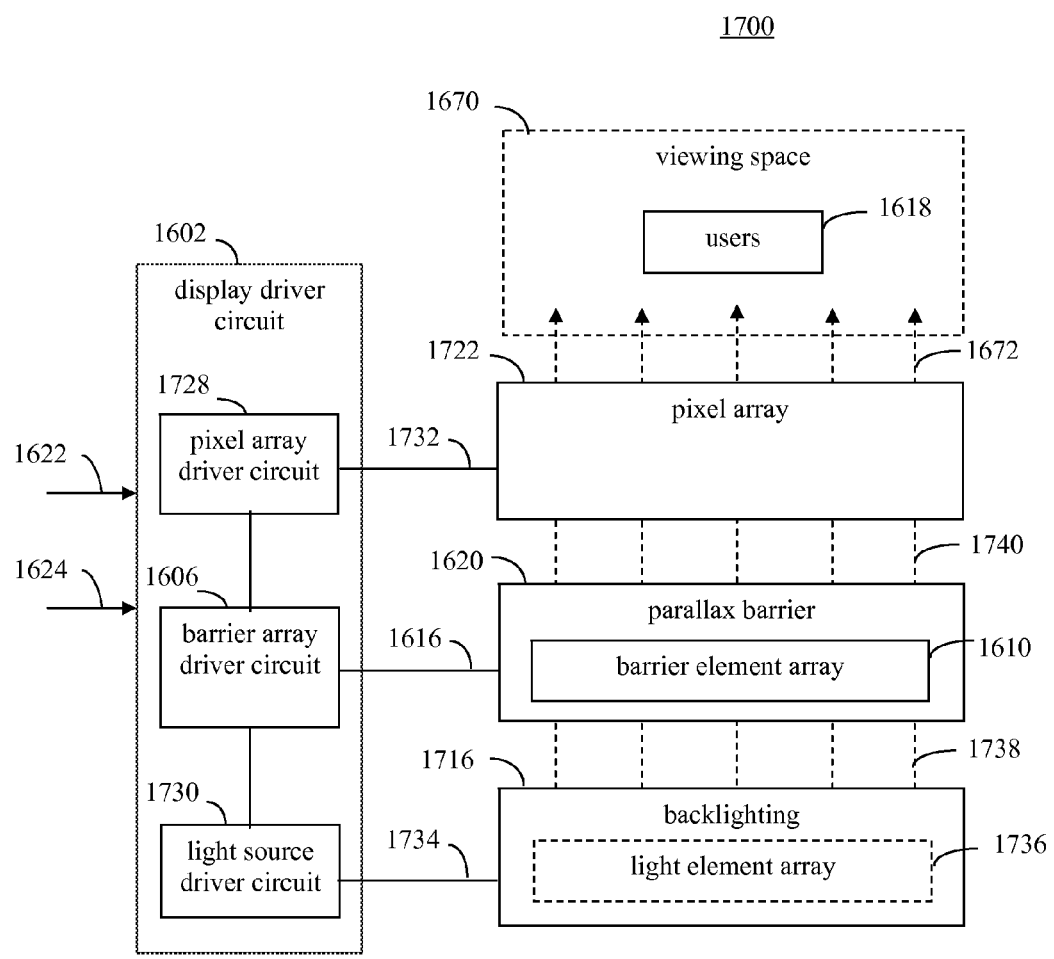

FIGS. 16 and 17 show block diagrams of examples of the display device of FIG. 15, according to embodiments.

Figure 18:
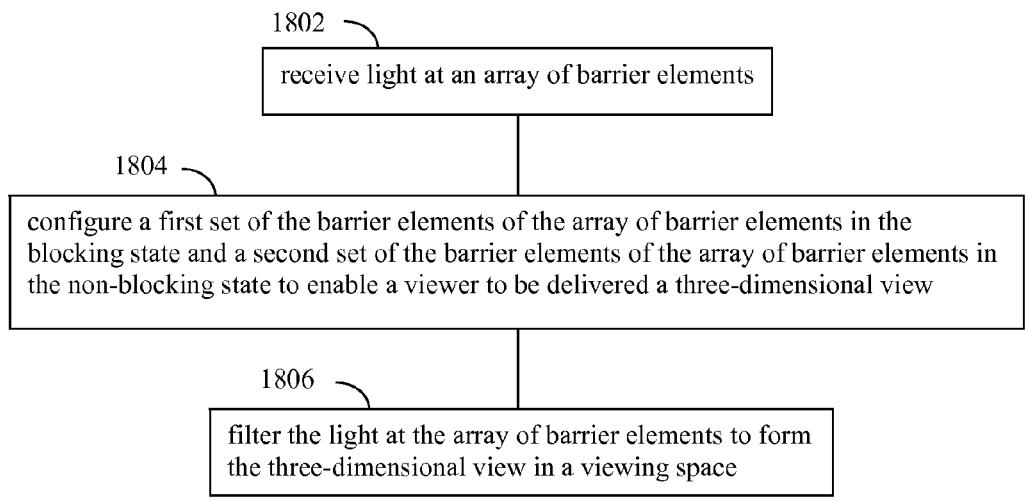

FIG. 18 shows a flowchart for generating three-dimensional images, according to an exemplary embodiment.

Figure 19:
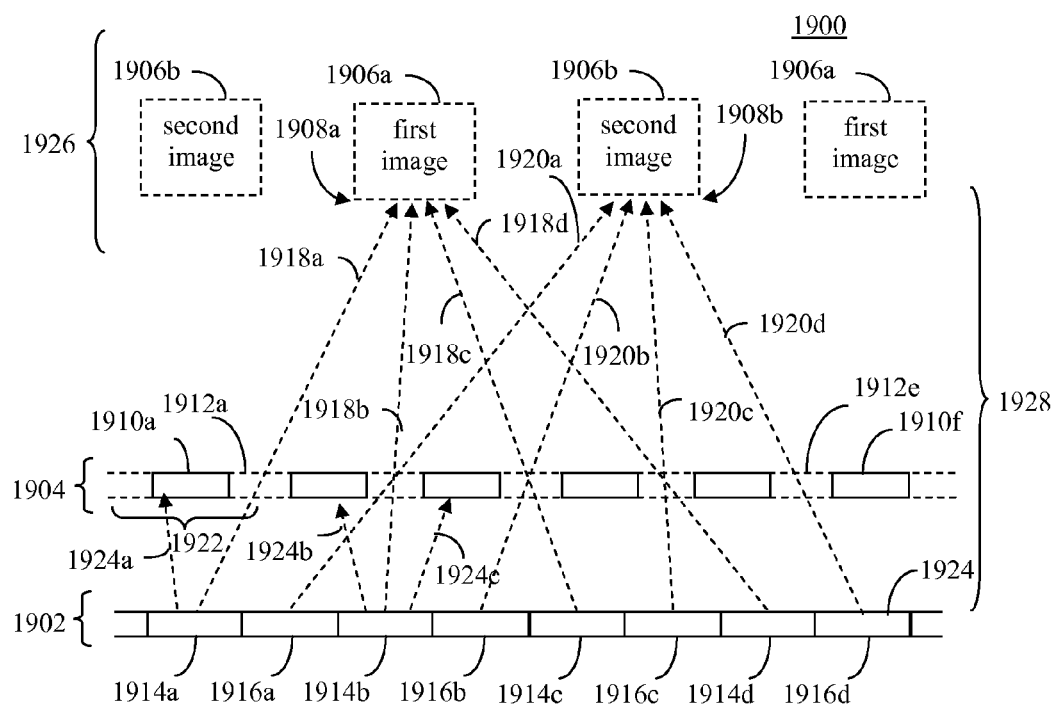

FIG. 19 shows a cross-sectional view of an example of a display system, according to an embodiment.

Figure 20:
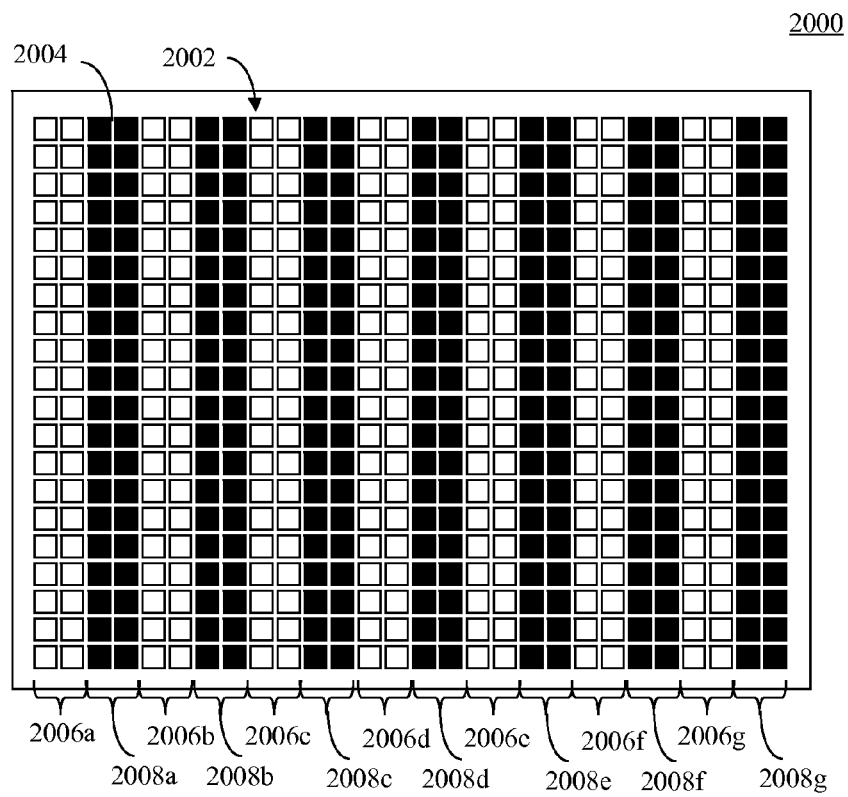
Figure 21:
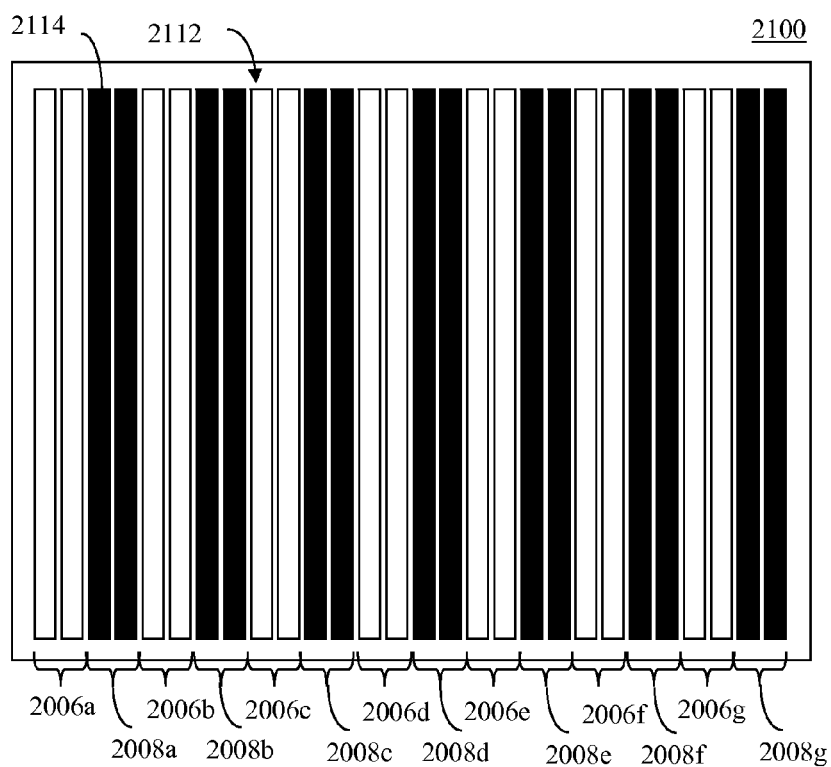

FIGS. 20 and 21 shows view of example parallax barriers with non-blocking slits, according to embodiments.

Figure 22:
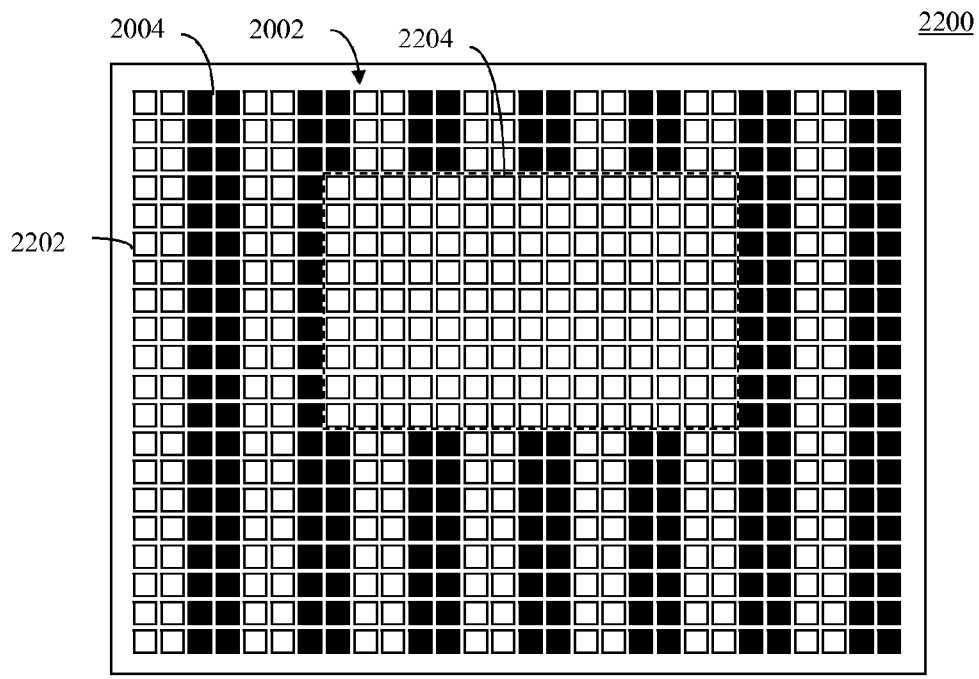

FIG. 22 shows a view of the barrier element array of FIG. 20 configured to enable the simultaneous display of two-dimensional and three-dimensional images of various sizes and shapes, according to an exemplary embodiment.

Figure 23:
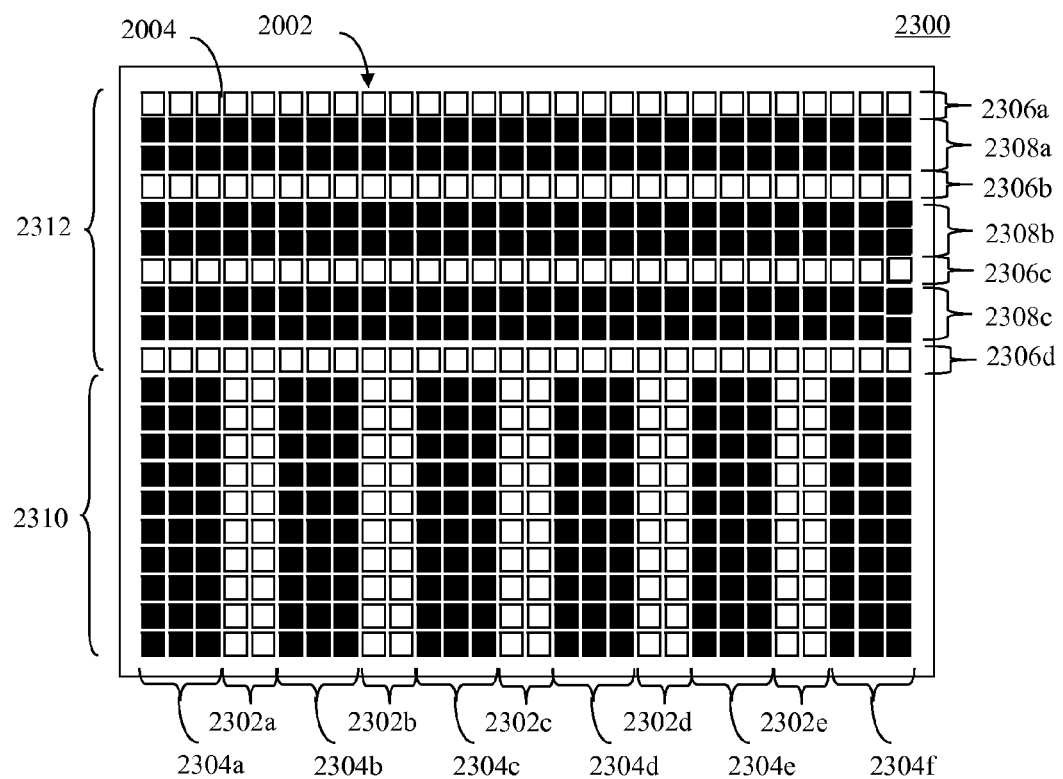

FIG. 23 shows a view of the parallax barrier of FIG. 20 with differently oriented non-blocking slits, according to an exemplary embodiment.

Figure 24:
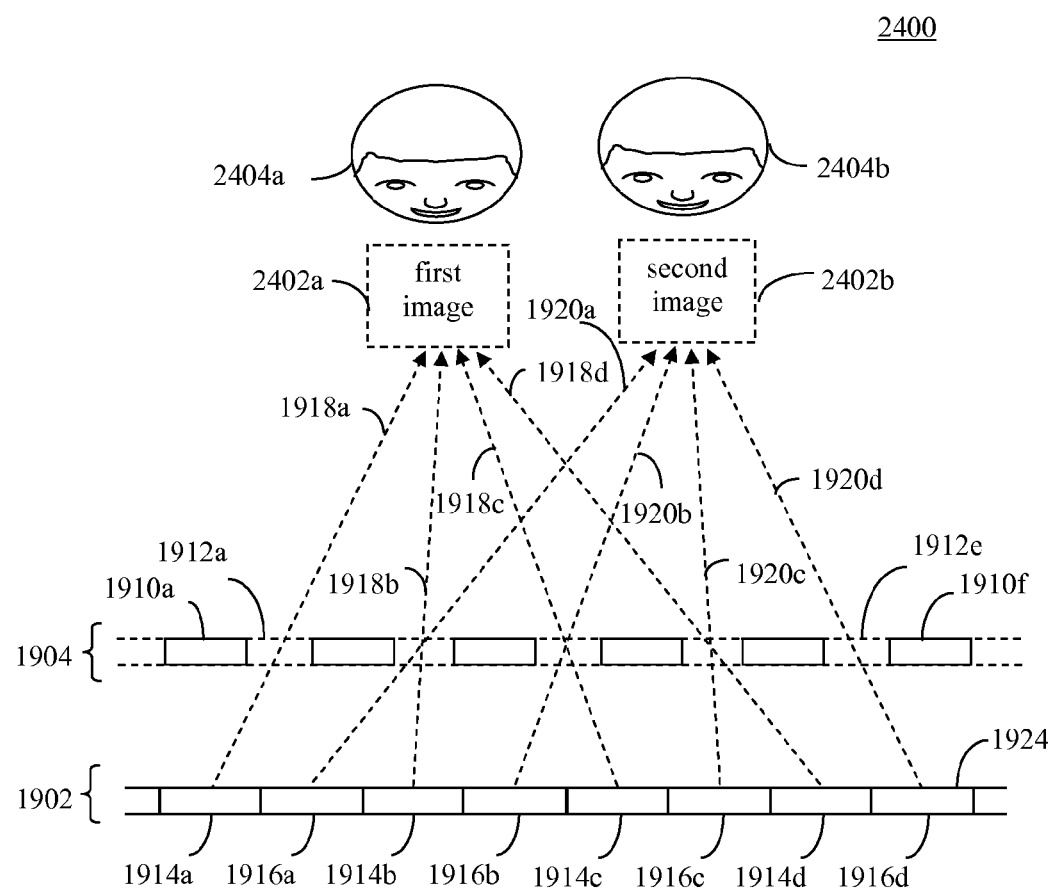

FIG. 24 shows a display system providing two two-dimensional images that are correspondingly viewable by a first viewer and a second viewer, according to an exemplary embodiment.

FIG. 25 shows a flowchart for generating multiple three-dimensional images, according to an exemplary embodiment.

FIG. 26 shows a cross-sectional view of an example of the display system of FIG. 15, according to an embodiment.

Figure 27:
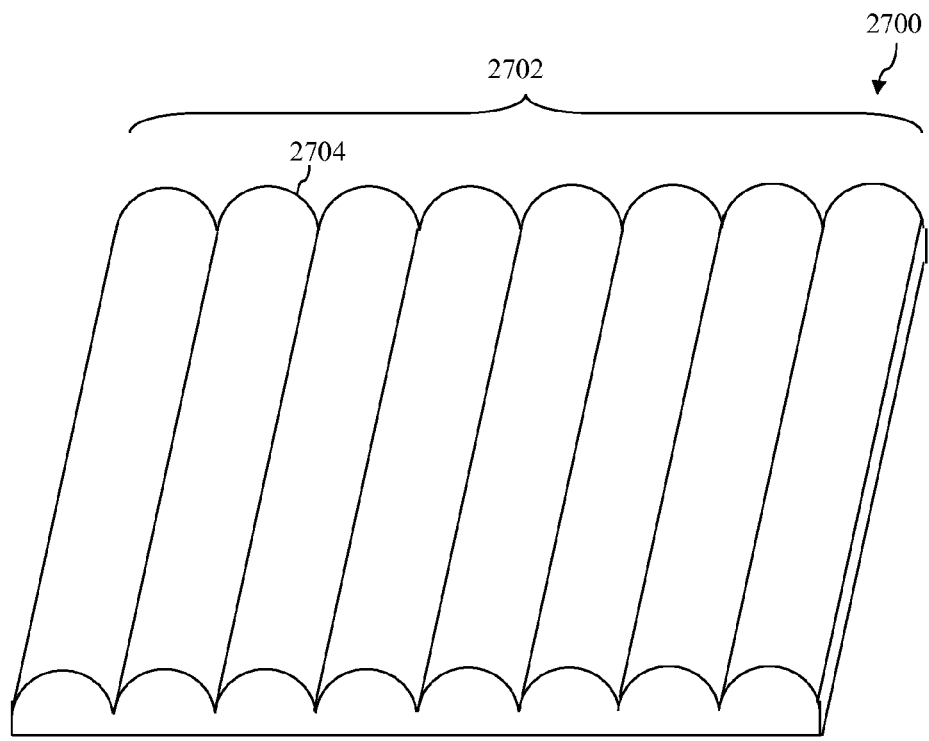
Figure 28:
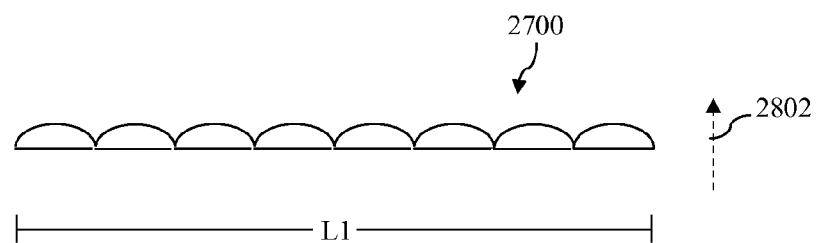

FIGS. 27 and 28 show views of a lenticular lens, according to an exemplary embodiment.

Figure 29:
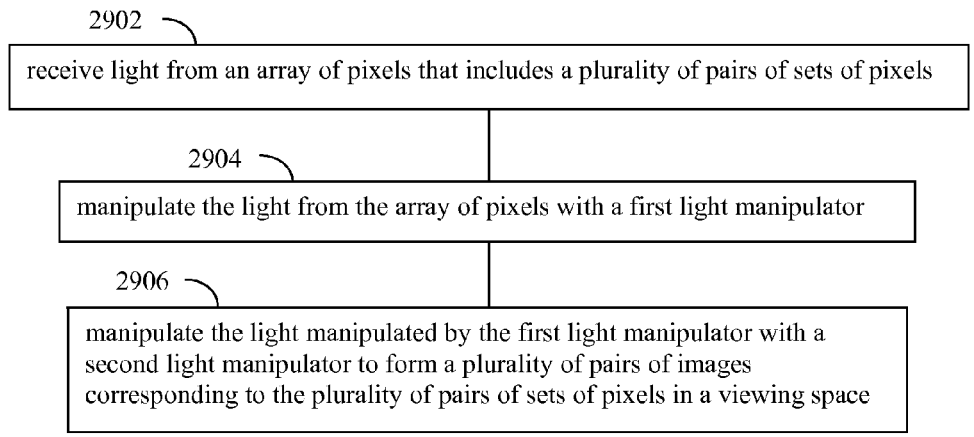

FIG. 29 shows a flowchart for generating multiple three-dimensional images using multiple light manipulator layers, according to an exemplary embodiment.

Figure 30:
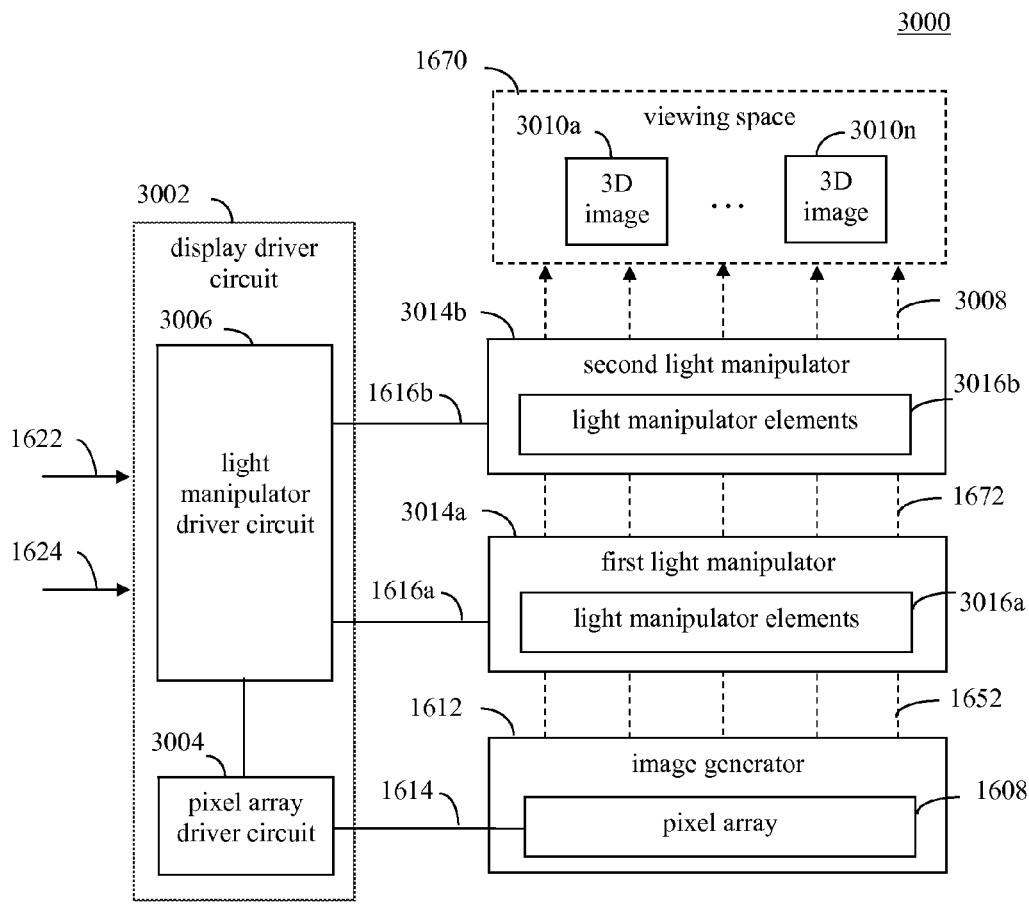

FIG. 30 shows a block diagram of a display system, according to an exemplary embodiment.

Figure 31:
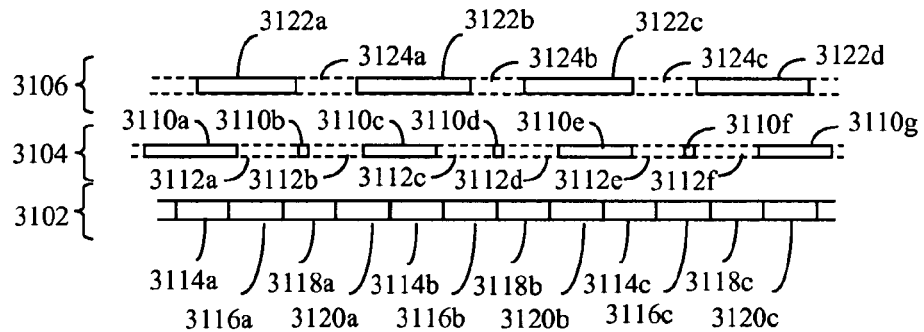
Figure 32:
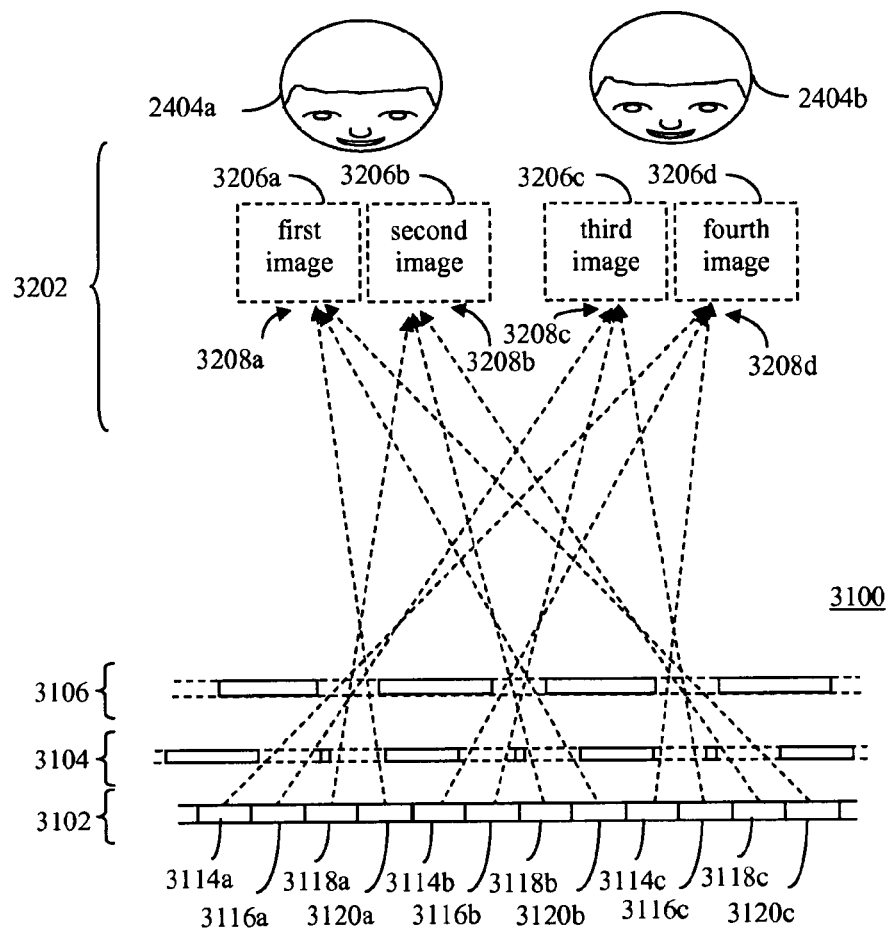

FIGS. 31 and 32 show cross-sectional views of a display system, according to an exemplary embodiment.

Figure 33:
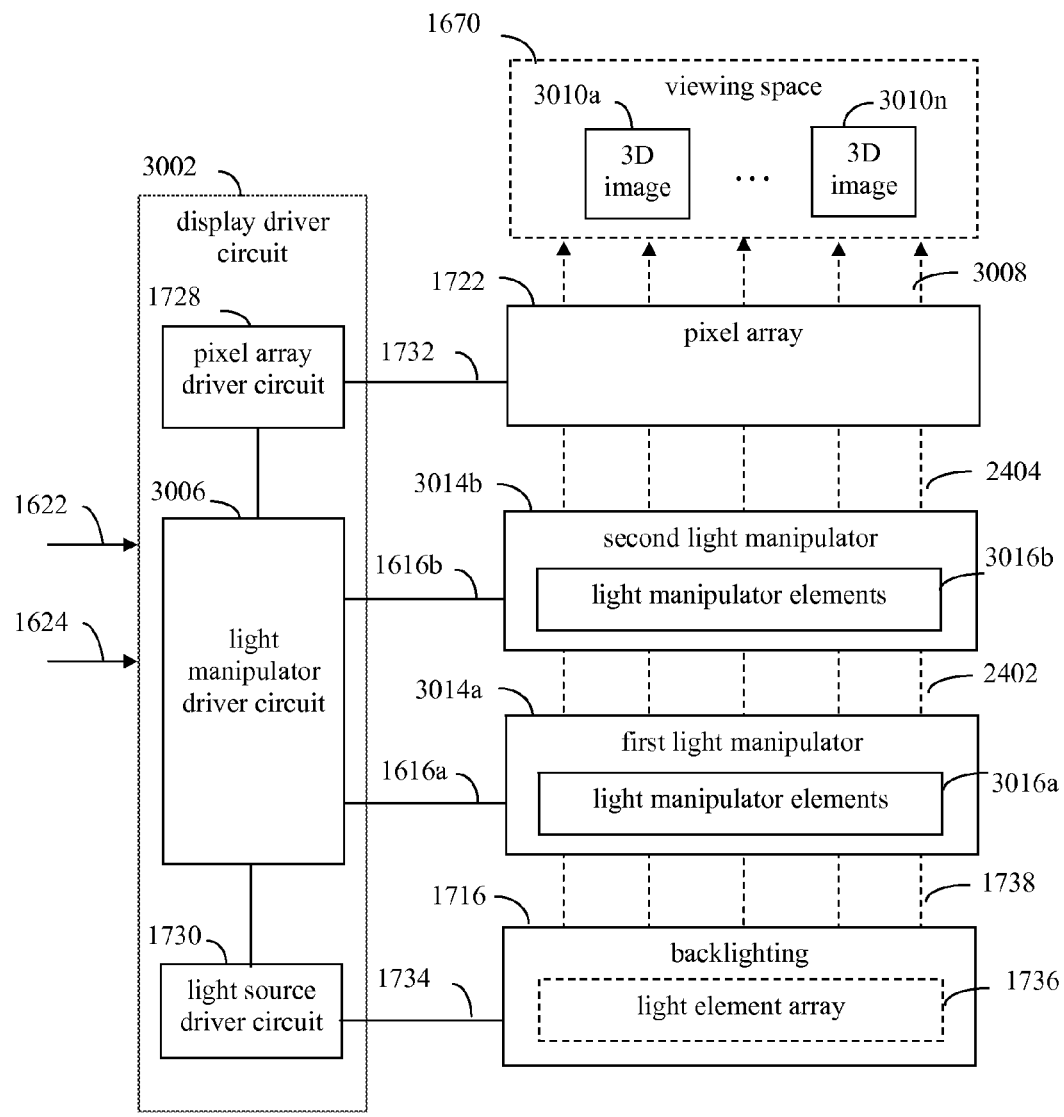

FIG. 33 shows a block diagram of a display system, according to an exemplary embodiment.

Figure 34:
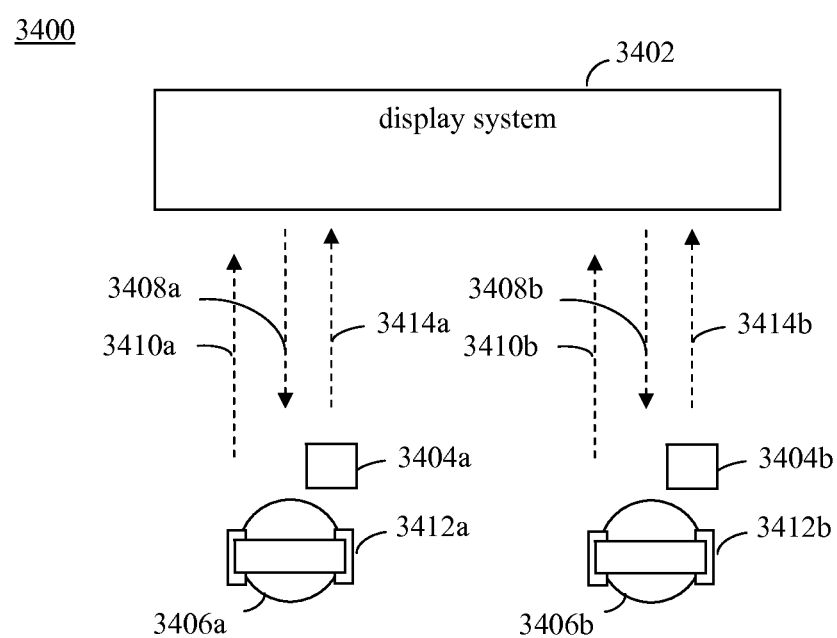

FIG. 34 shows a block diagram of a display environment, according to an exemplary embodiment.

Figure 35:
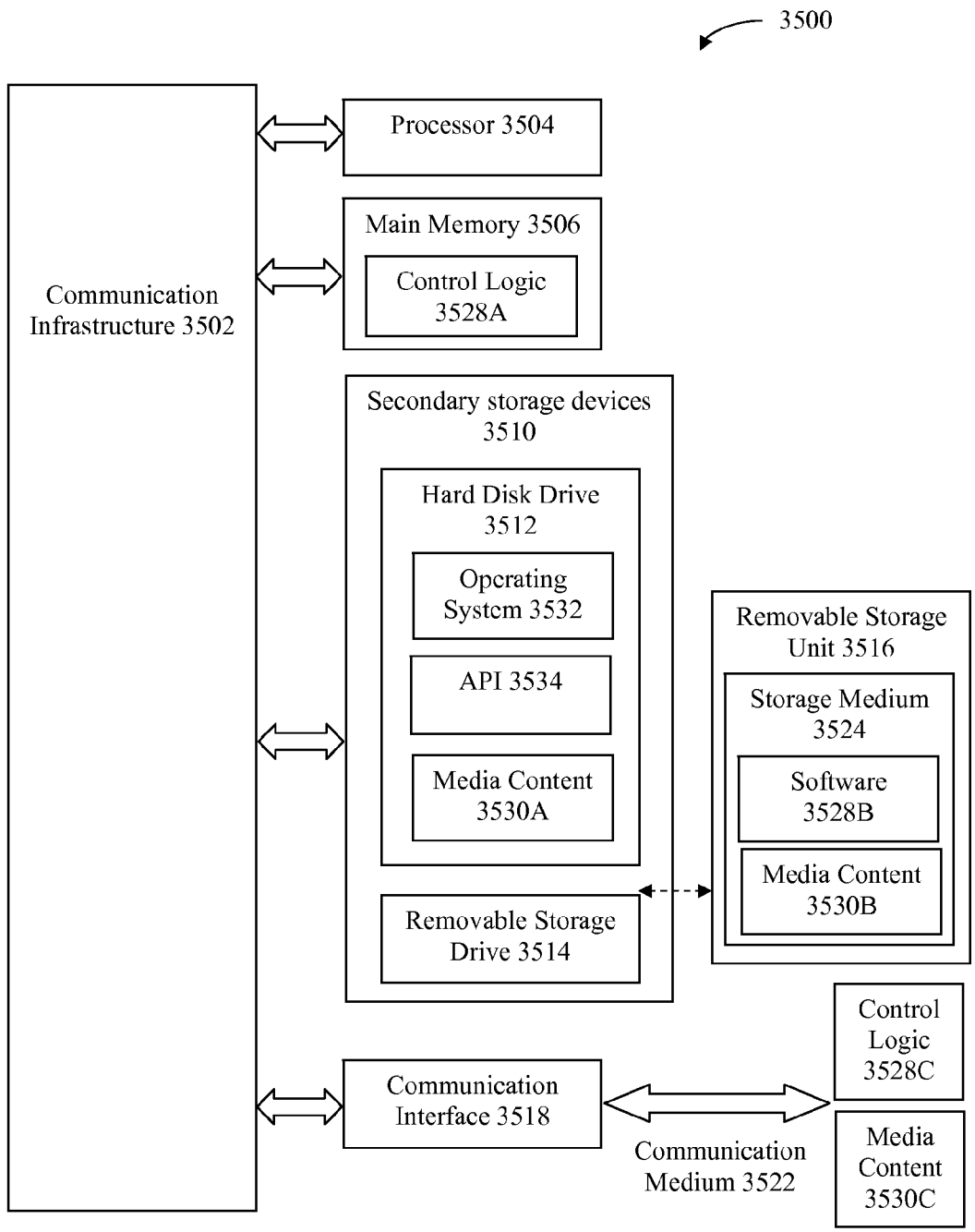

FIG. 35 shows a block diagram of an example electronic device, according to an embodiment.

Figure 36:
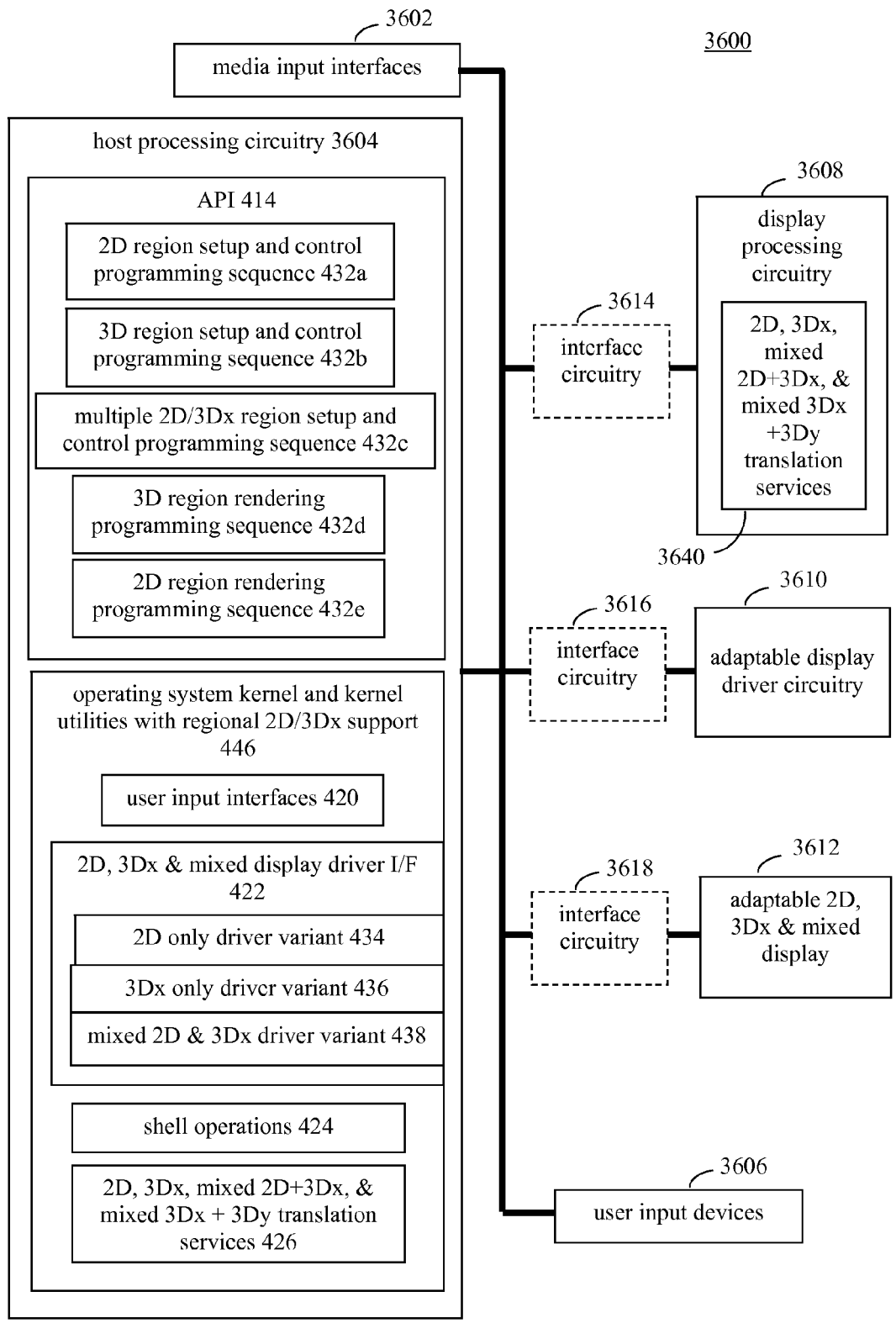

FIG. 36 shows a block diagram of a display system that supports mixed 2D, stereoscopic 3D and multi-view 3D displays, according to an exemplary embodiment.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

I. Introduction

The present specification discloses one or more embodiments that incorporate the features of the invention. The disclosed embodiment(s) merely exemplify various aspects of the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

II. Exemplary Embodiments

The present invention relates to an application programming interface (API) that provides support for the display of mixed two-dimensional and three-dimensional content. In embodiments, APIs interface applications and display devices, enabling the applications to configure screens of the display devices for the display of mixed 2D and 3D content. For instance, an API may include a vocabulary and a calling convention that a programmer of an application may use to pass commands from the application to a device driver configured to control the display of content. The vocabulary and calling convention may be used to define a region (e.g., a window, a frame, etc.) within which to display video content and to specify one or more parameters to be associated with the region. The parameters can specify, for example, one or more of: a type of video content that will be displayed within the region (e.g., 2D, stereoscopic 3D or a particular type of multi-view 3D), a desired orientation of the video content within the region, a brightness/contrast to be associated with the region, and/or a video resolution to be associated with the region. When the device driver receives a configuration request or set of configuration requests that define such a region and also specifies parameters associated with the region, the display driver controls driver circuitry associated with the display so that the defined region is opened on the display and video content is presented therein in a manner that is consistent with the associated parameters. A user interface may also be provided along with the device driver that allows a user to associate parameters with a region by issuing commands in accordance with the API. The API may include a standard API that is used to provide an abstraction layer for interacting with a plurality of different display devices produced by different manufacturers.

In embodiments, an API may enable a display device to display images, video, and further types of content in two-dimensions and three-dimensions that are provided by applications. Such content may be received and processed by applications, or may be internally generated by applications. Numerous types of display devices may display 2D and 3D content as configured through an API. For example, the display devices may include one or more light manipulators, such as parallax barriers and/or lenticular lenses, to deliver 3D media content in the form of images or views to the eyes of the viewers. Other types may include display devices with 3D display pixel constructs (e.g., multiple layers of pixels that can be illuminated in the different layers to provide depth) that may or may not employ such light manipulators. When used, light manipulators may be fixed or dynamically modified to change the manner in which the views are delivered. For instance, embodiments enable light manipulators that are adaptable to accommodate a changing viewer sweet spot, switching between two-dimensional (2D), stereoscopic three-dimensional (3D), and multi-view 3D views, as well as the simultaneous display of 2D, stereoscopic 3D, and multi-view 3D content. With regard to parallax barriers, example features that may be dynamically modified include one or more of a number of slits in the parallax barriers, the dimensions of each slit, the spacing between the slits, and the orientation of the slits. Slits of the parallax barriers may also be turned on or off in relation to certain regions of the screen such that simultaneous mixed 2D, stereoscopic 3D, and multi-view 3D presentations can be accommodated. Similarly, a lenticular lens may be dynamically modified, such as by modifying a width of the lenticular lens, to modify delivered images.

The following subsections describe numerous exemplary embodiments of the present invention. For instance, the next subsection describes embodiments for APIs, followed by a subsection that describes embodiments for displaying content using APIs, a subsection that describes example displays, a subsection that describes example display environments, and a subsection that describes example electronic devices. It noted that the section/subsection headings provided herein are not intended to be limiting. Embodiments are described throughout this document, and any type of embodiment may be included under any section/subsection.

It will be apparent to persons skilled in the relevant art that various changes in form and detail can be made to the embodiments described herein without departing from the spirit and scope of the invention. Thus, the breadth and scope of the present invention should not be limited by any of exemplary embodiments described herein.

A. Example API Embodiments

In embodiments, application programming interfaces (APIs) that are configured to enable applications to display mixed content are provided. An application may generate a command in the form of a call to configure a display screen region (e.g., a window or frame) in which image or video content can be displayed. The command is received by an API, and processed by the API according to a calling convention for the particular call. The command may specify one or more parameters for the screen region. The parameters can specify, for example, one or more of: a type of video content to be displayed within the screen region (e.g., 2D, stereoscopic 3D, or a particular type of multi-view 3D), a desired display orientation of the video content within the screen region, a brightness/contrast to be associated with the screen region, a video resolution to be associated with the screen region (e.g., 720p, 1080p, etc.), and/or further parameters described herein. The parameters to be associated with a screen region may be specified programmatically or determined dynamically at run-time. The parameters may also be modified at run-time by a user through a user control interface provided by the screen region. The API may process the call to provide configuration information to a device driver so that a region is opened on the display and the video content is presented therein in a manner that is consistent with the associated parameters.

Figure 1:
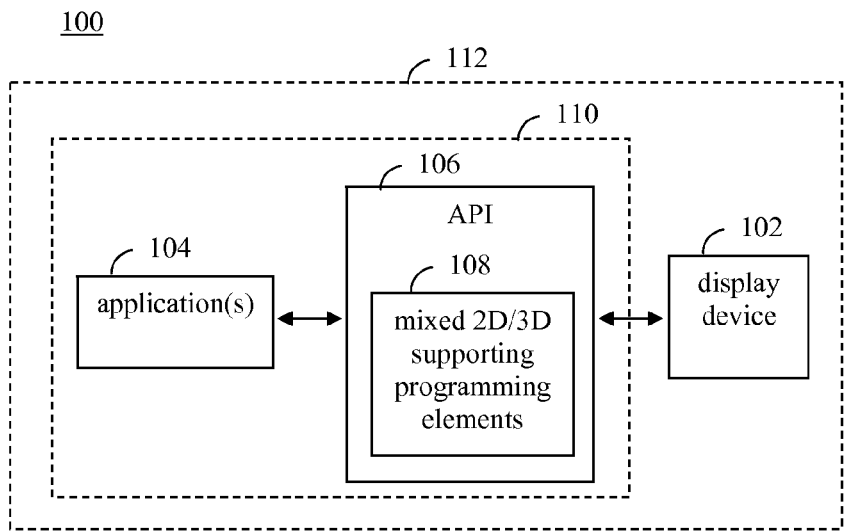
FIG. 1 shows a block diagram of an electronic device that includes an application programming interface (API) that processes calls from applications to enable the display of 2D (two-dimensional) and 3D (three-dimensional) content, according to an exemplary embodiment.

For instance, FIG. 1 shows a block diagram of a display system 100, according to an exemplary embodiment. As shown in FIG. 1, system 100 includes a display device 102, an application 104, and an API 106. System 100 is a system where API 106 configures display device 102 for display of content according to commands/calls from application 104, and provides content to display device 102 for display. System 100 is described as follows.

System 100 may be implemented in one or more devices. For example, in one embodiment, application 104, API 106, and display device 102 may be implemented in a common electronic device 112 that may be accessed by a user, such as a mobile computing device (e.g., a handheld computer, a laptop computer, a notebook computer, a tablet computer (e.g., an Apple iPad™), a netbook, etc.), a mobile phone (e.g., a cell phone, a smart phone), a mobile email device, some types of televisions, etc. In another embodiment, as shown in FIG. 1, application 104 and API 106 may be implemented in an electronic device 110 that is separate from display device 102. For instance, device 110 may be a home theater system receiver, a set-top box, a computer, a game console, or other such device, and display device 102 may be a display device that is coupled to device 110 in a wired or wireless fashion.

Application 104 may be any type of application that is capable of generating and/or processing content for display. For instance, application 104 may be implemented in software (e.g., computer programs and/or data) that runs on a device. Application 104 may generate or receive an image file, a video file or stream, or other item of content. For instance, application 104 may be a media player that is configured to load and/or read a content file and/or stream, and to display the associated content. Application 104 may receive the content from a local storage device, over a network (e.g., a local area network (LAN), a wide area network (WAN), or a combination of communication networks, such as the Internet), or may receive the content from another source. Alternatively, application 104 may be a graphics application and/or any other form of application that generates its own content for display. Application 104 may make calls to API 106 to configure one or more screen regions of a display screen of display device 102 for display of content, and may transmit the content for display in the region(s). Example description of implementations of programming languages for application 104 and other applications described herein is provided in pending U.S. patent application Ser. No. 12/982,156, titled "Programming Architecture Supporting Mixed Two And Three Dimensional Displays," filed on same date herewith, which is incorporated by reference herein in its entirety, although application 104 and further applications described herein are not limited to such implementations.

API 106 is an interface for applications such as application 104. API 106 enables the applications to interact with display device 102. API 106 receives calls from applications to configure regions of the screen of display device 102 for display of content. API 106 may receive content from the applications that includes graphics information, and may be configured to perform graphics operations on the graphics information received from the applications. API 106 may be implemented in a same device as application 104, or a separate device. API 106 may be a special purpose API, or may include features of a commercially available API, such as Microsoft DirectX® (e.g., Direct3D®), OpenGL®, or other 3D graphics API, which may be modified according to embodiments to receive commands and/or content from application 104. API 106 may be implemented in software (e.g., computer program code or logic), hardware, firmware, or a combination thereof.

As shown in FIG. 1, API 106 includes mixed 2D/3D supporting programming elements 108. Mixed 2D/3D supporting programming elements 108 may be maintained in the form of a library, and may be coded in a programming language, compiled or un-compiled, that enables API 106 to support display of mixed 2D and 3D content, according to an exemplary embodiment. For example, programming elements 108 may enable API 106 to configure and/or provide two- and three-dimensional content for display by display devices that are capable of separately displaying two-dimensional and three-dimensional content, display devices that are capable of simultaneously displaying two-dimensional and three-dimensional content, display devices that are capable of simultaneously displaying different types of three-dimensional content, as well as display devices that can adaptively change the display of two-dimensional and three-dimensional contents (e.g., by modifying display screen regions, etc.).

For example, 2D/3D supporting programming elements 108 may be capable of enabling application 104 to display 2D and 3D content at display device 102 in a manner based on the content itself and/or based on one or more commands and/or parameters provided with the commands. For instance, API 106 may support commands for configuring display screen regions for display of 2D or 3D content, including one or more types of 3D content. Specific commands may be provided by application 104 to configure screen regions (e.g., a "configure_screen_for_3D4" command, etc.), and/or one or more parameters may be included with commands/calls that indicate types and characteristics of 2D and 3D content and/or the screen regions in which the content is to be displayed. For example, a command and/or a parameter may indicate whether the content is to be displayed as 2D or 3D. Further commands and/or parameters may be defined to indicate various types of three-dimensional content, such as "3D-4" to indicate 3D multiview content with four camera views, "3D-8" to indicate 3D multiview content with eight camera views, "3D-HVGA" to indicate three-dimensional HVGA (half-size VGA), etc. Any number of commands and/or parameters may be available to indicate one or more 3D display characteristics, such as stereoscopic depth (e.g., a "depth" parameter), brightness (e.g., a "brightness" parameter), a size of a region of a screen in which the 3D content is to be displayed (e.g., a "regionsize" parameter having attributes such as row, column, width, and height parameters), a resolution parameter (e.g., a "resolution" parameter), a window orientation parameter indicating whether image content is to be displayed vertically or rotated by 90 degrees or by other amount (e.g., an "orientation" parameter), a window shape or freeform window parameter indicating a non-rectangular shape for the displayed content (e.g., a "freeform" parameter), a display region type parameter (e.g., a window, a frame, a tab, etc.). Programmers may be enabled to use such commands and/or parameters, compatible with a calling convention of API 106, to define application 104 to display 2D and/or 3D content.

For instance, an example command that may be received by API 106 for configuring a screen region is provided as follows:

configure_screen_region [3D4], [default], [0, 0, 100, 200], [80], [90]

The example command shown above is a command for configuring a region of a display screen. As shown above, the command includes five parameters, including a display type parameter that is 3D-4 in this example, a freeform parameter having a value of "default" that indicates the region should be rectangular shaped, a region size parameter that defines a region location having an upper left region corner at coordinates (0, 0) and a region size of 100 by 200 pixels, a brightness parameter of 80% of full brightness, and an orientation parameter indicating the displayed content is to be rotated clockwise by 90 degrees. The parameters shown above for the configure_screen_region command are provided for purposes of illustration, and the command may have additional and/or alternative parameters that are described herein or otherwise known. Furthermore, additional and/or alternative commands for a programming language to support configuring and displaying mixed 2D and 3D content in further ways may be formed in a similar manner, as would be apparent to persons skilled in the relevant art(s) from the teachings herein. In an embodiment, such a command may be received by API 106, and a call to a programming element of programming elements 108 may be made based on the command to enable a function of configuring a display screen region according to the command.

Figure 2:
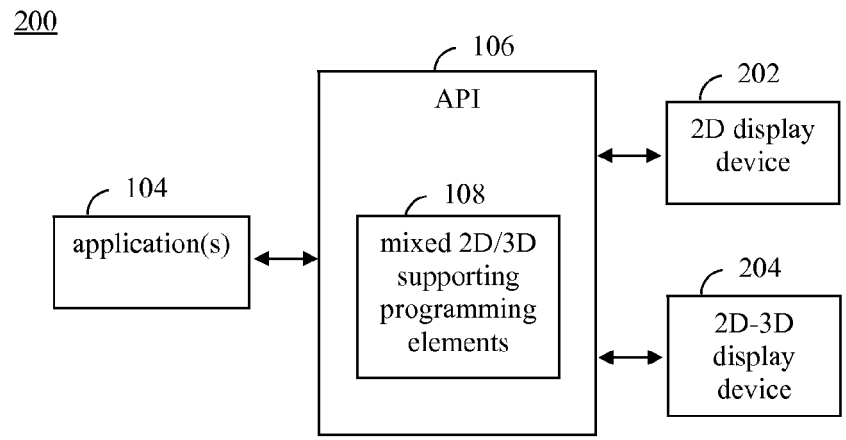
FIGS. 2 and 3 show block diagrams of systems that include APIs that are capable of configuring displays for display of 2D and 3D content, according to exemplary embodiments.

In embodiments, display device 102 may be one of a variety of display devices capable of displaying two-dimensional and/or three-dimensional content. For instance, FIG. 2 shows a block diagram of a display system 200, which is an exemplary embodiment of system 100 of FIG. 1. As shown in FIG. 2, system 200 includes application 104, API 106, a first display device 202, and a second display device 204. As shown in FIG. 2, API 106 includes mixed 2D/3D supporting programming elements 108. First display device 202 is a display device that is only capable of displaying two-dimensional content, and second display device 204 is a display device that is capable of display two-dimensional content and three-dimensional content. In the example of FIG. 2, via mixed 2D/3D supporting programming elements 108, API 106 is capable of enabling application 104 to display content at first and second display devices 202 and 204. In embodiments, application 104 may be capable of providing content for display by first and second display devices 202 and 204 through API 106 one at a time. In another embodiment, application 104 may be capable of providing content for display by first and second display devices 202 and 204 and/or other combinations and numbers of display devices through API 106 simultaneously.

Figure 3:
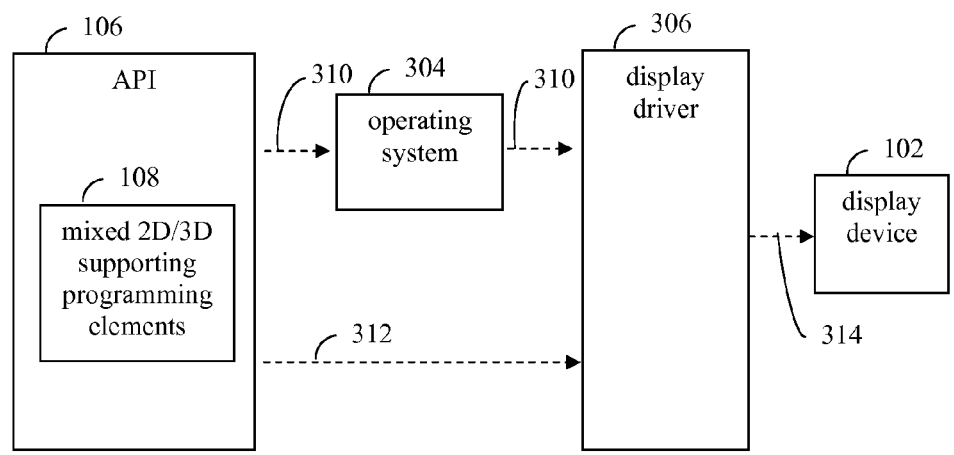

Note that API 106 may interface with display devices in various ways. For instance, FIG. 3 shows a block diagram of API 106 interfacing with display device 102 of FIG. 1 in various ways, according to embodiments. As shown in FIG. 3, API 106 can be interfaced with display device 102 through an operating system (OS) 304 and display driver 306, and/or directly through display driver 306. FIG. 3 is described as follows.

OS 304 provides a platform on which programs may be executed, such as application 104. API 106 may be separate from OS 304 or may be integrated in OS 304. OS 304 may be implemented in software (e.g., computer programs and/or data) that runs on a device, or in other manner. OS 304 manages hardware, provides common services, enables execution of applications, and enables applications to access hardware such as display device 102. OS 304 may include a user interface, such as a graphical user interface (GUI), which a user may interact with to access applications and/or display device 102. OS 304 may be a commercially available or proprietary operating system. For instance, OS 304 may be an operating system such as Microsoft Windows®, Apple Mac OS® X, Google Android™, or Linux®, which may be modified according to embodiments. Further description of implementations of OS 304 and other operating system implementations described herein is provided in pending U.S. patent application Ser. No. 12/982,124, titled "Operating System Supporting Mixed 2D, Stereoscopic 3D And Multi-View 3D Display," filed on same date herewith, which is incorporated by reference herein in its entirety.

Display driver 306 may be implemented in software, and enables applications (e.g., higher-level application code) and API 106 to interact with display device 102. Display driver 306 may be implemented in a same or different device as API 106. Multiple display drivers 306 may be present, and each display driver 306 is typically display device-specific, although some display drivers 306 may be capable of driving multiple types of display devices. Each type of display device typically is controlled by its own display device-specific commands. In contrast, most applications communicate with display devices according to high-level device-generic commands. Display driver 306 accepts the generic high-level commands from applications (via API 106 and/or OS 304), and breaks them into a series of low-level display device-specific commands, as used by the particular display device.

In FIG. 3, an application may generate a command associated with the display of 2D and/or 3D content that is received by API 106. In one embodiment, API 106 processes the command, and generates a configuration request 310 that is received by OS 304. OS 304 passes configuration request 310 to display driver 306 (in a modified or unmodified form). Display driver 306 receives configuration request 310, and generates one or more control signals 314 received by display device 102. Control signal(s) 314 place(s) a screen of display device 102 in a display mode corresponding to configuration request 310. Furthermore, the application may stream content to display device 102 through API 106, OS 304, and display driver 306 to be displayed in the screen configured according to configuration request 310.

In another example, API 106 may generate a configuration request 312 based on the command from the application that is directly received by display driver 306 (e.g., does not pass through OS 304). Display driver 306 receives configuration request 312, and generates control signal(s) 314 received by display device 102. Control signal(s) 314 place(s) a screen of display device 102 in a display mode corresponding to configuration request 312. Furthermore, the application may stream content to display device 102 through API 106 and display driver 306 to be displayed by the screen configured according to command 312.

As such, commands and content may be provided by applications to display device 102 through API 106 and optionally one or more additional intermediate components, which may include OS 304 and display driver 306.

Figure 4A:
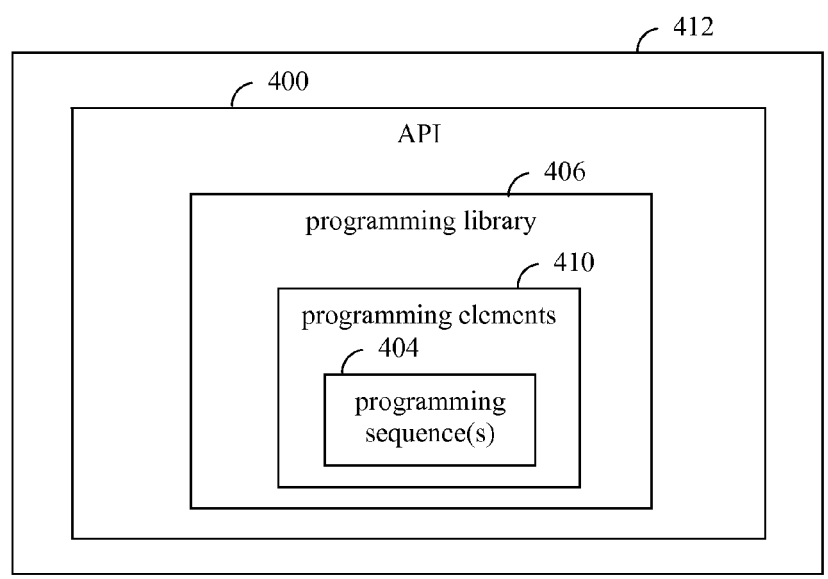
FIG. 4A shows a block diagram of an electronic device that includes an API capable of processing calls from applications to configure a display device for display of 2D and 3D content, according to an exemplary embodiment.

API 106 may be executed in an electronic device. For instance, FIG. 4A shows a block diagram of an electronic device 412, according to an exemplary embodiment. Device 412 is an example of either of devices 110 and 112 shown in FIG. 1. As shown in FIG. 4A, device 412 includes API 400. Device 412 may include additional features that are not shown in FIG. 4A for ease of illustration. Display device 102 may be included in or may be external to device 412. Device 412 may be any of the electronic devices mentioned herein, or may be an alternative device.

API 400 is an example of API 106 described above. As shown in FIG. 4A, API 400 includes a programming library 406. Programming library 406 provides a library of functions that may be called by applications to configure 2D and 3D display screen regions. As shown in FIG. 4A, programming library 406 includes programming elements 410. Programming elements 410 include programming sequences 404. Each programming element 410 of programming library 406 has a calling convention according to which a command from an application may be configured to access the function of the particular programming element 410. A programming sequence 404 of a programming element 410 may be triggered by a call from an application to perform particular functionality, such as the placement of a screen region of a display in a corresponding 2D or 3D configuration. For instance, programming sequences 404 may be present to configure a screen region according to any of the commands and/or parameters described above or elsewhere herein. For instance, a programming sequence 404 may generate a configuration request based on the command/parameters that includes information for configuring a display screen for display of 2D or 3D content, configuring the display screen for display of a particular type of three-dimensional content, configuring one or more 3D display characteristics such as stereoscopic depth, brightness, region size, resolution, orientation, window shape, display region type parameter, and/or other configuration a display screen in other ways. The call to a programming sequence 404 may include the parameters of the command received from an application. Programming sequences 404 may generate configuration requests to cause screen regions to be displayed according to the commands/parameters. For example, the configuration requests may be received by display drivers that generate corresponding control signals configured to set up screen regions according to the attributes of the configuration requests.

Figure 4B:
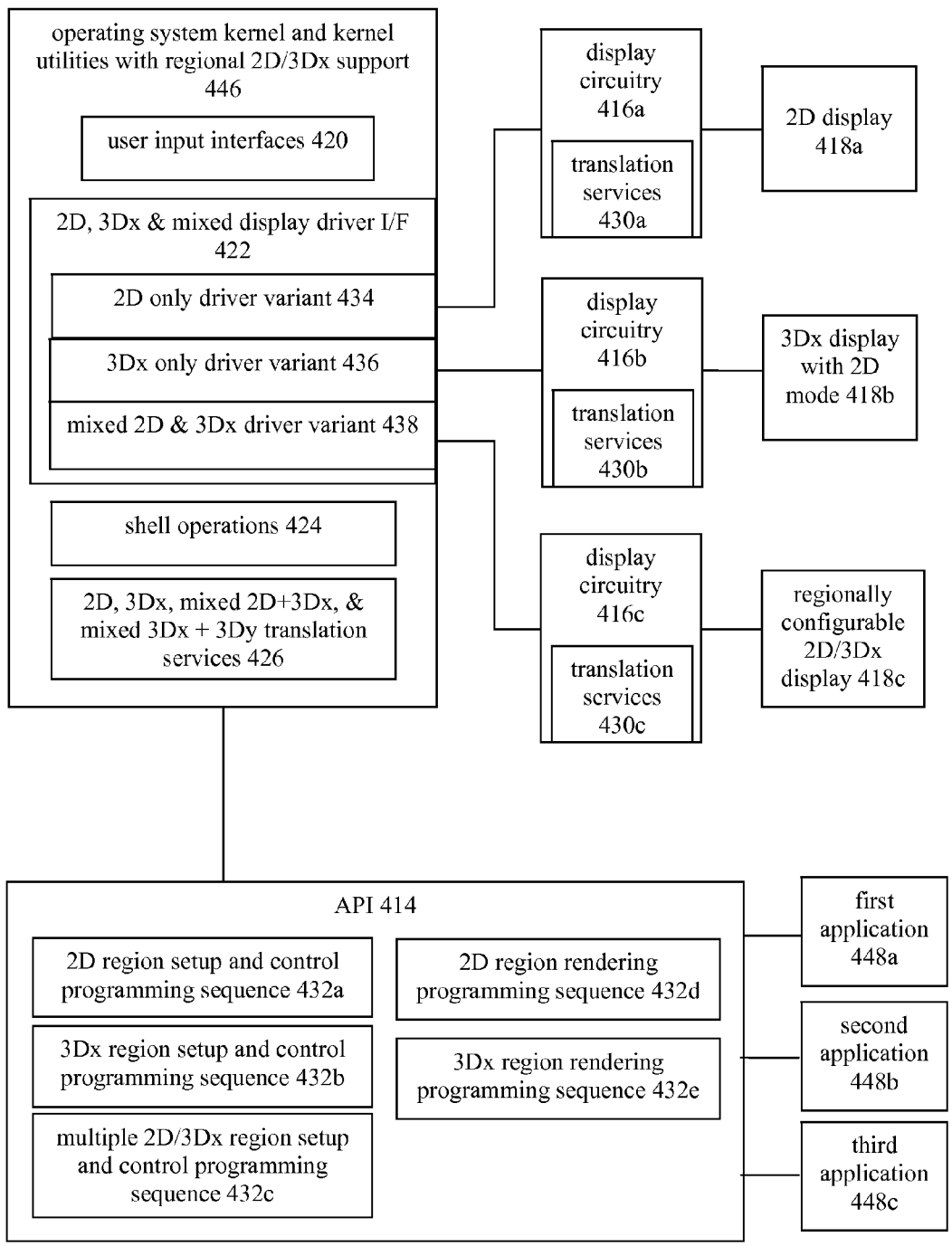
FIG. 4B shows a block diagram of a system that includes an API configured to process calls from applications to display content at mixed 2D, stereoscopic 3D and multi-view 3D displays, according to an exemplary embodiment.

Device 412 may be configured in various ways to perform its functions, and various embodiments for device 412 are described herein. For instance, FIG. 4B shows a block diagram of a display system 450 that includes an API 414 configured to support display of 2D and 3D content, according to an embodiment. API 414 is an embodiment of API 400 that is capable of configuring display devices for display of two-dimensional content and/or three-dimensional content, and to supply such content from applications to the display devices. The embodiment of API 414 shown in FIG. 4B is provided for purposes of illustration, and is not intended to be limiting. In further embodiments, API 414 may include fewer, additional, and/or alternative features than shown in FIG. 4B.

Display system 450 is an example of a display system that is capable of displaying mixed 2D and 3D content. As shown in FIG. 4B, system 450 includes API 414, operating system kernel and kernel utilities with regional/3Dx support 446 ("OS 446"), first-third display circuitry 416a-416c, a 2D display 418a, a 3D display with 2D mode 418b, a regionally configurable 2D/3Dx display 418c, a first application 448a, a second application 448*b*, and a third application 448*c*. API 414 includes a 2D region setup and control programming sequence 432*a*, a 3Dx region setup and control programming sequence 432*b*, a multiple 2D/3Dx region setup and control programming sequence 432*c*, a 2D region rendering programming sequence 432*d*, and a 3Dx region rendering programming sequence 432*e*. OS 446 includes user input interfaces 420, a 2D, 3Dx & mixed display driver interface 422, shell operations 424, 2D, 3Dx, and mixed 2D and 3Dx, & mixed 3Dx and 3Dy translation services 426. 2D, 3Dx and mixed display driver interface 422 includes 2D only driver variant 434, 3Dx only driver variant 436, and mixed 2D and 3Ds driver variant 438. First-third display circuitry 416*a*-416*c* each includes a corresponding one of translation services 430*a*-430*c*. The features of system 450 are described as follows.

2D display 418*a*, 3D display with 2D mode 418*b*, and regionally configurable 2D/3Dx display 418*c* are example types of display device 102 that may display content provided through API 414. One or more of displays 418*a*-418*c* may be present. 2D display 418*a* is an example of 2D display device 202 of FIG. 2, and is a display device that is only capable of displaying two-dimensional content. 3Dx display with 2D mode 418*b* is an example of 2D-3D display device 204 of FIG. 2, and is a display device that is capable of displaying two-dimensional and three-dimensional content. For instance, 3Dx display with 2D mode 418*b* may be set in a 2D mode where 3Dx display with 2D mode 418*b* can display 2D content in full screen, but not 3D content, and may be set in a 3D mode where 3Dx display with 2D mode 418*b* can display 3D content in full screen, but not 2D content. Furthermore, 3Dx display with 2D mode 418*b* may be capable of displaying 3D content having multiple camera views ("multiview")—a number of "x" views—such as 3D-4, having four camera views, 3D-16, having sixteen camera views, etc. The additional camera views enable viewers to "view behind" displayed 3D content by moving their heads left-right, as further described elsewhere herein. Regionally configurable 2D/3Dx display 418*c* is an example of 2D-3D display device 204 of FIG. 2, and is a display device that is capable of displaying two-dimensional and three-dimensional content simultaneously. For instance, regionally configurable 2D/3Dx display 418*c* may display 2D content in one or more regions of a display screen while simultaneously displaying 3D content in one or more other regions of the display screen. Furthermore, regionally configurable 2D/3Dx display 418*c* may be capable of displaying 3D content having multiple camera views.

First-third application programs 448*a*-448*c* are examples of application(s) 104 of FIG. 1 that may be interfaced with displays 418*a*-418*c*. One or more of applications 448*a*-448*c* may separately or simultaneously execute and interact with API 414 to provide content for display by displays 418*a*-418*c*. First application program 448*a* includes processed and/or generated content and setup and control for multiple 2D and 3Dx regions. As such, first application program 448*a* is capable of processing received 2D, 3D, and 3Dx content and/or generating 2D, 3D, and 3Dx content, and is capable of generating commands/calls to API 414 for setting up and controlling multiple separate display screen regions that each display 2D, 3D, or 3Dx content. Second application program 448*b* includes internally processed single region 2D and 3Dx content and setup and control for the same. Second application program 448*b* is capable of processing received 2D, 3D, and 3Dx content, and is capable of generating commands/calls to API 414 for setting up and controlling a single display screen region that displays the 2D, 3D, or 3Dx content. Third application program 448*c* includes internally generated single region 2D/3Dx content and setup and control for the same. Third application program 448*c* is capable of internally generating 2D, 3D, and 3Dx content, and is capable of generating commands/calls to API 414 for setting up and controlling a single display screen region that displays the 2D, 3D, or 3Dx content.

OS 446 is an example of operating system 304 shown in FIG. 3. OS 446 interfaces applications, such as applications 448*a*-448*c*, with displays 418*a*-418*c*. As indicated in FIG. 4B, OS 446 may provide various forms of 2D/3Dx display support. For instance, API 414 interfaces applications 448*a*-448*c* with OS 446, and thereby API 414 and OS 446 interface the applications with a display device (e.g., one or more of displays 418*a*-418*c*).

User input interfaces 420 are configured to receive user input to enable a person to interact with display system 450, API 414, and content displayed by displays 418*a*-418*c*. Further example embodiments for user input interfaces 420 are described elsewhere herein.

2D, 3Dx & mixed display driver interface 422 enables applications, such as applications 448*a*-448*c*, that interface with OS 446 via API 414 to provide and control two- and/or three-dimensional content displayed at a displays 418*a*-418*c*. 2D only driver variant 434, 3Dx only driver variant 436, and mixed 2D and 3Dx driver variant 438 are examples of display driver 306 of FIG. 3. 2D, 3Dx & mixed display driver interface 422 may forward configuration requests (e.g., from API 414) to 2D only driver variant 434 when 2D display 418*a* is present, enabling only 2D-related commands to be processed. 2D, 3Dx & mixed display driver interface 422 may forward configuration requests to 3Dx only driver variant 436 when 3Dx display with 2D mode 418*b* is present, enabling 2D or 3Dx related commands to be processed. 2D, 3Dx & mixed display driver interface 422 may forward configuration requests to mixed 2D and 3Dx driver variant 438 when regionally configurable 2D/3Dx display 418*c* is present, enabling regional 2D or 3Dx related commands to be processed.

Shell operations 424 may be present in OS 446 to control and/or enable user configuration of environmental properties, such as the 2D and/or 3D display configuration of an environmental background, of desktop icons, of displayed windows, etc. In embodiments, shell operations 424 may be implemented in hardware, software, firmware, or any combination thereof, including as a shell operations module.

Mixed 2D and 3Dx, & mixed 3Dx and 3Dy translation services 426 may be present in OS 446 to provide for translation of received content (e.g., from an application such as API 414) from a first dimensionality to a second dimensionality. For instance, translation services 426 may be configured to translate received 3D content to 2D content, such as when an application provides 3D content, and 2D display 418*a* is the target display (e.g., the target display is not capable of displaying 3D content). In another example, translation services 426 may be configured to translate a first type of 3D content to a second type of 3D content, such as when an application provides regional 2D and/or 3D content, and 3Dx display with 2D mode is the target display (e.g., the target display is not capable of displaying content regionally), and/or to translate 3D content having a first number "x" of cameras (e.g., 3D-8 content) to 3D content having a second number "y" of cameras (e.g., 3D-4 content), if the target display does not support "x" camera views. Still further, translation services 426 may be configured to translate 2D content to 3D content, and/or may be able to perform other forms of content translations.

In further embodiments, OS 446 may include fewer, additional, and/or alternative features than shown in FIG. 4B. Further description regarding an operating system configured to interface applications with displays supporting two-dimensional and three-dimensional views, such as OS 446, is provided in pending U.S. patent application Ser. No. 12/982,124, titled "Operating System Supporting Mixed 2D, Stereoscopic 3D And Multi-View 3D Displays," which is incorporated by reference herein in its entirety.

Display circuitry 416a-416c may have the form of hardware, software, firmware, or any combination thereof, such as having the form of a graphics card, circuitry etc. Display circuitry 416a-416c may be present to interface OS 446 with displays 418a-418c, respectively. Display circuitry 416a-416c may receive content signals and control signals from OS 446, and may be configured to generate drive signals to drive displays 418a-418c, respectively. Examples of display circuitry (e.g., drive circuits) are described elsewhere herein.

As shown in FIG. 4B, display circuitry 416a-416c may each optionally include a corresponding one of translation services 430a-430c. When present, translation services 430a-430c may perform translations of received content in a similar manner as mixed 2D and 3Dx, & mixed 3Dx and 3Dy translation services 426. For instance, translation services 430a may translate received 3D content to 2D content for display by 2D display 418a. Translation services 430b may translate received regionally configurable 2D and/or 3D content to non-regional 2D and/or 3D content for display by 3Dx display with 2D mode display 418b. Translation services 430b and 430c may each translate unsupported types of 3D content to supported types of 3D content for display by 3Dx display with 2D mode display 418b and regionally configurable 2D/3Dx display 418c, respectively. Translation services 430a-430c may also be configured to perform additional and/or alternative forms of content translations, in embodiments.

API 414 is an example of API 400 of FIG. 4A that may be interface applications 448a-448c with displays 418a-418c. One or more of applications 448a-448c may separately or simultaneously be interfaced with displays 418a-418c through API 414 (and OS 446) to provide content for display by displays 418a-418c. 2D region setup and control programming sequence 432a of API 414 includes code configured to setup and control a display screen region for the display of 2D content. Programming sequence 432a may be invoked by a command/call from one of applications 448a-448c. For instance, programming sequence 432a may include one or more computer instructions/code that can set one or more 2D screen region characteristics based on parameters of application commands/calls, such as size, location, shape, type, brightness, resolution, contrast, orientation, and/or other region characteristic mentioned elsewhere herein or otherwise known. Programming sequence 432a may setup up the initial characteristics of the 2D screen region, and may control modifications to the 2D screen region (e.g., changes in size, location, shape, type, brightness, resolution, contrast, orientation, and/or other region characteristic).

3Dx region setup and control programming sequence 432b of API 414 includes code configured to setup and control a display screen region for the display of 3D content. Programming sequence 432b may be invoked by a command/call from one of applications 448a-448c. For instance, programming sequence 432b may include one or more computer instructions/code that can set one or more 3D screen region characteristics based on parameters of application commands/calls, such as 3D type (e.g., 3D-2, 3D-4, 3D-HVGA, etc.), size, location, shape, type, brightness, resolution, contrast, orientation, and/or other region characteristic mentioned elsewhere herein or otherwise known. Programming sequence 432b may setup up the initial characteristics of the 3D screen region, and may control modifications to the 3D screen region (e.g., changes in 3D type, size, location, shape, type, brightness, resolution, contrast, orientation, and/or other region characteristic).

Multiple 2D/3Dx region setup and control programming sequence 432c of API 414 includes code configured to setup and control multiple display screen regions that display 2D and/or 3D content. Programming sequence 432c may be invoked by a command/call from one of applications 448a-448c. For instance, programming sequence 432c may setup and control one or more regions for the display of 2D content and one or more regions for the display of 3D content based on parameters of application commands/calls. Programming sequence 432c may include one or more computer instructions/code that can set one or more 2D and 3D screen region characteristics, such as those described above. Programming sequence 432c may setup up the initial characteristics of the 2D and 3D screen regions, and may control modifications to the 2D and 3D screen region, such as the modification described above. In one variant, programming sequence 432c is a separate code module from programming sequences 432a and 432b. In another variant, programming sequence 432c may include portions or all of programming sequences 432a and 432b, which may be used by programming sequence 432c to set up and control separate 2D and 3D screen regions, respectively.

2D region rendering programming sequence 432d is configured to receive and render 2D content from applications (e.g., first-third applications 448a-448c) for display by one or more of displays 418a-418c. For instance, programming sequence 432d may be configured to render or process one or more images or streams of 2D content to be displayed in one or more corresponding screen regions setup and/or controlled by one or more of programming sequences 432a-432c. For instance, programming sequence 432d may process 2D content to be displayed in a 2D screen region setup and controlled by programming sequence 432a or by programming sequence 432c. 3D region rendering programming sequence 432e is configured to receive and render 3D content from applications (e.g., first-third applications 448a-448c) for display by one or more of displays 418a-418c. For instance, programming sequence 432e may be configured to render or process one or more images or streams of 3D content to be displayed in one or more corresponding screen regions setup and/or controlled by one or more of programming sequences 432b or 432c. For instance, programming sequence 432e may process 3D content to be displayed in a 3D screen region setup and controlled by programming sequence 432b or by programming sequence 432c.

API 414 may include any combination of programming sequences 432a-432e, depending on the particular implementation. Any one or more of programming sequences 432a-432e may be library modules/programming elements that are accessible in a programming library, such as programming library 406 of FIG. 4A to be called by applications.

The embodiments of display system 450 and API 414 shown in FIG. 4B are provided for purposes of illustration. In further embodiments, display system 450 and API 414 may include fewer, further, and/or alternative components, as would be known to persons skilled in the relevant art(s). Further embodiments regarding the features of display system 450 and API 414 are described in the following subsections.

Figure 6:
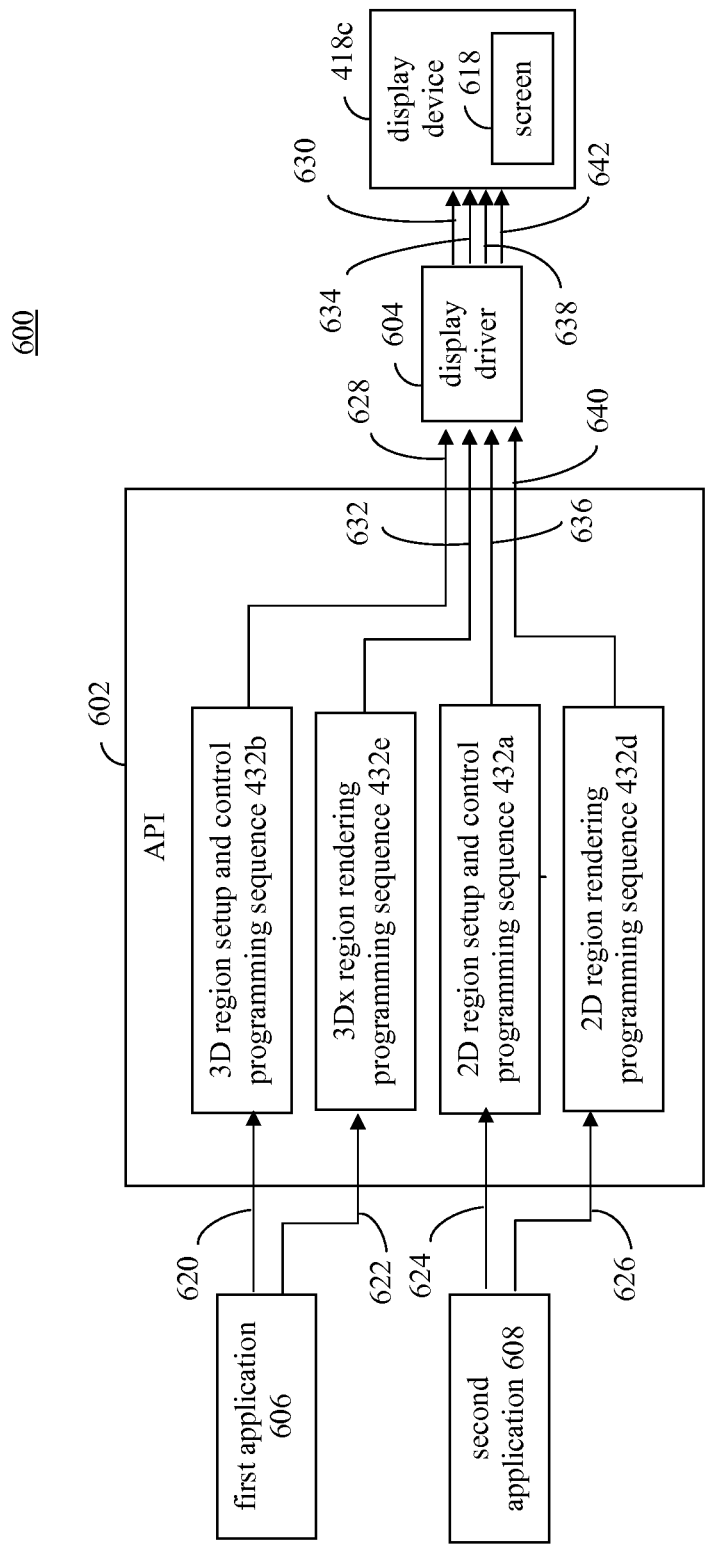
FIG. 6 shows a block diagram of an API that interfaces an application with a display device to display mixed 2D and 3D content, according to an exemplary embodiment.

B. Exemplary Embodiments for Displaying Content Via an API 2D and 3D content may be displayed by an application in various ways according to embodiments. For instance, FIG. 5 shows a flowchart 500 providing a process for an API to configure a display screen for display of mixed 2D and 3D content, according to an exemplary embodiment. Flowchart 500 may be performed by APIs described elsewhere herein, such as API 106 of FIGS. 1-3, API 400 of FIG. 4A, and API 414 of FIG. 4B. Flowchart 500 is described with respect to FIG. 6, which shows a block diagram of an electronic device 600 interfaced with display device 418c, according to an exemplary embodiment. Device 600 is an example of device 110 or device 112 of FIG. 1, and display device 418c may be included in or may be external to device 600. In the example of FIG. 6, device 600 includes an API 602, a display driver 604, a first application 606, and a second application 608. API 602 is an example of API 106, and display driver 604 is an example of mixed 2D & 3Dx driver variant 438 of FIG. 4B. As shown in FIG. 6, API 602 includes 2D region setup and control and control programming sequence 432a, 3Dx region setup and control and control programming sequence 432b, 2D region rendering programming sequence 432d, and 3Dx region rendering programming sequence 432e (of FIG. 4B). Note that in an alternative embodiment, API 602 may include multiple 2D/3Dx region setup and control programming sequence 432c rather than programming sequences 432a and 432b. Further structural and operational embodiments will be apparent to persons skilled in the relevant art(s) based on the discussion regarding flowchart 500. Flowchart 500 is described as follows.

Flowchart 500 begins with step 502. In step 502, a first command is received from an application directing at least in part a first configuration of a first region of the screen to support first content, the first configuration being a first three-dimensional configuration. For example, referring to FIG. 6, first application 606 may include first program code that generates a first command 620 that is a first call to API 602 as a configuration request for a first region of screen 618 of display device 418c to support display of 3D content. Possible examples of first command 620 are described elsewhere herein. As shown in FIG. 6, API 602 receives first command 620.

In step 504, the first command is responded to by sending a first configuration request to place the screen in a three-dimensional mode within the first region. As shown in FIG. 6, API 602 may handle first command 620 as a call to 3D region setup and control programming sequence 432b. Programming sequence 432b may generate a first configuration request 628 to place a screen 618 of display device 418c in a three-dimensional mode within the screen region defined by first command 620. First command 620 may include any number of parameters that define the first configuration request. First command 620 may include parameters may define screen region characteristics such as a 3D type, size, location, region shape, type, brightness, resolution, contrast, orientation, and/or other region characteristic mentioned elsewhere herein or otherwise known. Programming sequence 432b may generate first configuration request 628 in any manner to cause the defined region of screen 618 to be configured by display driver 604 for the display of 3D content, including in the form of generic high-level commands that may be processed by display driver 604. API 602 may send first configuration request 628 directly, or through an OS, to display driver 604. Display driver 604 receives first configuration request 628, and generates control signal(s) 630 that are received by display device 418c. Control signal(s) 630 place(s) a first region of screen 618 in a 3D display mode for display of the 3D content.

In step 506, a second command is received directing at least in part a second configuration of a second region of the screen to support second content. For instance, as shown in FIG. 6, second application 608 may include second program code that generates a second command 624 that is a second call to API 602 as a configuration request for a second region of screen 618 to support display of 2D or 3D content. Possible examples of second command 624 are described elsewhere herein. As shown in FIG. 6, API 602 receives first command 620.

Note that in an alternative embodiment, first command 620 and second command 624 may both be received from a same application (e.g., first application 606).

In step 508, the second command is responded to by sending a second configuration request to place the screen in mode corresponding to the second configuration within the second region. In embodiments, second command 624 may be a command to configure a second region of screen 618 to support the display of 2D content or to support the display of 3D content. For instance, as shown in FIG. 6, API 602 may handle second command 624 as a call to 2D region setup and control programming sequence 432a. Programming sequence 432a may generate a second configuration request 636 to place screen 618 in a two-dimensional mode within the screen region defined by second command 624. Second command 624 may include any number of parameters that define second configuration request 636. Second command 624 may include parameters may define screen region characteristics such as a 2D type, size, location, region shape, type, brightness, resolution, contrast, orientation, and/or other region characteristic mentioned elsewhere herein or otherwise known. Programming sequence 432a may generate second configuration request 636 in any manner to cause the defined region of screen 618 to be configured by display driver 604 for the display of 2D content, including in the form of generic high-level commands that may be processed by display driver 604. API 602 may send second configuration request 636 directly, or through an OS, to display driver 604. Display driver 604 receives second configuration request 636, and generates control signal(s) 638 that are received by display device 418c. Control signal(s) 638 place(s) a second region of screen 618 in a 2D display mode for display of 2D content.

Figure 7:
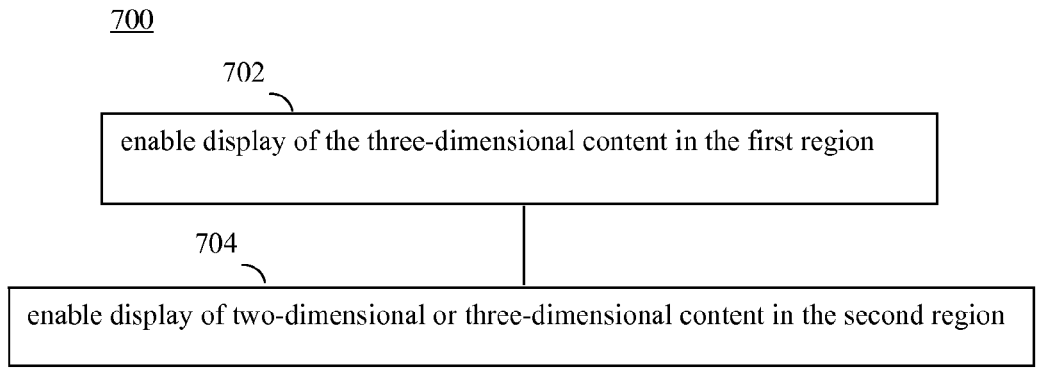
FIG. 7 shows a flowchart providing a process for an API to provide content for display, according to an exemplary embodiment.

Subsequently to the first and second regions of screen 618 being configured according to first and second configuration requests 630 and 638, 3D and 2D content may be transmitted by application 104 to API 602 for display by screen 618. For instance, FIG. 7 shows a flowchart 700 providing a process for an API to provide content for display, according to an exemplary embodiment. Flowchart 700 may be performed by APIs described elsewhere herein, such as API 106 of FIGS. 1-3, API 400 of FIG. 4A, and API 414 of FIG. 4B. Flowchart 700 is described as follows with respect to API 602 of FIG. 6, for illustrative purposes.

In step 702, the display of the three-dimensional content is enabled in the first region of the screen. For instance, the first content of step 502, which is three-dimensional content, may be internally generated by first application 606 or received from an external source and processed by first application 606. As shown in FIG. 6, first application 606 transmits (e.g., streams) 3D content 622 to API 602. As described above for three-dimensional content, images of differing perspective are delivered to the right and left eyes of a viewer. The images are combined in the visual center of the brain of the viewer to be perceived as a three-dimensional image. Thus, 3D content 622 includes left and right images or image streams to be displayed to the left and right eyes of a viewer, respectively. In the case of 3D-4 or further numbers of camera views, 3D content 622 may include multiple pairs of left-right image streams. As shown in FIG. 6, 3D content 622 is received by 3Dx region rendering programming sequence 432e. Programming sequence 432e processes 3D content 622 (e.g., processes each image stream), and outputs 3D graphical data 632 that defines the 3D content. Display driver 604 may receive 3D graphical data 632 and transmit corresponding processed 3D graphical data 634 that is received by display device 418c. Display device 418c may display the 3D content of processed 3D graphical data 634 in the first region of screen 618, which is configured according to first configuration request 628.

In step 704, the display of two-dimensional content is enabled within the second region of the screen. For instance, the second content, which may be two-dimensional or three-dimensional content, may be internally generated by second application 608 or received from an external source and processed by application 608. As shown above, second application 608 transmits (e.g., streams) 2D content 626 to API 602. As described above for two-dimensional content, same images are delivered to the right and left eyes of a viewer so that the content is perceived as two-dimensional. Thus, 2D content 626 may include a single image or image stream. As shown in FIG. 6, 2D content 626 is received by 2D region rendering programming sequence 432d. Programming sequence 432d processes 2D content 626 and outputs 2D graphical data 640 that defines the 2D content. Display driver 604 may receive 2D graphical data 640 and transmit corresponding processed 2D graphical data 642 that is received by display device 418c. Display device 418c may display the 2D content of processed 2D graphical data 642 in the second region of screen 618, which is configured according to second configuration request 636.

As such, according to flowcharts 500 (FIG. 5) and 700 (FIG. 7), two-dimensional and three-dimensional content provided by one or more applications may be enabled to be simultaneously displayed within corresponding regions of a display screen by API 602. Furthermore, different types of three-dimensional content (e.g., different resolutions, different numbers of image pairs, different stereoscopic depths, etc.) are enabled to be individually or simultaneously displayed. In embodiments, any number of different types of two-dimensional and three-dimensional content may be displayed in any number of regions of screen 618.

Figure 8:
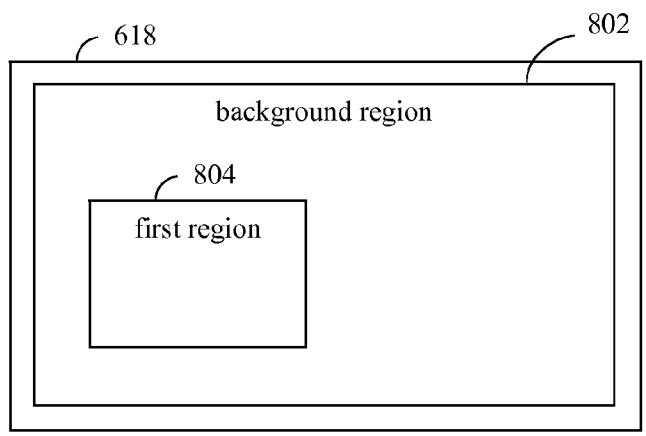

For instance, FIGS. 8, 9, 10A, and 10B show examples of screen 618 displaying content in various screen regions, according to embodiments. FIG. 8 shows screen 618 including a first region 804 and a background region 802. Background region 802 is optionally present or visible, depending on whether first region 804 covers screen 618 partially or entirely. When present, background region 802 may be a two-dimensional or three-dimensional background region generated by an operating system (e.g., OS 304 of FIG. 3 or OS 446 of FIG. 4B) or other application. First region 804 is configured for the display of three-dimensional content by an application according to steps 502 and 504 of flowchart 500 (FIG. 5), and 3D content may be displayed in first region 804 according to step 702 of flowchart 700 (FIG. 7). As shown in FIG. 8, background region 802 has a size that is approximately the full display area of screen 618, and first region 804 has a smaller size, filling a rectangular space imposed on background region 802. For instance, in one embodiment provided for purposes of illustration, background region 802 may be a two-dimensional desktop region displayed on a computer screen, and first region 804 may be a window generated by an application displaying three-dimensional content in the desktop region. In another embodiment, background region 802 may correspond to two-dimensional television content, while first region 804 is a picture-in-picture region generated by an application that displays three-dimensional television content overlaid on background region 802.

In another example, FIG. 9 shows screen 618 including a first region 904 and a background region 902. Background region 902 is optionally present, depending on whether first region 904 covers screen 618 partially or entirely. When present, background region 902 may be a two-dimensional or three-dimensional background region generated by an operating system (e.g., API 106 of FIG. 4A or OS 446 of FIG. 4B) or another application. First region 904 is configured for the display of two-dimensional content by an application according to steps 506 and 508 of flowchart 500 (FIG. 5), and 2D content may be displayed in first region 904 according to step 704 of flowchart 700 (FIG. 7). As shown in FIG. 9, background region 902 has a size that is approximately the full display area of screen 618, and first region 904 has a smaller size, filling a rectangular space imposed on background region 902. For instance, in one embodiment provided for purposes of illustration, background region 902 may be a three-dimensional desktop region displayed on a computer screen, and first region 904 may be a window generated by an application displaying two-dimensional content in the desktop region. In another embodiment, background region 902 may correspond to three-dimensional television content, while first region 904 is a picture-in-picture region generated by an application that displays two-dimensional television content overlaid on background region 902.

In another example, FIG. 10A shows screen 618 including a first region 1004, a second region 1006, and a background region 1002. First region 1004 is configured for the display of two-dimensional content by an application according to steps 506 and 508 of flowchart 500 (FIG. 5), and second region 1006 is configured for the display of three-dimensional content by the same application according to steps 502 and 504 of flowchart 500. 2D content may be displayed in first region 1004 according to step 704 of flowchart 700 (FIG. 7), and 3D content may be displayed in second region 1006 according to step 702 of flowchart 700. Background region 1002 is optionally present when first and second regions 1004 and 1006 do not cover screen 618. As shown in FIG. 10A, background region 1002 has a size that is approximately the full display area of screen 618, first region 1004 has a smaller size, filling a rectangular space imposed on background region 1002, and second region 1006 also has a smaller size, filling an elliptical space imposed on background region 1002, adjacent to first region 1004. Similarly to FIGS. 8 and 9, background region 1002 may be a two-dimensional or three-dimensional desktop region of a computer screen, a two-dimensional or three-dimensional television screen region, etc. First and second regions 1004 and 1006 may be both generated by a same application (e.g., application 104, one of applications 448a-448c, etc.) that has mixed 2D and 3D display capability, or by first and second applications (e.g., first and second applications 606 and 608 of FIG. 6). First region 1004 may be a window displaying two-dimensional content in the desktop region, in a picture-in-picture region, etc., and second region 1006 may be a window displaying three-dimensional content in the desktop region, in a picture-in-picture region, etc. In the example of FIG. 10A, first and second regions 1004 and 1006 are not in contact with each other. In another embodiment, first and second regions 1004 and 1006 may be in contact with each other or overlapping. Furthermore, one or more additional screen regions may be present that display 2D or 3D content provided by the application.

FIG. 10B depicts an example desktop 1022 displayed on screen 618 that includes a variety of areas in which respective instances of content may be presented in accordance with an embodiment. Desktop 1022 may be serviced by operating system (OS) objects, internet delivered media objects, boundaries, icons, etc., that are all subject to user setup and/or via a user's live interaction. The areas of desktop 1022 may include object perimeters, moving 3D objects, 2D or 3D icons or otherwise with 2D or 3D boundaries or interiors, etc. The exemplary areas of desktop 1022 shown in FIG. 10B will now be described.

Desktop 1022 includes a background having a 2D sky area 1001 and a 3D grass region 1003 that appears to stretch far into the distance. Desktop 1022 further includes unselected icons 1013, 1015, and 1019 of random or arbitrary shapes which appear floating in mid-air in local 3D. Icons 1013 and 1019 may contain OS generated content, and icon 1015 may contain 3D content delivered live via an external server, for example. In accordance with this example, the 3D content in icon 1015 may be actively changing and/or moving around. Desktop 1022 further includes a selected icon 1017 which seems to be moving closer then farther away in a cycle, while the window 1025 that was opened and relates to selected icon 1017 has a boundary region 1011 that seems to actively change in synchrony therewith.

Desktop 1022 also includes an active, moving 2D or 3D object 1021 that has a non-rectangular boundary. Desktop 1022 further includes a pointer 1023 used to assist a viewer input and display control architecture 1029 that may be anything illustrated and discussed in the present application, and through which screen region configuration commands (command 1, command 2, etc.) can be accessed via, for example, a right click that opens a pop-up window 1025 or other type of window. Desktop 1022 also includes a rectangular window 1005 with 3D icons 1007 that may move and present local or delivered content, a 2D or 3D content screen 1009 (2D text or 3D movie for example originating remotely), and a 2D or 3D boundary 1011 as mentioned above related to the selected icon 1017.

Viewer input and display control architecture 1029 represents one or more of any type of integrated and multiple-housing display and viewer control architectures. For instance, architecture 1029 may include one or more user input interfaces configured to receive user input. Examples of a user input interface include but are not limited to a remote control device, a traditional computer input device such as a keyboard or mouse, a touch screen, a gamepad or other type of gaming console input device, or one or more sensors including but not limited to video cameras, microphones and motion sensors. Such user input interface may generate an input signal that specifies settings for regionally adjustable characteristics of a screen assembly for presentation of the instances of content in the respective areas of desktop 1022, for example, based on the user input.

The visual elements of desktop 1022, including 2D and/or 3D aspects, sizes, movement, brightness, etc., of 2D sky area 1001, 3D grass region 1003, window 1005, content screen 1009, icons 1013, 1015, 1017, and 1019, object 1021, pop-up window 1025, etc., may be configured by API commands described elsewhere herein, including API commands for opening and tailoring windows, frame 3D/2D characteristics, depth, user interaction, supporting 2D/3D graphic objects, etc. Such commands may be generated by an API, by an application that interfaces with screen 620 via an API, by API commands generated by user interaction (e.g., with user input interfaces 420), etc.

It is noted that the examples of FIGS. 8, 9, 10A, and 10B are provided for purposes of illustration, and are not intended to be limiting.

As described above, 2D region rendering programming sequence 432d and 3D region rendering programming sequence 432e are configured to receive and render 2D and 3D content, respectively, from applications for display by one or more of displays 418a-418c. In an embodiment, one or both of programming sequences 432d and 432e may implement a graphics pipeline model for rendering 2D and 3D displays, respectively. For instance, FIG. 11 shows a block diagram of programming library 406 of FIG. 4, according to an exemplary embodiment. As shown in FIG. 11, programming elements 410 of programming library 406 include a graphics pipeline 1102. Graphics pipeline 1102 is configured to render mixed 2D and 3D content, and may be implemented by one or both of programming sequences 432d and 432e.

Graphics pipeline 1102 may render 2D and/or 3D content in various ways. For instance, content received from applications (e.g., 3D content 622 and 2D content 626 of FIG. 6) may include the content in the form of primitives, and graphics pipeline 1102 may process the primitives to generate corresponding content for display. In alternative embodiments, content may be received and processed in other forms.

In an embodiment, graphics pipeline 1102 may include one or more of the stages or modules described as follows. For example, graphics pipeline 1102 may include a transformation module that consumes data about polygons with vertices, edges and faces that constitute a whole scene. A matrix may control linear transformations (scaling, rotation, translation, etc.) and viewing transformations (world and view space) that are to be applied on the data. Graphics pipeline 1102 may include a vertex shader configured to perform per-vertex lighting. Geometry in a complete 3D scene may be lit according to the defined locations of light sources and reflectance and other surface properties. Lighting at vertices may be generated by the vertex shader, and values between vertices may be interpolated during rasterization. Per-fragment (i.e., per-pixel) lighting can be performed as a post-rasterization process (e.g., by a shader program). Graphics pipeline 1102 may include a viewing transformer module that transforms objects from 3D world space coordinates into a 3D coordinate system based on the position and orientation of a virtual camera. This results in the original 3D scene being generated as seen from the camera's point of view, defined in an eye space or camera space. Graphics pipeline 1102 may include a primitives generator that generates new primitives provided from primitives that were sent to the beginning of graphics pipeline 1102.

Graphics pipeline 1102 may include a projection transformer. In the case of a perspective projection, objects which are distant from the camera are made smaller (sheared). In an orthographic projection, objects retain their original size regardless of distance from the camera. Geometry may be transformed from the eye space of the rendering camera into a special 3D coordinate space called "Homogeneous Clip Space", which is convenient for clipping. The projection transformer is responsible for mapping the planes of the camera's viewing volume (or Frustum) to the planes of the box which makes up clip space. Graphics pipeline 1102 may include a clipping module. Geometric primitives that fall outside of the viewing frustum are not be visible, and thus may be discarded by clipping performed by the clipping module. Clipping is not necessary to achieve a correct image output, but can accelerate the rendering process by eliminating the unneeded rasterization and post-processing of primitives that are not visible anyway.

Graphics pipeline 1102 may include a viewport transformer. The post-clip vertices may be transformed by the viewpoint transformer to be in window space. A scale may be applied (multiplying by the width of the window) as well as a bias (adding to the offset from the screen origin). At this point, the vertices have coordinates which directly relate to pixels in a raster. Graphics pipeline 1102 may include a rasterization module. Rasterization is a process performed by the rasterization module by which a 2D image space representation of a scene is converted into raster format and the correct resulting pixel values are determined. From this point on, operations may be carried out on single pixels. Graphics pipeline 1102 may include a texture mapping unit. At this stage of graphics pipeline 1102, individual fragments (or pre-pixels) are assigned a color based on values interpolated from the vertices during rasterization or from a texture in memory. Graphics data associated with these final colored pixels may be provided from graphics pipeline 1102 (e.g., as 3D graphical data 632 or 2D graphical data 636) to display driver 604 to be displayed on screen 618 in a defined region.

In alternative embodiments, graphics pipeline 1102 may have other configurations, as would be known to persons skilled in the relevant art(s) from the teachings herein.

In an embodiment, API 106 may be configured to transform one type of content received from an application to another type of content. For instance, such a translation may be performed if the display screen does not support a particular type of content display, if a user has selected or indicated a preference for a type of content, etc. In the examples of FIGS. 8, 9, 10A, and 10B described above, it is assumed that the display device supports the display of both two-dimensional and three-dimensional content. However, it is noted that not all types of display device (e.g., display device 418a) may support both two-dimensional content and three-dimensional content. Furthermore, not all types of display device that support three-dimensional content may support all types of three-dimensional content. As such, in embodiments, API 106 may be configured to translate unsupported types of content to supported types of content.

For instance, FIG. 12 shows a block diagram of programming library 406 (of API 400 of FIG. 4A), according to an exemplary embodiment. As shown in FIG. 12, programming library 406 includes a first translator 1202 and a second translator 1204. In embodiments, programming library 406 may include one or both of first and second translators 1202 and 1204. First and second translators 1202 and 1204 may be programming sequences that may be called to translate content from one type to another type. First translator 1202 may called when a display device does not support the display of three-dimensional content. Second translator 1204 may be called when a display device does not support the display of one or more types of three-dimensional content.

First translator 1202 is configured to translate received 3D data to 2D data for display by a display device. For example, API 400 may receive an indication of a 2D configuration of a screen region. As such, if received content for display in the screen region is 3D content, first translator 1202 may translate three-dimensional graphical data 1206 representative of the received content to two-dimensional graphical data 1208. The supported type of two-dimensional graphical data 1208 may be transmitted to the display device to enable the corresponding two-dimensional content to be displayed in the region of screen 618.

Furthermore, a display device that supports the display of three-dimensional data may not support all types of three-dimensional data (e.g., the display device does not support 3D graphics data having additional camera views other than initial first right and left views, does not support a number of camera views greater than 3D-4, etc.). Second translator 1204 is configured to translate received 3D data of a first 3D content type to 3D data of a second 3D content type for display by a display device. For example, API 400 may receive an indication of a 3D configuration of a screen region. As such, if received content for display in the screen region is a type of 3D content that is unsupported by the screen region, second translator 1204 may translate the unsupported type of three-dimensional graphical data 1210 of the received content to a supported type of three-dimensional graphical data 1212. The supported type of three-dimensional graphical data 1212 may be transmitted to the display device to enable the corresponding three-dimensional content to be displayed in the region of screen 618.

First translator 1202 may be configured in various ways to translate received 3D data to 2D data. For instance, in an embodiment, three-dimensional graphical data 1206 may be received as a stream of right image data and left image data. First translator 1202 may be configured to combine the right and left image data into two-dimensional image data that defines a stream of two-dimensional images that may be output as two-dimensional graphical data 1208. In another embodiment, first translator 1202 may be configured to select the right image data or the left image data to be output as two-dimensional graphical data 1208, while the other of the right image data or left image data is not used. In further embodiments, first translator 1202 may translate received 3D data to 2D data in other ways.

Second translator 1204 may be configured in various ways to translate 3D data of a first 3D content type to 3D data of a second 3D content type. For instance, second translator 1204 may translate a first 3D multiview type (e.g., 3D-16) to a second 3D multiview type (e.g., 3D-4) or to a single 3D view. In such an embodiment, second translator 1204 may not pass extra left-right image pairs from first-type three-dimensional graphical data 1210 to second-type three-dimensional graphical data 1212. In an embodiment, second translator 1204 (and/or first translator 1202) may use techniques of image scaling to modify an unsupported display resolution to a supported display resolution. For instance, second translator 1204 may use upsampling or interpolating to increase resolution, and may use subsampling or downsampling to decrease resolution. In further embodiments, second translator 1204 may translate 3D data in other ways. In still further embodiments, a translator may be present to translate 2D content to 3D content, such as when a user has a preference to view content as 3D content. Various techniques may be used to convert 2D graphical data to 3D graphical data, as would be known to person skilled in the relevant art(s).

In an embodiment, a user interface may be provided that allows a user to associate parameters with a displayed screen region by issuing commands in accordance with an API. For instance, as described above, user input interface 420 (FIG. 4B) receives user input to enable persons to interact with display devices associated with display system 450. For example, via user input interface 420, a user may be enabled to move displayed graphical objects (e.g., icons, windows, etc.), may be able to modify (e.g., rotate, resize, etc.) displayed graphical objects, to interact with displayed controls, etc. User input interface 420 may provide a command-line interface, a GUI, and/or other interface with which the user can interact. In embodiments, user input interface 420 may enable users to adjust three-dimensional characteristics of displayed three-dimensional content. For example, user input interface 420 may enable three-dimensionality of displayed content to be turned on or off (e.g., to toggle between two-dimensionality and three-dimensionality). User input interface 420 may enable a degree of three-dimensionality of displayed content to be modified (e.g., increased or decreased, such as by changing a depth of three-dimensionality, increasing or decreasing a number of supplied camera views, etc.), may enable three-dimensional objects to be rotated in three-dimensions, and/or may enable further types of adjustment to three-dimensional characteristics of displayed three-dimensional content. Furthermore, user input interface 420 may enable other characteristics of displayed content to be modified, such as modifying contrast, brightness, etc.

In embodiments, the user may interact with user input interface 420 in various ways, including using a mouse/pointing device to move a displayed pointer/cursor. The pointer may be used to "click and drag" objects to move them, to resize objects, to rotate objects, to select controls/settings, to open a pop-up menu, etc. In other embodiments, the user may interact with a keyboard, a thumb wheel or other wheel, a roller ball, a stick pointer, a touch sensitive display, any number of virtual interface elements (e.g., such as a keyboard or other user interface element displayed by screen 618), a voice recognition system, and/or other user interface elements described elsewhere herein or otherwise known to provide user input. For instance, user input interface 420 may support a touch screen that is reactive to user finger touches to the screen to cause three-dimensional characteristics of displayed objects to be modified. For instance, particular motions of one or more figures against the screen may cause object resizing, 3D rotation, movement in 3D, etc. (e.g., touching two fingers to the screen, and dragging them together may be interpreted as "grabbing" a window and moving the window in 3D).

As a result of the input signal received at the user input interface, API 106 may generate a configuration request that is configured to cause an adjustment of a three-dimensional characteristic of three-dimensional content displayed in the corresponding region of screen 618. The configuration request may be received by a display driver, such as one of driver variants 434, 436, and 438 of FIG. 4B, or display driver 604 of FIG. 6, which may generate a control signal based on the command. The control signal may relate to selecting and/or modifying a three-dimensional characteristic indicated by a user interacting with user input interface 420. The control signal may be delivered by the display driver to the display device to cause an adjustment of the three-dimensional characteristic of three-dimensional content displayed in a region of screen 618 (e.g., by causing a device driver circuit to generate corresponding drive signals).

For example, a user may interact with one of regions 804, 904, 1004, or 1006 shown in FIGS. 8, 9, 10A, and 10B. The user may resize a region and/or object that is displayed as three-dimensional, may rotate a region and/or object that is displayed as three-dimensional, may move a region and/or object that is displayed as three-dimensional in any of the three degrees (e.g., left-right, up-down, or forward-backward) from a first screen region to a second screen region, may change a degree of three-dimensionality of a region and/or object that is displayed as three-dimensional (e.g., reducing or increasing a number of associated camera views), etc. A corresponding configuration request (and thereby, a control signal) may be generated to adjust the three-dimensional characteristic of the three-dimensional content being displayed.

In an embodiment, an API may include an API description document that defines a plurality of calling conventions of the API. For instance, FIG. 13 shows a block diagram of API 106, according to an exemplary embodiment. As shown in FIG. 13, API 106 includes an API description document 1302. API description document 1302 defines a plurality of calling conventions for API 106. API description document 1302 may be a human readable document stored in electronic form (e.g., as a file) in storage, including any type of storage described elsewhere herein.

Any type and number of calling conventions may be defined in API description document 1302, according to the particular implementation. For instance, the plurality of calling conventions defined by API description document 1302 may include a first calling convention for a request to configure a screen region to display three-dimensional content and a second calling convention for a request to configure a screen region to display two-dimensional content. Further types of calling conventions may be defined by API description document 1302. For instance, the first command of step 502 (FIG. 5) may be configured according to the first calling convention, and the second command of step 506 may be configured according to the second calling conventions. Further types of calling conventions may be defined in API description document 1302 to call further functions of API 106, as would be known to persons skilled in the relevant art(s) from the teachings herein.

C. Example Display Device Screen Embodiments

Embodiments described herein for APIs that support the display of two-dimensional and three-dimensional content may be implemented with respect to various types of display devices. For example, as described above, some display screens are configured for displaying two-dimensional content, although they may display two-dimensional images that may be combined to form three-dimensional images by special glasses worn by users. Some other types of display screens are capable of display two-dimensional content and three-dimensional content without the users having to wear special glasses using techniques of autostereoscopy. As described above, API embodiments described herein may generate configuration requests in response to application calls to configure regions of the display screen for display of content, and may provide the content for display in the configured regions. Display drivers (e.g., display driver 306 of FIG. 3, driver variants 434, 436, and 438 of FIG. 4B, display driver 604 of FIG. 6, etc.) may receive the configuration requests/commands, and may generate control signals to cause the screen to be configured as indicated. Furthermore, the display drivers may supply the content provided by the applications through the APIs to the display devices to be displayed on the screen. Example display devices, screens, and display driver circuits are described as follows that receive the control signals, are configured accordingly, and that receive and display the provided content.

As described above, display devices, such as display device 102 (e.g., display devices 418*a*-418*c*), may be implemented in various ways. For instance, display device 102 may be a television display (e.g., an LCD (liquid crystal display) television, a plasma television, etc.), a computer monitor, or any other type of display device. Display device 102 may include any suitable type or combination of light and image generating devices, including an LCD screen, a plasma screen, an LED (light emitting device) screen (e.g., an OLED (organic LED) screen), etc. Furthermore, display device 102 may include any suitable type of light filtering device, such as a parallax barrier (e.g., an LCD filter, a mechanical filter (e.g., that incorporates individually controllable shutters), etc.) and/or a lenticular lens, and may be configured in any manner, including as a thin-film device (e.g., formed of a stack of thin film layers), etc. Furthermore, display device 102 may include any suitable light emitting device as backlighting, including a panel of LEDs or other light emitting elements.

For instance, FIG. 14 shows a block diagram of a display device 1400, according to an exemplary embodiment. As shown in FIG. 14, display device 1400 includes a screen 1402. Display device 1400 is an example of display device 102 and screen 1402 is an example of screen 618 described above. Device 1400 receives one or more control signals 1406 (e.g., based on configuration requests from API 106, API 400, API 414, API 602, etc.) that are configured to place screen 618 in a desired display mode (e.g., either a two-dimensional display mode or a three-dimensional display mode). As shown in FIG. 14, screen 1402 includes a light manipulator 1404. Light manipulator 1404 is configured to manipulate light that passes through light manipulator 1404 to enable three-dimensional images to be delivered to users in a viewing space. For instance, control signal(s) 1406 may be configured to activate or deactivate light manipulator 1404 to place screen 618 in a three-dimensional display mode or a two-dimensional display mode, respectively.

Examples of light manipulator 1404 include a parallax barrier and a lenticular lens. For instance, light manipulator 1404 may be a parallax barrier that has a layer of material with a series of precision slits. The parallax barrier is placed proximal to a light emitting pixel array so that a user's eyes each see a different set of pixels to create a sense of depth through parallax. In another embodiment, light manipulator 1404 may be a lenticular lens that includes an array of magnifying lenses configured so that when viewed from slightly different angles, different images are magnified. Such a lenticular lens may be used to deliver light from a different set of pixels of a pixel array to each of the user's eyes to create a sense of depth. Embodiments are applicable display devices that include such light manipulators, include other types of light manipulators, and that may include multiple light manipulators.

As shown in FIG. 14, display device 1400 receives a content signal 1408 (e.g., from device 412 of FIG. 4A, or other electronic device), such as processed 3D graphical data 634 or processed 2D graphical data 642 of FIG. 6. Content signal 1408 includes two-dimensional or three-dimensional content for display by screen 1402, depending on the particular display mode. In the embodiment of FIG. 14, light manipulator 1404 is physically fixed—is not adaptable. As such, when present, light manipulator 1404 (e.g., a fixed parallax barrier or a fixed lenticular lens) always delivers three-dimensional images of a particular type to a particular region in a viewing space. As such, light manipulator 1404 is not adaptable to deliver other types of three-dimensional images and/or to deliver two and/or three-dimensional images to multiple different regions of a viewing space.

In contrast, FIG. 15 shows a block diagram of a display device 1500 that is adaptable, according to an exemplary embodiment. As shown in FIG. 15, display device 1502 includes a screen 1502. Display device 1500 is an example of display device 102 and screen 1502 is an example of screen 618 described above (e.g., with respect to FIG. 6). Furthermore, as shown in FIG. 15, screen 1504 includes an adaptable light manipulator 1504. Adaptable light manipulator 1504 is configured to manipulate light that passes through adaptable light manipulator 1504 to enable three-dimensional images to be delivered to users in a viewing space. Furthermore, adaptable light manipulator 1504 is adaptable—is not physically fixed in configuration. As such, adaptable light manipulator 1504 is adaptable to deliver multiple different types of three-dimensional images and/or to deliver three-dimensional images to different/moving regions of a viewing space. Furthermore, in an embodiment, different regions of adaptable light manipulator 1504 may be adaptable such that multiple two-dimensional and/or three-dimensional images may be simultaneously delivered by screen 1502 to the viewing space.

Display device 1500 receives one or more control signals 1506 (e.g., based on configuration requests from API 106, API 400, API 414, API 602, etc.) that are configured to place screen 1502 in a desired display mode (e.g., either a two-dimensional display mode or a three-dimensional display mode), and/or to configure three-dimensional characteristics of any number and type as described above, such as configuring adaptable light manipulator 1504 to deliver different types of three-dimensional images, to deliver three-dimensional images to different/moving regions of a viewing space, and to deliver two-dimensional and/or three-dimensional images from any number of regions of screen 1502 to the viewing space.

As shown in FIG. 15 display device 1500 receives a content signal 1508 (e.g., from device 412 of FIG. 4A, or other electronic device), such as processed 3D graphical data 634 or processed 2D graphical data 642 of FIG. 6. Content signal 1508 includes two-dimensional and/or three-dimensional content for display by screen 1502, depending on the particular display mode and on the number of regions of screen 1502 that are delivering different two- or three-dimensional views to a viewing space.

Content signals 1408 and 1508 may include video content according to any suitable format. For example, content signals 1408 and 1508 may include video content delivered over an HDMI (High-Definition Multimedia Interface) interface, over a coaxial cable, as composite video, as S-Video, a VGA (video graphics array) interface, etc. Note that control signals 1406 and 1506 may be provided separately or in a same signal stream to display devices as their corresponding one of content signals 1408 and 1508.

Exemplary embodiments for display devices 1400 and 1500 of FIGS. 14 and 15 are described as follows for purposes of illustration.

1. Exemplary Embodiments Using Parallax Barriers

Display devices 1400 and 1500 may include parallax barriers as light manipulators 1404 and 1504, respectively. For instance, FIG. 16 shows a block diagram of a display system 1600, which is an example of display device 102, according to an embodiment. As shown in FIG. 16, system 1600 includes a display device driver circuit 1602, an image generator 1612, and parallax barrier 1620. As shown in FIG. 16, image generator 1612 includes a pixel array 1608, and parallax barrier 1620 includes a barrier element array 1610. Furthermore, as shown in FIG. 16, display driver circuit 1602 includes a pixel array driver circuit 1604 and a barrier array driver circuit 1606. These features of system 1600 are described as follows.

Pixel array 1608 includes a two-dimensional array of pixels (e.g., arranged in a grid or other distribution). Pixel array 1608 is a self-illuminating or light-generating pixel array such that the pixels of pixel array 1608 each emit light included in light 1652 emitted from image generator 1612. Each pixel may be a separately addressable light source (e.g., a pixel of a plasma display, an LCD display, an LED display such as an OLED display, or of other type of display). Each pixel of pixel array 1608 may be individually controllable to vary color and intensity. In an embodiment, each pixel of pixel array 1608 may include a plurality of sub-pixels that correspond to separate color channels, such as a trio of red, green, and blue sub-pixels included in each pixel.

Parallax barrier 1620 is positioned proximate to a surface of pixel array 1608. Barrier element array 1610 is a layer of parallax barrier 1620 that includes a plurality of barrier elements or blocking regions arranged in an array. Each barrier element of the array is configured to be selectively opaque or transparent. Combinations of barrier elements may be configured to be selectively opaque or transparent to enable various effects. For example, in one embodiment, each barrier element may have a round, square, or rectangular shape, and barrier element array 1610 may have any number of rows of barrier elements that extend a vertical length of barrier element array 1610. In another embodiment, each barrier element may have a "band" shape that extends a vertical length of barrier element array 1610, such that barrier element array 1610 includes a single horizontal row of barrier elements. Each barrier element may include one or more of such bands, and different regions of barrier element array may include barrier elements that include different numbers of such bands.

One advantage of such a configuration where barrier elements extend a vertical length of barrier element array 1610 is that such barrier elements do not need to have spacing between them because there is no need for drive signal routing in such space. For instance, in a two-dimensional LCD array configuration, such as TFT (thin film transistor) display, a transistor-plus-capacitor circuit is typically placed onsite at the corner of a single pixel in the array, and drive signals for such transistors are routed between the LCD pixels (row-column control, for example). In a pixel configuration for a parallax barrier, local transistor control may not be necessary because barrier elements may not need to be changing as rapidly as display pixels (e.g., pixels of pixel array 1608). For a single row of vertical bands of barrier elements, drive signals may be routed to the top and/or bottom of barrier elements. Because in such a configuration drive signal routing between rows is not needed, the vertical bands can be arranged side-by-side with little-to-no space in between. Thus, if the vertical bands are thin and oriented edge-to-edge, one band or multiple adjacent bands (e.g., five bands) may comprise a barrier element in a blocking state, followed by one band or multiple adjacent bands (e.g., two bands) that comprise a barrier element in a non-blocking state (a slit), and so on. In the example of five bands in a blocking state and two bands in a non-blocking state, the five bands may combine to offer a single black barrier element of approximately 2.5 times the width of a single transparent slit with no spaces therein.

It is noted that in some embodiments, barrier elements may be capable of being completely transparent or opaque, and in other embodiments, barrier elements may not be capable of being fully transparent or opaque. For instance, such barrier elements may be capable of being 95% transparent when considered to be "transparent" and may be capable of being 5% transparent when considered to be "opaque." "Transparent" and "opaque" as used herein are intended to encompass barrier elements being substantially transparent (e.g., greater than 75% transparent, including completely transparent) and substantially opaque (e.g., less than 25% transparent, including completely opaque), respectively.

Display driver circuit 1602 receives control signal 1622 and content signal 1624. As described below, content signal 1624 includes two-dimensional and/or three-dimensional content for display. Control signal 1622 may be control signal 1406 of FIG. 14 (for a non-adaptable parallax barrier 1620) or may be control signal 1506 of FIG. 15 (for an adaptable parallax barrier 1620). Control signal 1622 may be received from a display driver of an operating system (e.g., may be control signal 716 received from display driver 604 in FIG. 6). Display driver circuit 1602 is configured to generate drive signals based on control signal 1622 and content signal 1624 to enable display system 1600 to display two-dimensional and three-dimensional images to users 1618 in viewing space 1670. For example, pixel array driver circuit 1604 is configured to generate a drive signal 1614 that is received by pixel array 1608 (e.g., based on content signal 1624 and/or control signal 1622). Drive signal 1614 may include one or more drive signals used to cause pixels of pixel array 1608 to emit light 1652 of particular desired colors and/or intensity. Barrier array driver circuit 1606 is configured to generate a drive signal 1616 that is received by barrier element array 1610 (e.g., based on control signal 1622). Drive signal 1616 may include one or more drive signals used to cause each of the barrier elements of barrier element array 1610 to be transparent or opaque. In this manner, barrier element array 1610 filters light 1652 to generate filtered light 1672 that includes one or more two-dimensional and/or three-dimensional images that may be viewed by users 1618 in viewing space 1670.

For example, drive signal 1614 may control sets of pixels of pixel array 1608 to each emit light representative of a respective image, to provide a plurality of images. Drive signal 1616 may control barrier elements of barrier element array 1610 to filter the light received from pixel array 1608 according to the provided images such that one or more of the images are received by users 1618 in two-dimensional form. For instance, drive signal 1616 may select one or more sets of barrier elements of barrier element array 1610 to be transparent, to transmit one or more corresponding two-dimensional images or views to users 1618. Furthermore, drive signal 1616 may control sections of barrier element array 1610 to include opaque and transparent barrier elements to filter the light received from pixel array 1608 so that one or more pairs of images or views provided by pixel array 1608 are each received by users 1618 as a corresponding three-dimensional image or view. For example, drive signal 1616 may select parallel strips of barrier elements of barrier element array 1610 to be transparent to form slits that enable three-dimensional images to be received by users 1618.

In embodiments, drive signal 1616 may be generated by barrier array driver circuit 1606 to configure one or more characteristics of barrier element array 1610. For example, drive signal 1616 may be generated to form any number of parallel strips of barrier elements of barrier element array 1610 to be transparent, to modify the number and/or spacing of parallel strips of barrier elements of barrier element array 1610 that are transparent, to select and/or modify a width and/or a length (in barrier elements) of one or more strips of barrier elements of barrier element array 1610 that are transparent or opaque, to select and/or modify an orientation of one or more strips of barrier elements of barrier element array 1610 that are transparent, to select one or more areas of barrier element array 1610 to include all transparent or all opaque barrier elements, etc.

FIG. 17 shows a block diagram of a display system 1700, which is another example of display device 1500 of FIG. 15, according to an embodiment. As shown in FIG. 17, system 1700 includes display device driver circuit 1602, a pixel array 1722, parallax barrier 1620, and a backlighting 1716. Parallax barrier 1620 includes barrier element array 1610 and backlighting 1716 includes a light element array 1736. Furthermore, display driver circuit 1602 includes a pixel array driver circuit 1728, barrier array driver circuit 1606, and a light source driver circuit 1730. These features of system 1700 are described as follows.

Backlighting 1716 is a backlight panel that emits light 1738. Light element array 1736 (or "backlight array") of backlighting 1716 includes a two-dimensional array of light sources. Such light sources may be arranged, for example, in a rectangular grid. Each light source in light element array 1736 is individually addressable and controllable to select an amount of light emitted thereby. A single light source may comprise one or more light-emitting elements depending upon the implementation. In one embodiment, each light source in light element array 1736 comprises a single light-emitting diode (LED) although this example is not intended to be limiting. Further description of implementations of backlighting 1716 and other backlighting implementations described herein is provided in pending U.S. patent application Ser. No. 12/982,020, titled "Backlighting Array Supporting Adaptable Parallax Barrier," filed on same date herewith, which is incorporated by reference herein in its entirety.

Parallax barrier 1620 is positioned proximate to a surface of backlighting 1716 (e.g., a surface of the backlight panel). As described above, barrier element array 1610 is a layer of parallax barrier 1620 that includes a plurality of barrier elements or blocking regions arranged in an array. Each barrier element of the array is configured to be selectively opaque or transparent. Barrier element array 1610 filters light 1738 received from backlighting 1716 to generate filtered light 1740. Filtered light 1740 is configured to enable a two-dimensional image or a three-dimensional image (e.g., formed by a pair of two-dimensional images in filtered light 1672) to be formed based on images subsequently imposed on filtered light 1740 by pixel array 1722.

Similarly to pixel array 1608 of FIG. 16, pixel array 1722 of FIG. 17 includes a two-dimensional array of pixels (e.g., arranged in a grid or other distribution). However, pixel array 1722 is not self-illuminating, and instead is a light filter that imposes images (e.g., in the form of color, grayscale, etc.) on filtered light 1740 from parallax barrier 1620 to generate filtered light 1672 to include one or more images. Each pixel of pixel array 1722 may be a separately addressable filter (e.g., a pixel of a plasma display, an LCD display, an LED display, or of other type of display). Each pixel of pixel array 1722 may be individually controllable to vary the color imposed on the corresponding light passing through, and/or to vary the intensity of the passed light in filtered light 1672. In an embodiment, each pixel of pixel array 1722 may include a plurality of sub-pixels that correspond to separate color channels, such as a trio of red, green, and blue sub-pixels included in each pixel.

Display driver circuit 1602 of FIG. 17 is configured to generate drive signals based on control signal 1622 and/or content signal 1624 to enable display system 1700 to display two-dimensional and three-dimensional images to users 1618 in viewing space 1670. For example, light source driver circuit 1730 within display driver circuit 1602 controls the amount of light emitted by each light source in light element array 1736 by generating a drive signal 1734 that is received by light element array 1736 (based on content signal 1624 and/or control signal 1622). Drive signal 1734 may include one or more drive signals used to control the amount of light emitted by each light source in light element array 1736 to generate light 1738. As described above, barrier array driver circuit 1606 is configured to generate drive signal 1616 received by barrier element array 1610 (e.g., based on control signal 1622). Drive signal 1616 may include one or more drive signals used to cause each of the barrier elements of barrier element array to be transparent or opaque, to filter light 1738 to generate filtered light 1740. Pixel array driver circuit 1728 is configured to generate a drive signal 1732 that is received by pixel array 1722 (e.g., based on content signal 1624 and/or control signal 1622). Drive signal 1732 may include one or more drive signals used to cause pixels of pixel array 1722 to impose desired images (e.g., colors, grayscale, etc.) on filtered light 1740 as it passes through pixel array 1722. In this manner, pixel array 1722 generates filtered light 1672 that includes one or more two-dimensional and/or three-dimensional images that may be viewed by users 1618 in viewing space 1670.

For example, drive signal 1734 may control sets of light sources of light element array 1736 to emit light 1738. Drive signal 1616 may control barrier elements of barrier element array 1610 to filter light 1738 received from light element array 1736 to enable filtered light 1740 to enable two- and/or three-dimensionality. Drive signal 1732 may control sets of pixels of pixel array 1722 to filter filtered light 1740 according to respective images, to provide a plurality of images. For instance, drive signal 1616 may select one or more sets of the barrier elements of barrier element array 1610 to be transparent, to enable one or more corresponding two-dimensional images to be delivered to users 1618. Furthermore, drive signal 1616 may control sections of barrier element array 1610 to include opaque and transparent barrier elements to filter the light received from light element array 1736 so that one or more pairs of images provided by pixel array 1722 are each enabled to be received by users 1618 as a corresponding three-dimensional image. For example, drive signal 1616 may select parallel strips of barrier elements of barrier element array 1610 to be transparent to form slits that enable three-dimensional images to be received by users 1618.

FIG. 18 shows a flowchart 1800 for generating images that are delivered to users in a viewing space, according to an exemplary embodiment. Flowchart 1800 may be performed by system 1600 in FIG. 16 or system 1700 of FIG. 17, for example. Flowchart 1800 is described with respect to FIG. 19, which shows a cross-sectional view of a display system 1900. Display system 1900 is an exemplary embodiment of system 1600 shown in FIG. 16, and is shown for purposes of illustration. As shown in FIG. 19, system 1900 includes a pixel array 1902 and a barrier element array 1904. In another embodiment, system 1900 may further include backlighting in a configuration similar to display system 1700 of FIG. 17. Further structural and operational embodiments will be apparent to persons skilled in the relevant art(s) based on the discussion regarding flowchart 1800. Flowchart 1800 is described as follows.

Flowchart 1800 begins with step 1802. In step 1802, light is received at an array of barrier elements. For example, as shown in FIG. 16, light 1652 is received at parallax barrier 1620 from pixel array 1608. Each pixel of pixel array 1608 may generate light that is received at parallax barrier 1620. Depending on the particular display mode of parallax barrier 1620, parallax barrier 1620 may filter light 1652 from pixel array 1608 to generate a two-dimensional image or a three-dimensional image viewable in viewing space 1670 by users 1618. As described above with respect to FIG. 17, alternatively, light 1738 may be received by parallax barrier 1620 from light element array 1736.

In step 1804, a first set of the barrier elements of the array of barrier elements is configured in the blocking state and a second set of the barrier elements of the array of barrier elements is configured in the non-blocking state to enable a viewer to be delivered a three-dimensional view. Three-dimensional image content may be provided for viewing in viewing space 1670. In such case, referring to FIG. 16 or 17, barrier array driver circuit 1606 may generate drive signal 1616 to configure barrier element array 1610 to include transparent strips of barrier elements to enable a three-dimensional view to be formed. For example, as shown in FIG. 19, barrier element array 1904 includes a plurality of barrier elements that are each either transparent (in a non-blocking state) or opaque (in a blocking state). Barrier elements that are blocking are indicated as barrier elements 1910a-1910f, and barrier elements that are non-blocking are indicated as barrier elements 1912a-1912e. Further barrier elements may be included in barrier element array 1904 that are not visible in FIG. 19. Each of barrier elements 1910a-1910f and 1912a-1912e may include one or more barrier elements. Barrier elements 1910 alternate with barrier elements 1912 in series in the order of barrier elements 1910a, 1912a, 1910b, 1912b, 1910c, 1912c, 1910d, 1912d, 1910e, 1912e, and 1910f. In this manner, blocking barrier elements 1910 are alternated with non-blocking barrier elements 1912 to form a plurality of parallel non-blocking or transparent slits in barrier element array 1904.

For instance, FIG. 20 shows a view of a parallax barrier 2000 with transparent slits, according to an exemplary embodiment. Parallax barrier 2000 is an example of parallax barrier 1620 of FIGS. 16 and 17. As shown in FIG. 20, parallax barrier 2000 includes barrier element array 2002, which includes a plurality of barrier elements 2004 arranged in a two-dimensional array. Furthermore, as shown in FIG. 20, barrier element array 2002 includes a plurality of parallel strips of barrier elements 2004 that are selected to be non-blocking to form a plurality of parallel non-blocking strips (or "slits") 2006a-2006g. As shown in FIG. 20, parallel non-blocking strips 2006a-2006g (non-blocking slits) are alternated with parallel blocking or blocking strips 2008a-2008g of barrier elements 2004 that are selected to be blocking. In the example of FIG. 20, non-blocking strips 2006a-2006g and blocking strips 2008a-2008g each have a width (along the x-dimension) of two barrier elements 2004, and have lengths that extend along the entire y-dimension (twenty barrier elements 2004) of barrier element array 2002, although in other embodiments, may have alternative dimensions. Non-blocking strips 2006a-2006g and blocking strips 2008a-2008g form a parallax barrier configuration for parallax barrier 300. The spacing (and number) of parallel non-blocking strips 2006 in barrier element array 2002 may be selectable by choosing any number and combination of particular strips of barrier elements 2004 in barrier element array 2002 to be non-blocking, to be alternated with blocking strips 2008, as desired. For example, hundreds, thousands, or even larger numbers of non-blocking strips 2006 and blocking strips 2008 may be present in parallax barrier 300.

FIG. 21 shows a parallax barrier 2100 that is another example of parallax barrier 1620 with parallel transparent slits, according to an embodiment. Similarly to parallax barrier 2000 of FIG. 20, parallax barrier 2100 has includes a barrier element array 2112, which includes a plurality of barrier elements 2114 arranged in a two-dimensional array (28 by 1 array). Barrier elements 2114 have widths (along the x-dimension) similar to the widths of barrier elements 2004 in FIG. 20, but have lengths that extend along the entire vertical length (y-dimension) of barrier element array 2112. As shown in FIG. 21, barrier element array 2112 includes parallel non-blocking strips 2006a-2006g alternated with parallel blocking strips 2008a-2008g. In the example of FIG. 21, parallel non-blocking strips 2006a-2006g and parallel blocking strips 2008a-2008g each have a width (along the x-dimension) of two barrier elements 2114, and have lengths that extend along the entire y-dimension (one barrier element 314) of barrier element array 2112.

Referring back to FIG. 18, in step 1806, the light is filtered at the array of barrier elements to form the three-dimensional view in a viewing space. Barrier element array 1610 of parallax barrier 1620 is configured to filter light 1652 received from pixel array 1608 (FIG. 16) or light 1738 received from light element array 1736 (FIG. 17) according to whether barrier element array 1610 is transparent or non-blocking (e.g., in a two-dimensional mode) or includes parallel non-blocking strips (e.g., in a three-dimensional mode). If one or more regions of barrier element array 1610 are transparent, those regions of barrier element array 1610 function as "all pass" filters to substantially pass all of light 1652 as filtered light 1672 to deliver one or more corresponding two-dimensional images generated by pixel array 1608 to viewing space 1670, to be viewable as a two-dimensional images in a similar fashion as a conventional display. If barrier element array 1610 includes one or more regions having parallel non-blocking strips (e.g., as shown for barrier element array 2002 in FIGS. 20 and 21), those regions of barrier element array 1610 pass a portion of light 1652 as filtered light 1672 to deliver one or more corresponding three-dimensional images to viewing space 1670.

For example, as shown in FIG. 19, pixel array 1902 includes a plurality of pixels 1914a-1914d and 1916a-1916d. Pixels 1914 alternate with pixels 1916, such that pixels 1914a-1914d and 1916a-1916d are arranged in series in the order of pixels 1914a, 1916a, 1914b, 1916b, 1914c, 1916c, 1914d, and 1916d. Further pixels may be included in pixel array 1902 that are not visible in FIG. 19, including further pixels along the width dimension of pixel array 1902 (e.g., in the left-right directions) as well as pixels along a length dimension of pixel array 1902 (not visible in FIG. 19). Each of pixels 1914a-1914d and 1916a-1916d generates light, which emanates from display surface 1924 of pixel array 1902 (e.g., generally upward in FIG. 19) towards barrier element array 1904. Some example indications of light emanating from pixels 1914a-1914d and 1916a-1916d are shown in FIG. 19 (as dotted lines), including light 1924a and light 1918a emanating from pixel 1914a, light 1924b, light 1918b, and light 1924c emanating from pixel 1914b, etc.

Furthermore, light emanating from pixel array 1902 is filtered by barrier element array 1904 to form a plurality of images in a viewing space 1926, including a first image 1906a at a first location 1908a and a second image 1906b at a second location 1908b. A portion of the light emanating from pixel array 1902 is blocked by blocking barrier elements 1910, while another portion of the light emanating from pixel array 1902 passes through non-blocking barrier elements 1912, according to the filtering by barrier element array 1904. For instance, light 1924a from pixel 1914a is blocked by blocking barrier element 1910a, and light 1924b and light 1924c from pixel 1914b are blocked by blocking barrier elements 1910b and 1910c, respectively. In contrast, light 1918a from pixel 1914a is passed by non-blocking barrier element 1912a and light 1918b from pixel 1914b is passed by non-blocking barrier element 1912b.

By forming parallel non-blocking slits in a barrier element array, light from a pixel array can be filtered to form multiple images or views in a viewing space. For instance, system 1900 shown in FIG. 19 is configured to form first and second images 1906a and 1906b at locations 1908a and 1908b, respectively, which are positioned at a distance 1928 from pixel array 1902 (as shown in FIG. 19, further instances of first and second images 1906a and 1906b may be formed in viewing space 1926 according to system 1900, in a repeating, alternating fashion). As described above, pixel array 1902 includes a first set of pixels 1914a-1914d and a second set of pixels 1916a-1916d. Pixels 1914a-1914d correspond to first image 1906a and pixels 1916a-1916d correspond to second image 1906b. Due to the spacing of pixels 1914a-1914d and 1916a-1916d in pixel array 1902, and the geometry of non-blocking barrier elements 1912 in barrier element array 1904, first and second images 1906a and 1906b are formed at locations 1908a and 1908b, respectively. As shown in FIG. 19, light 1918a-1918d from the first set of pixels 1914a-1914d is focused at location 1908a to form first image 1906a at location 1908a. Light 1920a-1920d from the second set of pixels 1916a-1916d is focused at location 1908b to form second image 1906b at location 1908b.

FIG. 19 shows a slit spacing 1922 (center-to-center) of non-blocking barrier elements 1912 in barrier element array 1904. Spacing 1922 may be determined to select locations for parallel non-blocking slits to be formed in barrier element array 1904 for a particular image distance 1928 at which images are desired to be formed (for viewing by users). For example, in an embodiment, if a spacing of pixels 1914a-1914d corresponding to an image is known, and a distance 1928 at which the image is desired to be displayed is known, the spacing 1922 between adjacent parallel non-blocking slits in barrier element array 1904 may be selected.

First and second images 1906a and 1906b are configured to be perceived by a user as a three-dimensional image or view. For example, a viewer may receive first image 1906a at a first eye location and second image 1906b at a second eye location, according to an exemplary embodiment. First and second images 1906a and 1906b may be generated by first set of pixels 1914a-1914d and second set of pixels 1916a-1916d as images that are slightly different perspective from each other. Images 1906a and 1906b are combined in the visual center of the brain of the viewer to be perceived as a three-dimensional image or view. In such an embodiment, first and second images 1906a and 1906b may be formed by display system 1900 such that their centers are spaced apart a width of a user's pupils (e.g., an "interocular distance").

Note that in the embodiments of FIGS. 20 and 21, the entire regions of parallax barriers 2000 and 2100 are filled with parallel non-blocking strips (e.g., as shown for barrier element array 2002 in FIGS. 20 and 21) to be configured to deliver three-dimensional images to viewing space 1670. In further embodiments, one or more regions of a parallax barrier may be filled with parallel non-blocking strips to deliver three-dimensional images, and one or more other regions of the parallax barrier may be transparent to deliver two-dimensional images. Furthermore, different regions of a parallax barrier that have parallel non-blocking strips may have the parallel non-blocking strips oriented at different angles to deliver three-dimensional images to viewers that are oriented differently.

For instance, FIG. 22 shows a view of a parallax barrier 2200 configured to enable the simultaneous display of two-dimensional and three-dimensional images at different regions, according to exemplary embodiments. Parallax barrier 2200 is similar to parallax barrier 2000 of FIG. 20, having barrier element array 2002 including a plurality of barrier elements 2004 arranged in a two-dimensional array. In FIG. 22, a first region 2202 of barrier element array 2002 includes a plurality of parallel non-blocking strips alternated with parallel blocking strips that together fill first region 2202. A second region 2204 of barrier element array 2002 is surrounded by first region 2202. Second region 2204 is a rectangular shaped region of barrier element array 2002 that includes a two-dimensional array of barrier elements 2004 that are non-blocking. Thus, in FIG. 22, barrier element array 2002 is configured to enable a three-dimensional image to be generated by pixels of a pixel array that are adjacent to barrier elements of first region 2202, and to enable a two-dimensional image to be generated by pixels of the pixel array that are adjacent to barrier elements inside of second region 2204. Note that alternatively, first region 2202 may include all non-blocking barrier elements 2002 to pass a two-dimensional image, and second region 2204 may include parallel non-blocking strips alternated with parallel blocking strips to pass a three-dimensional image. In further embodiments, parallax barrier 2200 may have additional numbers, sizes, and arrangements of regions configured to pass different combinations of two-dimensional images and three-dimensional images.

In another example, FIG. 23 shows a view of a parallax barrier 2300 with transparent slits having different orientations, according to an exemplary embodiment. Parallax barrier 2300 is similar to parallax barrier 2000 of FIG. 20, having barrier element array 2002 including a plurality of barrier elements 2004 arranged in a two-dimensional array. A first region 2310 (e.g., a bottom half) of barrier element array 2002 includes a first plurality of parallel strips of barrier elements 2004 that are selected to be non-blocking to form a first plurality of parallel non-blocking strips 2302a-2302e (each having a width of two barrier elements 2004). As shown in FIG. 23, parallel non-blocking strips 2302a-2302e are alternated with parallel blocking strips 2304a-2304f of barrier elements 2004 (each having a width of three barrier elements 2004). Parallel non-blocking strips 2302a-2302e are oriented in a first direction (e.g., along a vertical axis).

Furthermore, as shown in FIG. 23, a second region 2312 (e.g., a top half) of barrier element array 2002 includes a second plurality of parallel strips of barrier elements 2004 that are selected to be non-blocking to form a second plurality of parallel non-blocking strips 2306a-2306d (each having a width of one barrier element 2004). As shown in FIG. 23, parallel non-blocking strips 2306a-2306d are alternated with parallel blocking strips 2308a-2308c of barrier elements 2004 (each having a width of two barrier elements 2004). Parallel non-blocking strips 2306a-2306d are oriented in a second direction (e.g., along a horizontal axis).

As such, in FIG. 23, first and second pluralities of parallel non-blocking strips 2302a-2302e and 2306a-2306d are present in barrier element array 2002 that are oriented perpendicularly to each other. The region of barrier element array 2002 that includes first plurality of parallel non-blocking strips 2302a-2302e may be configured to deliver a three-dimensional image in a viewing space (as described above) to be viewable by a user whose body is oriented vertically (e.g., sitting upright or standing up). The region of barrier element array 2002 that includes second plurality of parallel non-blocking strips 2306a-2306d may be configured to deliver a three-dimensional image in a viewing space (as described above) to be viewable by a user whose body is oriented horizontally (e.g., laying down). In this manner, users who are oriented differently relative to each other can still each be provided with a corresponding three-dimensional image that accommodates their position.

As described above, in an embodiment, display device 1502 of FIG. 15 may be configured to generate a two-dimensional image for viewing by users in a viewing space. For instance, referring to FIGS. 16 and 17, barrier element array 1610 may be configured into a third configuration to deliver a two-dimensional view. In the third configuration, barrier array driver circuit 1606 may generate drive signal 1616 to configure each barrier element of barrier element array 1610 to be in the non-blocking state (transparent). If barrier element array 1610 is non-blocking, barrier element array 1610 functions as an "all pass" filter to substantially pass all of light 1652 (FIG. 16) or light 1738 (FIG. 17) as filtered light 1672 to deliver the two-dimensional image to viewing space 1670, to be viewable as a two-dimensional image in a similar fashion as a conventional display.

In embodiments, display systems may be configured to generate multiple two-dimensional images or views for viewing by users in a viewing space. For example, FIG. 24 shows a display system 2400 configured to deliver two two-dimensional images, according to an embodiment. Display system 2400 is configured similarly to display system 1900 of FIG. 19. As shown in FIG. 24, display system 2400 includes pixel array 1902 and barrier element array 1904, which generate first and second images 2402*a* and 2402*b*. As shown in FIG. 24, a first viewer 2404*a* receives first image 2402*a* at a first location and a second viewer 2404*b* receives second image 2402*b* at a second location, according to an exemplary embodiment. Similarly to the description provided above with respect to FIG. 19, first and second images 2402*a* and 2402*b* may be generated by first set of pixels 1914*a*-1914*d* and second set of pixels 1916*a*-1916*d* of pixel array 1902. However, rather than first and second images 2402*a* and 2402*b* being images that are of different perspective, first and second images 2402*a* and 2402*b* are each a two-dimensional image that may be viewed independently from each other. For instance, image 2402*a* and image 2402*b* may generated by display system 1900 from first media content and second media content, respectively, that are independent of each other. Image 2402*a* may be received by both eyes of first viewer 2404*a* to be perceived by first viewer 2404*a* as a first two-dimensional image, and image 2402*b* may be received by both eyes of second viewer 2404*b* to be perceived by second viewer 2404*b* as a second two-dimensional image. Thus, first and second images 2402*a* and 2402*b* may be generated to have a spacing that enables them to be separately viewed by first and second users 2404*a* and 2404*b*.

As such, display system 2400 of FIG. 24 can be configured to deliver a single three-dimensional view to a viewer (e.g., as shown in FIG. 19 for display system 1900), to deliver a pair of two-dimensional views to a pair of viewers (e.g., as shown in FIG. 24), or to deliver a pair of three-dimensional views to a pair of viewers as described above). Display system 2400 can be configured to switch between delivering views to one and two viewers by turning off or turning on, respectively, the display of media content by pixel array 1902 associated with one of the viewers (e.g., by turning off or on pixels 1916 associated with second image 2402*b*). Display system 2400 can be configured to switch between delivering two-dimensional and three-dimensional views by providing the corresponding media content type at pixel array 2402. Furthermore, display system 2400 may provide such capabilities when configured similarly to display system 1700 shown in FIG. 17 (e.g., including backlighting 1716).

In an embodiment, display system 1900 may be configured to generate multiple three-dimensional images that include related image content (e.g., each three-dimensional image is a different viewpoint of a common scene), or that each include unrelated image content, for viewing by users in a viewing space. Each of the three-dimensional images may correspond to a pair of images generated by pixels of the pixel array. The barrier element array filters light from the pixel array to form the image pairs in a viewing space to be perceived by users as three-dimensional images.

For instance, FIG. 25 shows a flowchart 2500 for generating multiple three-dimensional images, according to an exemplary embodiment. Flowchart 2500 is described with respect to FIG. 26, which shows a cross-sectional view of a display system 2600. Display system 2600 is an exemplary embodiment of system 1600 shown in FIG. 16, and is shown for purposes of illustration. As shown in FIG. 26, system 2600 includes a pixel array 2602 and a barrier element array 2604. System 2600 may also include display driver circuit 1602 of FIG. 16, which is not shown in FIG. 26 for ease of illustration. Further structural and operational embodiments will be apparent to persons skilled in the relevant art(s) based on the discussion regarding flowchart 2500. Flowchart 2500 is described as follows.

Flowchart 2500 begins with step 2502. In step 2502, light is received from an array of pixels that includes a plurality of pairs of sets of pixels. For instance, in the example of FIG. 26, pixel array 2602 includes a first set of pixels 2614*a*-2614*d*, a second set of pixels 2616*a*-2616*d*, a third set of pixels 2618*a*-2618*d*, and a fourth set of pixels 2620*a*-2620*d*. Each of pixels 2614*a*-2614*d*, 2616*a*-2616*d*, 2618*a*-2618*d*, 2620*a*-2620*d* generates light, which emanates from the surface of pixel array 2602 towards barrier element array 2604. Each set of pixels generates a corresponding image. First set of pixels 2614*a*-2614*d* and third set of pixels 2618*a*-2618*d* are configured to generate images that combine to form a first three-dimensional image. Second set of pixels 2616*a*-2616*d* and fourth set of pixels 2620*a*-2620*d* are configured to generate images that combine to form a second three-dimensional image. Pixels of the four sets of pixels are alternated in pixel array 2602 in the order of pixel 2614*a*, pixel 2616*a*, pixel 2618*a*, pixel 2620*a*, pixel 2614*b*, pixel 2616*b*, etc. Further pixels may be included in each set of pixels in pixel array 2602 that are not visible in FIG. 26, including hundreds, thousands, or millions of pixels in each set of pixels.

As described above, in the current embodiment, pixel array 2602 is segmented into a plurality of pairs of sets of pixels. For instance, in the example of FIG. 26, pixel array 2602 is segmented into four sets of pixels. The first set of pixels includes pixels 2614*a*-2614*g* and the other pixels in the same columns, the second set of pixels includes pixels 2616*a*-2616*g* and the other pixels in the same columns, pixels 2618*a*-2618*g* and the other pixels in the same columns, and pixels 2620*a*-2620*g* and the other pixels in the same columns.

In step 2504, a plurality of strips of barrier elements of a barrier element array is selected to be non-blocking to form a plurality of parallel non-blocking slits. As shown in FIG. 26, barrier element array 2604 includes barrier elements that are each either non-blocking or blocking. Barrier elements that are blocking are indicated as barrier elements 2610*a*-2610*f*, and barrier elements that are non-blocking are indicated as barrier elements 2612*a*-2612*e*. Further barrier elements may be included in barrier element array 2604 that are not visible in FIG. 26, including hundreds, thousands, or millions of barrier elements, etc. Each of barrier elements 2610*a*-2610*f* and 2612*a*-2612*e* may include one or more barrier elements. Barrier elements 2610 alternate with barrier elements 2612. In this manner, blocking barrier elements 2610 are alternated with non-blocking barrier elements 2612 to form a plurality of parallel non-blocking slits in barrier element array 2604.

In step 2506, the light is filtered at the barrier element array to form a plurality of pairs of images in a viewing space corresponding to the plurality of pairs of sets of pixels, each pair of images of the plurality of pairs of images being configured to be perceived as a corresponding three-dimensional image of a plurality of three-dimensional images. As shown in FIG. 26, light emanating from pixel array 2602 is filtered by barrier element array 2604 to form a plurality of images in a viewing space 2626. For instance, four images are formed in viewing space 2626, including first-fourth images 2606a-2606d. Pixels 2614a-2614d correspond to first image 2606a, pixels 2616a-2616d correspond to second image 2606b, pixels 2618a-2618d correspond to third image 2606c, and pixels 2620a-2620d correspond to fourth image 2606d. As shown in FIG. 26, light 2622a-2622d from the first set of pixels 2614a-2614d forms first image 2606a, and light 2624a-2624d from the third set of pixels 2618a-2618d forms third image 2606c, due to the filtering of the non-blocking slits (corresponding to non-blocking barrier elements 2612a-2612e) in barrier element array 2604. Although not indicated in FIG. 26 (for ease of illustration), in a similar fashion, light from the second set of pixels 2616a-2616d forms second image 2606b, and light from the fourth set of pixels 2620a-2620d forms fourth image 2606d.

In the embodiment of FIG. 26, any pair of images of images 2606a-2606d may be configured to be perceived as a three-dimensional image by a user in viewing space 2626. For instance, first and third images 2606a and 2606c may be configured to be perceived by a user as a first three-dimensional image, such that first image 2606a is received at a first eye location and third image 2606c is received at a second eye location of a user. Furthermore, second and fourth images 2606b and 2606d may be configured to be perceived by a user as a second three-dimensional image, such that second image 2606b is received at a first eye location and fourth image 2606d is received at a second eye location of a user.

In the example of FIG. 26, two three-dimensional images are provided by system 2600. In further embodiments, further numbers of three-dimensional images may be provided, including a third three-dimensional image, a fourth three-dimensional image, etc. In such case, each three-dimensional image is generated by filtering light (using a barrier element array) corresponding to an image pair generated by a corresponding pair of sets of pixels of the pixel array, in a similar fashion as described with respect to FIG. 26 for two three-dimensional images. For example, to provide three three-dimensional images, pixel array 2602 may include fifth and sixth sets of pixels that generate fifth and sixth images, respectively, to be perceived by a user as a third three-dimensional image. To provide a fourth three-dimensional image, pixel array 2602 may include seventh and eighth sets of pixels that generate seventh and eighth images, respectively, to be perceived by a user as the fourth three-dimensional image.

In FIG. 26, the first and second three-dimensional images generated based on first and third images 2606a and 2606c and second and fourth images 2606b and 2606d, respectively, and any further three-dimensional images that may be generated, may include related image content or may each include unrelated image content. For example, in an embodiment, the first and second three-dimensional images (and any further three-dimensional images) may have been captured as different viewpoints of a common scene. Thus, a user in viewing space 2626 that moves laterally to sequentially view the first and second three-dimensional images (and any further three-dimensional images) may perceive being able to partially or fully "view behind" objects of the common scene.

Further description regarding using a parallax barrier to deliver three-dimensional views, including adaptable versions of parallax barriers, is provided in pending U.S. patent application Ser. No. 12/845,409, titled "Display With Adaptable Parallax Barrier," in pending U.S. patent application Ser. No. 12/845,440, titled "Adaptable Parallax Barrier Supporting Mixed 2D And Stereoscopic 3D Display Regions," and in pending U.S. patent application Ser. No. 12/845,461, titled "Display Supporting Multiple Simultaneous 3D Views," which are each incorporated by reference herein in their entireties.

2. Exemplary Embodiments Using Lenticular Lenses

In embodiments, as described herein, display devices 1400 and 1500 of FIGS. 14 and 15 may include one or more lenticular lenses as light manipulators 1404 and 1504 used to deliver three-dimensional images and/or two-dimensional images. For instance, display systems 1600 and 1700 of FIGS. 16 and 17 may each include a sub-lens array of a lenticular lens in place of parallax barrier 1620. For example, FIG. 27 shows a perspective view of a lenticular lens 2700 in accordance with an embodiment. As shown in FIG. 27, lenticular lens 2700 includes a sub-lens array 2702. Sub-lens array 2702 includes a plurality of sub-lenses 2704 arranged in a two-dimensional array (e.g., arranged side-by-side in a row). Each sub-lens 2704 is shown in FIG. 27 as generally cylindrical in shape and having a substantially semi-circular cross-section, but in other embodiments may have other shapes. In FIG. 27, sub-lens array 2702 is shown to include eight sub-lenses for illustrative purposes and is not intended to be limiting. For instance, sub-lens array 2702 may include any number (e.g., hundreds, thousands, etc.) of sub-lenses 2704. FIG. 28 shows a side view of lenticular lens 2700, oriented as lenticular lens 2700 may be positioned in system 1900 of FIG. 19 (in place of parallax barrier 1904) for lenticular lens 1902 to deliver three-dimensional views. In FIG. 28, light may be passed through lenticular lens 2700 in the direction of dotted arrow 2802 to be diverted.

In one embodiment, lenticular lens 2700 may be fixed in size. For example, light manipulator 1404 of FIG. 14 may include lenticular lens 2700 when fixed in size. In another embodiment, lenticular lens 2700 may be adaptable. For instance, light manipulator 1504 of FIG. 15 may include lenticular lens 2700 when adaptable. For instance, in an embodiment lenticular lens 2700 may be made from an elastic material. Such a lenticular lens 2700 may be adapted in size in response to generated drive signals.

Further description regarding using a lenticular lens to deliver three-dimensional views, including adaptable versions of lenticular lenses, is provided in pending U.S. patent application Ser. No. 12/774,307, titled "Display with Elastic Light Manipulator," which is incorporated by reference herein in its entirety.

3. Exemplary Embodiments Using Multiple Light Manipulators

Display devices 1400 and 1500 may include multiple layers of light manipulators in embodiments. Multiple three-dimensional images may be displayed in a viewing space using multiple light manipulator layers, according to embodiments. In embodiments, the multiple light manipulating layers may enable spatial separation of the images. For instance, in such an embodiment, for example, a display device that includes multiple light manipulator layers may be configured to display a first three-dimensional image in a first region of a viewing space (e.g., a left-side area), a second three-dimensional image in a second region of the viewing space (e.g., a central area), a third three-dimensional image in a third region of the viewing space (e.g., a right-side area), etc. In embodiments, a display device may be configured to display any number of spatially separated three-dimensional images, as desired for a particular application (e.g., according to a number and spacing of viewers in the viewing space, etc.).

For instance, FIG. 29 shows a flowchart 2900 for generating multiple three-dimensional images using multiple light manipulator layers, according to an exemplary embodiment. Flowchart 2900 is described with respect to FIG. 30, which shows a cross-sectional view of a display system 3000 that includes multiple light manipulator layers, according to an exemplary embodiment. As shown in FIG. 30, system 3000 includes a display driver circuit 3002, an image generator 1612, a first light manipulator 3014a, and a second light manipulator 3014b. As shown in FIG. 30, image generator 1612 includes pixel array 1608, first light manipulator 3014a includes first light manipulator elements 3016a, and second light manipulator 3014b includes second light manipulator elements 3016b. Furthermore, as shown in FIG. 30, display driver circuit 3002 includes a pixel array driver circuit 3004 and a light manipulator driver circuit 3006. Flowchart 2900 and system 3000 are described as follows.

Flowchart 2900 begins with step 2902. In step 2902, light is received from an array of pixels that includes a plurality of pairs of sets of pixels. For example, as shown in FIG. 30, light 1652 is received at first light manipulator 3014a from pixel array 208 of image generator 1612. Pixel array driver circuit 3004 may generate driver signals based on content signal 1624 received by display driver circuit 3002, and the driver signals may be received by pixel array 1614 to generate light 1652. Each pixel of pixel array 1608 may generate light that is received at first light manipulator 3014a. In an embodiment, pixel array driver circuit 3004 may generate drive signal 1614 to cause pixel array 1608 to emit light 1652 containing a plurality of images corresponding to the sets of pixels.

In step 2904, the light from the array of pixels is manipulated with a first light manipulator. For example, first light manipulator 3014a may be configured to manipulate light 1652 received from pixel array 1608. As shown in FIG. 30, first light manipulator 3014a includes light manipulator elements 3016a configured to perform manipulating (e.g., filtering, diverting, etc.) of light 1652 to generate manipulated light 1672. Light manipulator elements 3016a may optionally be configurable to adjust the manipulating performed by first light manipulator 3014a. First light manipulator 3014a may perform filtering in a similar manner as a parallax barrier described above or in other manner. In another embodiment, first light manipulator 3014a may include a lenticular lens that diverts light 1652 to perform light manipulating, generating manipulated light 1672. In an embodiment, light manipulator driver circuit 3006 may generate drive signal 1616a based on control signal 1622 received by display driver 3002 to cause light manipulator elements 3016a to manipulate light 1652 as desired.

In step 2906, the light manipulated by the first light manipulator is manipulated with a second light manipulator to form a plurality of pairs of images corresponding to the plurality of pairs of sets of pixels in a viewing space. For example, as shown in FIG. 30, manipulated light 1672 is received by second light manipulator 3014b to generate manipulated light 3008 that includes a plurality of three-dimensional images 3010a-3010n formed in viewing space 1670. As shown in FIG. 30, second light manipulator 3014b includes light manipulator elements 3016b configured to perform manipulating of manipulated light 1672 to generate manipulated light 3008. Light manipulator elements 3016b may optionally be configurable to adjust the manipulating performed by second light manipulator 3014b. In an embodiment, light manipulator driver circuit 3006 may generate drive signal 1616b based on control signal 1622 to cause light manipulator elements 3016b to manipulate manipulated light 1652 to generate manipulated light 3008 including three-dimensional images 3010a-3010n as desired. In embodiments, second light manipulator 3014a may include a parallax barrier or a lenticular lens configured to manipulate manipulated light 1652 to generate manipulated light 3008.

As such, display system 3000 has a single viewing plane or surface (e.g., a plane or surface of pixel array 1608, first light manipulator 3014a, second light manipulator 3014b) that supports multiple viewers with media content in the form of three-dimensional images or views. The single viewing plane of display system 3000 may provide a first three-dimensional view based on first three-dimensional media content to a first viewer, a second three-dimensional view based on second three-dimensional media content to a second viewer, and optionally further three-dimensional views based on further three-dimensional media content to further viewers. First and second light manipulators 3014a and 3014b each cause three-dimensional media content to be presented to a corresponding viewer via a corresponding area of the single viewing plane, with each viewer being enabled to view corresponding media content without viewing media content directed to other viewers. Furthermore, the areas of the single viewing plane that provide the various three-dimensional views of media content overlap each other at least in part. In the embodiment of FIG. 30, the areas may be the same area—an area of a display screen or surface of display system 3000. As such, multiple three-dimensional views that are each viewable by a corresponding viewer may be delivered by a single display viewing plane.

Display system 3000 may be configured in various ways to generate multiple three-dimensional images according to flowchart 2900, in embodiments. Furthermore, as described below, embodiments of display system 3000 may be configured to generate two-dimensional views, as well as any combination of one or more two-dimensional views simultaneously with one or more three-dimensional views.

For instance, in an embodiment, delivery of three-dimensional images may be performed in system 3000 using multiple parallax barriers. FIG. 31 shows a cross-sectional view of a display system 3100, according to an exemplary embodiment. Display system 3100 is an example of system 3000 shown in FIG. 30. As shown in FIG. 31, system 3100 includes a pixel array 3102, a first barrier element array 3104, and a second barrier element array 3106. System 3100 may also include display driver circuit 3002 of FIG. 30, which is not shown in FIG. 31 for ease of illustration. System 3100 is described as follows.

As shown in the example of FIG. 31, pixel array 3102 includes a first set of pixels 3114a-3114c, a second set of pixels 3116a-3116c, a third set of pixels 3118a-3118c, and a fourth set of pixels 3120a-3120c. Pixels of the four sets of pixels are alternated in pixel array 3102 in the order of pixel 3114a, pixel 3116a, pixel 3118a, pixel 3120a, pixel 3114b, pixel 3116b, etc. Further pixels may be included in each set of pixels in pixel array 3102 that are not visible in FIG. 31, including hundreds, thousands, or millions of pixels in each set of pixels.

Each of pixels 3114a-3114c, 3116a-3116c, 3118a-3118c, and 3120a-3120c is configured to generate light, which emanates from the surface of pixel array 3102 towards first barrier element array 3104. Each set of pixels is configured to generate a corresponding image. For example, FIG. 32 shows display system 3100, where pixels of pixel array 3102 emit light. Light from second set of pixels 3116a-3116c and first set of pixels 3114a-3114c is configured to generate third and fourth images 3206c and 3206d, respectively, which may be perceived together as a second three-dimensional image by a second viewer 2404*b*. Light from fourth set of pixels 3120*a*-3120*c* and third set of pixels 3118*a*-3118*c* is configured to generate first and second images 3206*a* and 3206*b*, respectively, which may be perceived together as a first three-dimensional image by a first viewer 2404*a*. The light emitted by the sets of pixels is filtered by first and second barrier element arrays 3104 and 3106 to generate the first and second three-dimensional images in respective desired regions of a user space 3202 adjacent to display system 3100.

First-fourth images 3206*a*-3206*d* may be formed in viewing space 3202 at a distance from pixel array 3102 and at a lateral location of viewing space 3202 as determined by a configuration of display system 3100 of FIG. 31, including a width and spacing of non-blocking slits in first barrier element array 3104, by a width and positioning of non-blocking slits in second barrier element array 3106, by a spacing between pixel array 3102 and first barrier element array 3104, and a spacing between first and second barrier element arrays 3104 and 3106.

In an embodiment, system 3000 of FIG. 30 may be configured similarly to display system 1700 of FIG. 17 to deliver three-dimensional images and/or two-dimensional images. For instance, in embodiments, system 3000 may include backlighting 1716 and pixel array 1722 separated by one or both of first and second light manipulators 3014*a* and 3014*b*. For example, FIG. 33 shows a block diagram of a display system 3300, which is an example of display devices 1400 and 1500 shown in FIGS. 14 and 15, according to an embodiment. Display system 3300 is configured to display multiple three-dimensional images in a viewing space in a spatially separated manner. As shown in FIG. 33, system 3300 includes display driver circuit 3002, backlighting 1716, first light manipulator 3014*a*, second light manipulator 3014*b*, and pixel array 1722. As shown in FIG. 33, backlighting 1716 optionally includes light element array 1736, first light manipulator 3014*a* includes first light manipulator elements 3016*a*, and second light manipulator 3014*b* includes second light manipulator elements 3016*b*. Furthermore, as shown in FIG. 33, display driver circuit 3002 receives control signal 1622 and content signal 1624 and includes light source driver circuit 1730, light manipulator driver circuit 3006, and pixel array driver circuit 1728. Light source driver circuit 1730, light manipulator driver circuit 3006, and pixel array driver circuit 1728 may generate drives signals to perform their respective functions based on control signal 1622 and/or content signal 1624. As shown in FIG. 33, first and second light manipulators 3014*a* and 3014*b* are positioned between backlighting 1716 and pixel array 1722. In another embodiment, pixel array 1722 may instead be located between first and second light manipulators 3014*a* and 3014*b*.

As shown in FIGS. 16 and 17, display driver circuit 1602 receives content signal 1624, and as shown in FIGS. 30 and 33, display driver circuit 3002 receives content signal 1624. Content signal 1624 is an example of content signals 1408 and 1508 of FIGS. 14 and 15. Content signal 1624 includes two-dimensional and/or three-dimensional content for display by the respective display devices/systems. For instance, display driver circuits 1602 and 3002 generate respective drive signals (e.g., pixel array drive signals) based on content signal 1624 to enable the content carried by content signal 1624 to be displayed.

D. Example Display Environments

As described above, light manipulators may be reconfigured to change the locations of delivered views based on changing viewer positions. As such, a position of a viewer may be determined/tracked so that a parallax barrier and/or light manipulator may be reconfigured to deliver views consistent with the changing position of the viewer. For instance, with regard to a parallax barrier, a spacing, number, arrangement, and/or other characteristic of slits may be adapted according to the changing viewer position. With regard to a lenticular lens, a size of the lenticular lens may be adapted (e.g., stretched, compressed) according to the changing viewer position. In embodiments, a position of a viewer may be determined/tracked by determining a position of the viewer directly, or by determining a position of a device associated with the viewer (e.g., a device worn by the viewer, held by the viewer, sitting in the viewer's lap, in the viewer's pocket, sitting next the viewer, etc.).

Examples of display environments for display embodiments described herein include environments having a single viewer, as well as environments having multiple viewers. For example, in one type of environment (e.g., an office, living room, etc.), a single viewer interacts with an electronic device, mobile or stationary, to view and/or interact with mixed 2D and 3D content, such as a mobile or desktop computer, smart phone, television, or other mobile or stationary device. It is noted that this type of environment may include more than one viewer. In another type of environment (e.g., a living room, a home theatre room, etc.), multiple viewers are enabled to interact with an electronic device, such as a television set (e.g., high-def, small screen, large screen, etc.), to view and/or interact with mixed 2D and 3D content in the form of television content, movies, video games, etc.

For instance, FIG. 34 shows a block diagram of a display environment 3400, according to an exemplary embodiment. In the example of FIG. 34, first and second viewers 3406*a* and 3406*b* are present in display environment 3400, and are enabled to interact with a display device 3402 to be delivered two-dimensional and/or three-dimensional media content. Although two viewers 3406 are shown present in FIG. 34, in other embodiments, other numbers of viewers 3406 may be present in display environment 3400 that may interact with display device 3402 and may be delivered media content by display device 3402. As shown in FIG. 34, display environment 3400 includes display device 3402, a first remote control 3404*a*, a second remote control 3404*b*, a first headset 3412*a*, a second headset 3412*b*, and viewers 3406*a* and 3406*b*. Display device 3402 is an example of the display devices described above, and may be configured similarly to any display device described herein, including display device 102. Viewer 3406*a* is delivered a view 3408*a* by display device 3402, and viewer 3406*b* is delivered a view 3408*b* by display device 3402. Views 3408*a* and 3408*b* may each be a two-dimensional view or a three-dimensional view. Furthermore, in embodiments, view 3408*a* may be delivered to viewer 3406*a*, but not be visible by viewer 3406*b*, and view 3408*b* may be delivered to viewer 3406*b*, but not be visible by viewer 3406*a*.

Remote control 3404*a* is a device that viewer 3406*a* may use to interact with display device 3402, and remote control 3404*b* is a device that viewer 3406*b* may use to interact with display device 3402. For example, as shown in FIG. 34, viewer 3406*a* may interact with a user interface of remote control 3404*a* to generate a display control signal 3414*a*, and viewer 3406*b* may interact with a user interface of remote control 3404*b* to generate a display control signal 3414*b*. Display control signals 3414*a* and 3414*b* may be transmitted to display device 3402 using wireless or wired communication links. Display control signals 3414*a* and 3414*b* may be configured to select particular content desired to be viewed by viewers 3406a and 3406b, respectively. For example, display control signals 3414a and 3414b may select particular media content to be viewed (e.g., television channels, video games, DVD (digital video discs) content, video tape content, web content, etc.). Display control signals 3414a and 3414b may select whether such media content is desired to be viewed in two-dimensional or three-dimensional form by viewers 3406a and 3406b, respectively. Remote controls 3404a and 3404b may be television remote control devices, game controllers, smart phones, or other remote control type device.

Headsets 3412a and 3412b are worn by viewers 3406a and 3406b, respectively. Headsets 3412a and 3412b each include one or two speakers (e.g., earphones) that enable viewers 3406a and 3406b to hear audio associated with the media content of views 3408a and 3408b. Headsets 3412a and 3412b enable viewers 3406a and 3406b to hear audio of their respective media content without hearing audio associated the media content of the other of viewers 3406a and 3406b. Headsets 3412a and 3412b may each optionally include a microphone to enable viewers 3406a and 3406b to interact with display device 3402 using voice commands.

Display device 3402a, headset 3412a, and/or remote control 3404a may operate to provide position information 3410a regarding viewers 3406a to display device 3402, and display device 3402b, headset 3412b, and/or remote control 3404b may operate to provide position information 3410b regarding viewers 3406b to display device 3402. Display device 3402 may use position information 3410a and 3410b to reconfigure one or more light manipulators (e.g., parallax barriers and/or lenticular lenses) of display device 3402 to enable views 3408a and 3408b to be delivered to viewers 3406a and 3406b, respectively, at various locations. For example, display device 3402a, headset 3412a, and/or remote control 3404a may use positioning techniques to track the position of viewer 3406a, and display device 3402b, headset 3412b, and/or remote control 3404b may use positioning techniques to track the position of viewer 3406b.

E. Example Electronic Device Implementations

Embodiments may be implemented in hardware, software, firmware, or any combination thereof. For example, application 104, API 106, mixed 2D/3D supporting programming elements 108, operating system 304, display driver 306, API 400, programming elements 410, programming sequence(s) 404, API 414, user input interfaces 420, 2D, 3Dx & mixed display driver interface 422, shell operations 424, 2D, 3Dx, mixed 2D and 3Dx, & mixed 3Dx and 3Dy translation services 426, translation services 430a-430c, 2D region setup and control programming sequence 432a, 3Dx region setup and control programming sequence 432b, multiple 2D/3Dx region setup and control programming sequence 432c, 2D region rendering programming sequence 432d, 3Dx region rendering programming sequence 432e, 2D only driver variant 434, 3Dx only driver variant 436, mixed 2D and 3Ds driver variant 438, OS 446, first-third applications 448a-448c, API 602, display driver 604, first application 606, second application 608, graphics pipeline 1102, first translator 1202, and/or second translator 1204 may be implemented as computer program code configured to be executed in one or more processors, and/or as circuit logic.

For instance, FIG. 35 shows a block diagram of an example implementation of an electronic device 3500, according to an embodiment. In embodiments, electronic device 3500 may include one or more of the elements shown in FIG. 35. As shown in the example of FIG. 35, electronic device 3500 may include one or more processors (also called central processing units, or CPUs), such as a processor 3504. Processor 3504 is connected to a communication infrastructure 3502, such as a communication bus. In some embodiments, processor 3504 can simultaneously operate multiple computing threads.

Electronic device 3500 also includes a primary or main memory 3506, such as random access memory (RAM). Main memory 3506 has stored therein control logic 3528A (computer software), and data.

Electronic device 3500 also includes one or more secondary storage devices 3510. Secondary storage devices 3510 include, for example, a hard disk drive 3512 and/or a removable storage device or drive 3514, as well as other types of storage devices, such as memory cards and memory sticks. For instance, electronic device 3500 may include an industry standard interface, such a universal serial bus (USB) interface for interfacing with devices such as a memory stick. Removable storage drive 3514 represents a floppy disk drive, a magnetic tape drive, a compact disk drive, an optical storage device, tape backup, etc.

As shown in FIG. 35, secondary storage devices 3510 may include an operating system 3532 and an API 3534. Embodiments for operating system 3532 (e.g., OS 304, OS 446, etc.) and for API 3534 (e.g., API 106, API 400, API 414, API 602, etc.) are described in detail above.

Removable storage drive 3514 interacts with a removable storage unit 3516. Removable storage unit 3516 includes a computer useable or readable storage medium 3524 having stored therein computer software 3528B (control logic) and/or data. Removable storage unit 3516 represents a floppy disk, magnetic tape, compact disk, DVD, optical storage disk, or any other computer data storage device. Removable storage drive 3514 reads from and/or writes to removable storage unit 3516 in a well known manner.

Electronic device 3500 further includes a communication or network interface 3518. Communication interface 3518 enables the electronic device 3500 to communicate with remote devices. For example, communication interface 3518 allows electronic device 3500 to communicate over communication networks or mediums 3542 (representing a form of a computer useable or readable medium), such as LANs, WANs, the Internet, etc. Network interface 3518 may interface with remote sites or networks via wired or wireless connections.

Control logic 3528C may be transmitted to and from electronic device 3500 via the communication medium 3542.

Any apparatus or manufacture comprising a computer useable or readable medium having control logic (software) stored therein is referred to herein as a computer program product or program storage device. This includes, but is not limited to, electronic device 3500, main memory 3506, secondary storage devices 3510, and removable storage unit 3516. Such computer program products, having control logic stored therein that, when executed by one or more data processing devices, cause such data processing devices to operate as described herein, represent embodiments of the invention.

Devices in which embodiments may be implemented may include storage, such as storage drives, memory devices, and further types of computer-readable media. Examples of such computer-readable storage media include a hard disk, a removable magnetic disk, a removable optical disk, flash memory cards, digital video disks, random access memories (RAMs), read only memories (ROM), and the like. As used herein, the terms "computer program medium" and "computer-readable medium" are used to generally refer to the hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, as well as other media such as flash memory cards, digital video discs, RAM devices, ROM devices, and the like. Such computer-readable storage media may store program modules that include computer program logic for application 104, API 106, mixed 2D/3D supporting programming elements 108, operating system 304, display driver 306, API 400, programming elements 410, programming sequence(s) 404, API 414, user input interfaces 420, 2D, 3Dx & mixed display driver interface 422, shell operations 424, 2D, 3Dx, mixed 2D and 3Dx, & mixed 3Dx and 3Dy translation services 426, translation services 430a-430c, 2D region setup and control programming sequence 432a, 3Dx region setup and control programming sequence 432b, multiple 2D/3Dx region setup and control programming sequence 432c, 2D region rendering programming sequence 432d, 3Dx region rendering programming sequence 432e, 2D only driver variant 434, 3Dx only driver variant 436, mixed 2D and 3Ds driver variant 438, OS 446, first-third applications 448a-448c, API 602, display driver 604, first application 606, second application 608, graphics pipeline 1102, first translator 1202, second translator 1204, operating system 3532, API 3534, flowchart 500, flowchart 700, (including any one or more steps of flowcharts 500 and 700), and/or further embodiments of the present invention described herein. Embodiments of the invention are directed to computer program products comprising such logic (e.g., in the form of program code or software) stored on any computer useable medium (e.g., a computer readable storage medium). Such program code, when executed in one or more processors, causes a device to operate as described herein.

As described herein, electronic device 3500 may be implemented in association with a variety of types of display devices. For instance, electronic device 3500 may be one of a variety of types of media devices, such as a stand-alone display (e.g., a television display such as flat panel display, etc.), a computer, a game console, a set top box, a digital video recorder (DVR), other electronic device mentioned elsewhere herein, etc. Media content that is delivered in two-dimensional or three-dimensional form according to embodiments described herein may be stored locally or received from remote locations. For instance, such media content may be locally stored for playback (replay TV, DVR), may be stored in removable memory (e.g. DVDs, memory sticks, etc.), may be received on wireless and/or wired pathways through a network such as a home network, through Internet download streaming, through a cable network, a satellite network, and/ or a fiber network, etc. For instance, FIG. 35 shows a first media content 3530A that is stored in hard disk drive 3512, a second media content 3530B that is stored in storage medium 3524 of removable storage unit 3516, and a third media content 3530C that may be remotely stored and received over communication medium 3522 by communication interface 3518. Media content 3530 may be stored and/or received in these manners and/or in other ways.

FIG. 36 shows a block diagram of a display system 3600 that supports mixed 2D, stereoscopic 3D and multi-view 3D displays according to an exemplary embodiment. Display system 3600 is another electronic device embodiment. As shown in FIG. 36, display system 3600 includes media input interfaces 3602, host processing circuitry 3604, user input devices 3606, display processing circuitry 3608, adaptable display driver circuitry 3610, adaptable 2D, 3Dx and mixed display 3612, and first-third interface circuitry 3614-3618. Host processing circuitry 3604 includes API 414 (of FIG. 4B) and operating system 446 (of FIG. 4B). Display processing circuitry 3608 includes 2D, 3Dx, mixed 2D and 3Dx, and mixed 3Dx and 3Dy translation services 3640.

Media input interfaces 3602 includes one or more media input interfaces, wired or wireless, for received media, such as those described elsewhere herein. For instance, media input interface 3602 may include an interface for receiving media content from a local media player device, such as a DVD player, a memory stick, a computer media player, etc., and may include commercially available (e.g., USB, HDMI, etc.) or proprietary interfaces for receiving local media content. Media input interface 3602 may include an interface for receiving media content from a remote source, such as the Internet, satellite, cable, etc.), and may include commercially available (e.g., WLAN, Data Over Cable Service Interface Specification (DOCSIS), etc.) or proprietary interfaces for receiving remote media content.

Host processing circuitry 3604 may include one or more integrated circuit chips and/or additional circuitry, which may be configured to execute software/firmware, including operating system 446 and API 414.

User input devices 3606 includes one or more user input devices that a user may use to interact with display system 3600. Examples of user input devices are described elsewhere herein, such as a keyboard, a mouse/pointer, etc.

Display processing circuitry 3608 may be included in host processing circuitry 3604, or may be separate from host processing circuitry 3604 as shown in FIG. 36. For instance, display processing circuitry 3608 may include one or more processors (e.g., graphics processors), further circuitry and/or other hardware, software, firmware, or any combination thereof. Display processing circuitry 3608 may be present to perform graphics processing tasks. For instance, as shown in FIG. 36, display processing circuitry 3608 may optionally include 2D, 3Dx, mixed 2D and 3Dx, and mixed 3Dx and 3Dy translation services 3640 to perform 2D/3D related translation services in addition or alternatively to translation services of OS 446 and/or application 414.

Adaptable display driver circuitry 3610 includes one or more display driver circuits for an adaptable display. Examples of adaptable display driver circuitry 3610 are described above, such as with regard to FIGS. 4B, 16, 17, 30, and 33.

Adaptable 2D, 3Dx and mixed display 3612 includes a display that is adaptable, and is capable of displaying 2D content, 3D content, and a mixture of 2D and/or 3D content. Examples of adaptable 2D, 3Dx and mixed display 3612 are described elsewhere herein.

First-third interface circuitry 3614-3618 is optional. For instance, as shown in FIG. 36, a communication infrastructure (e.g., a signal bus) 3634 may be present to couple signals of media input interfaces 3602, host processing circuitry 3604, user input devices 3606, display processing circuitry 3608, adaptable display driver circuitry 3610, and display 3612. In an embodiment, if display processing circuitry 3608, adaptable display driver circuitry 3610, and/or display 3612 are contained in a common housing/structure with host processing circuitry 3604 (e.g., in a handheld device, etc.) interface circuitry 3614-3618 may not be needed to be present. If display processing circuitry 3608, adaptable display driver circuitry 3610, and/or display 3612 are in a separate housing/ structure from host processing circuitry 3604, corresponding interface circuitry 3614-3618 may be present to provide an interface. For instance, host processing circuitry 3604 may be in a game console, a desktop computer tower, a home audio receiver, a set top box, etc., and display processing circuitry 3608, adaptable display driver circuitry 3610, and/or display 3612 may be included in a display device structure. In such case, interface circuitry 3614-3618 may not be present. When present, first-third circuitry 3614-3618 may each include circuitry, such as receivers and/or transmitters (wired or wireless), for enabling communications between the respective one of display processing circuitry 3608, adaptable display driver circuitry 3610, and display 3612, and the other components of system 3600 (e.g., host processing circuitry 3604, etc.).

Note that the embodiment of display system 3600 shown in FIG. 36 is provided for purposes of illustration, and is not intended to be limiting. In further embodiments, display system 3600 may include fewer, additional, and/or alternative features than shown in FIG. 36.

IV. Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method performed by one or more processors used by an application programming interface (API) to enable applications to display both first content and second content on a screen, the first content being three-dimensional content, the method comprising:
   receiving, by one or more processors, a first command from an application directing at least in part a first configuration of a first region of the screen to support the first content, the first configuration being a first three-dimensional configuration;
   responding to the first command by sending a first configuration request to place the screen in a three-dimensional mode within the first region;
   receiving a second command directing at least in part a second configuration of a second region of the screen to support the second content;
   responding to the second command by sending a second configuration request to place the screen in a mode corresponding to the second configuration within the second region; and receiving a third command configured to adjust a configurable depth of the three-dimensional content.

2. The method of claim 1, wherein the second configuration is a two-dimensional configuration.

3. The method of claim 1, wherein the second configuration is a second three-dimensional configuration, and the first configuration and the second configuration differing by at least one three-dimensional characteristic.

4. The method of claim 1, further comprising:
   receiving the three-dimensional content in the form of first primitives; and
   rendering three-dimensional pixel data in a graphics pipeline based on the first primitives.

5. The method of claim 4, further comprising:
   accessing a three-dimensional region rendering programming sequence when rendering the three-dimensional pixel data to perform a three-dimensional screen region rendering task.

6. The method of claim 1, further comprising:
   receiving the three-dimensional content in a first form; and
   translating at least a portion of the three-dimensional content into a second form.

7. The method of claim 1, further comprising:
   directing a visual presentation of a calling convention of the first command.

8. An application programming interface (API) that supports both a plurality of software applications that are at least partially executed by one or more processors and at least a first of a plurality of displays, the first of the plurality of displays supporting both two-dimensional content viewing and three-dimensional content viewing, the API comprising:
   a first program sequence, at least partially executed by one or more processors, that, in response to a first request from a first of the plurality of software applications, at least in part causes a first screen region of the first of the plurality of displays to enter a first configuration, the first configuration supporting the three-dimensional content viewing;
   a second program sequence that, in response to a second request, at least in part causes a second screen region of the first of the plurality of displays to enter a second configuration, the second configuration supporting the two-dimensional content viewing;
   a third program sequence that, in response to a third request from the first of the plurality of software applications, causes a configurable depth of three-dimensional content displayed in the first screen region to be adjusted in accordance to the third request; and
   at least one of the first screen region and the second screen region being less than a full-screen region of the first of the plurality of displays.

9. The API of claim 8, wherein the first request from the first software application includes a three-dimensional indicator such that first program sequence causes the first screen region to enter the first configuration to support the display of three-dimensional content.

10. The API of claim 8, wherein the second request includes a two-dimensional indicator such that the second program sequence causes the second screen region to enter the second configuration to support the display of two-dimensional content.

11. The API of claim 10, further comprising:
    a graphics pipeline that receives three-dimensional content in the form of first primitives, that renders three-dimensional pixel data based on the first primitives, and that sends the three-dimensional pixel data to cause a display of the three-dimensional content in the first screen region.

12. The API of claim 11, wherein the graphics pipeline receives two-dimensional content in the form of second primitives, renders two-dimensional pixel data based on the second primitives, and sends the two-dimensional pixel data to cause display of the second content in the second screen region concurrently with the display of the three-dimensional content in the first screen region.

13. The API of claim 12, wherein the graphics pipeline accesses a first library module when rendering the three-dimensional pixel data to perform a three-dimensional screen region rendering task, and accesses a second library module when rendering the two-dimensional pixel data to perform a two-dimensional screen region rendering task.

14. The API of claim 8, further comprising:
    an API description document that defines a plurality of calling conventions of the API, the plurality of calling conventions including a first calling convention for a request to configure a screen region to display three-dimensional content and a second calling convention for a request to configure a screen region to display two-dimensional content.

15. An application programming interface (API) that supports both a plurality of software applications that are at least partially executed by one or more processors and a display, the display having a full-screen region, the API comprising:

a library of programming elements, each element of the library of programming elements having a calling convention;

a first programming sequence, at least partially executed by one or more processors, triggered by a first call from a first of the plurality of software applications, the first call corresponding to a first element of the library of programming elements, and the first programming sequence at least in part causes placement of a first screen region of the display in a first configuration;

a second programming sequence, triggered by a second call, that at least in part causes placement of a second screen region of the display in a second configuration, at least one of the first screen region and the second screen region being less than the full-screen region, at least one of the first configuration and the second configuration being a three-dimensional configuration, and the first configuration being different from that of the second configuration; and a third programming sequence, triggered by a third call, that adjusts a configurable depth of three-dimensional content being displayed in at least one of the first screen region or the second screen region.

16. The API of claim 15, wherein the second call is from a second of the plurality of software applications.

17. The API of claim 15, wherein the second call is from the first of the plurality of software applications.

18. The API of claim 15, wherein at least a portion of the first programming sequence is within the first programming element of the library of programming elements.

19. The API of claim 15, wherein the first programming sequence at least in part causes placement of the first screen region of the display in the first configuration by directing a display driver.

20. The API of claim 15, wherein the first configuration is a three-dimensional configuration and the second configuration is a two-dimensional configuration.

21. The API of claim 15, wherein the first configuration is a first three-dimensional configuration and the second configuration is a second three-dimensional configuration.

* * * * *